(12) United States Patent
Sivasubramanian et al.

(10) Patent No.: US 11,862,148 B2
(45) Date of Patent: *Jan. 2, 2024

(54) SYSTEMS AND METHODS TO ANALYZE CUSTOMER CONTACTS

(71) Applicant: Amazon Technologies, Inc., Seattle, WA (US)

(72) Inventors: Swaminathan Sivasubramanian, Sammamish, WA (US); Vasanth Philomin, Seattle, WA (US); Vikram Anbazhagan, Issaquah, WA (US); Ashish Singh, Sammamish, WA (US); Atul Deo, Kirkland, WA (US); Anuroop Arora, Seattle, WA (US); Jessie Young, Seattle, WA (US); Harsh Yadav, Seattle, WA (US); Priyanka Shirish Kale, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/698,449

(22) Filed: Nov. 27, 2019

(65) Prior Publication Data

US 2021/0158805 A1    May 27, 2021

(51) Int. Cl.
*G10L 15/00*      (2013.01)
*G10L 15/26*      (2006.01)
*G10L 15/18*      (2013.01)
*G06Q 10/107*    (2023.01)
(Continued)

(52) U.S. Cl.
CPC .......... *G10L 15/1815* (2013.01); *G06F 16/61* (2019.01); *G06N 5/04* (2013.01);
(Continued)

(58) Field of Classification Search
CPC .......... H04M 3/5175; H04M 2201/40; H04M 2203/401; H04M 3/42221; H04M 3/5233;
(Continued)

(56) References Cited

U.S. PATENT DOCUMENTS 10,032,463 B1    7/2018 Rastrow et al.
10,187,375 B1 *  1/2019 Kincaid ............... H04L 9/3247
(Continued)

OTHER PUBLICATIONS

International Search Report and Written Opinion dated Jun. 11, 2021, in International Patent Application No. PCT/US2020/062093, filed Nov. 24, 2020.

(Continued)

*Primary Examiner* — Michael Ortiz-Sanchez
(74) *Attorney, Agent, or Firm* — Davis Wright Tremaine LLP

(57) ABSTRACT

Systems and methods to analyze contacts data. Contacts data may be encoded as text (e.g., chat logs), audio (e.g., audio recordings), and various other modalities. A computing resource service provider may implement a service to obtain audio data from a client, transcribe the audio data, thereby generating text, execute one or more natural language processing techniques to generate metadata associated with the text, processing at least the metadata to generate an output, determine whether the output matches one or more categories, and provide the output to the client. Techniques described herein may be performed as an asynchronous workflow.

21 Claims, 27 Drawing Sheets

(51) Int. Cl.
  *G06Q 30/016* (2023.01)
  *G10L 15/30* (2013.01)
  *G06N 5/04* (2023.01)
  *G10L 15/22* (2006.01)
  *G10L 15/32* (2013.01)
  *G06F 16/61* (2019.01)
  *H04L 9/32* (2006.01)
  *H04L 9/06* (2006.01)

(52) U.S. Cl.
  CPC ......... *G06Q 10/107* (2013.01); *G06Q 30/016* (2013.01); *G10L 15/22* (2013.01); *G10L 15/30* (2013.01); *G10L 15/32* (2013.01); *H04L 9/0643* (2013.01); *H04L 9/3242* (2013.01)

(58) Field of Classification Search
  CPC ............. H04M 3/4936; H04M 3/5183; H04M 2203/404; H04M 3/4933; H04M 3/51; H04M 7/00; H04M 1/271; H04M 1/656; H04M 1/72436; H04M 3/2281; G10L 15/26; G10L 15/1815; G10L 15/1822; G10L 2015/088; G10L 17/26; G10L 25/63; G10L 15/18; G10L 17/06; G10L 2015/0638; G10L 15/00; G10L 15/22; G10L 15/30; G10L 15/32; G10L 19/00; G10L 15/16; G10L 2015/221; G10L 2015/225; G06Q 30/016; G06Q 10/06395; G06Q 10/06398; G06Q 30/01; G06Q 30/0281; G06Q 10/0639; G06Q 10/107; G06Q 30/015; G06F 40/30; G06F 40/279; G06F 16/685; G06F 40/205; G06F 40/284; G06F 40/289; G06F 16/61; G06F 16/60; G06F 16/638; G06F 16/00; G06F 16/48; G06F 16/433; G06F 16/9538; G06F 40/20; G06F 16/3329; G06F 16/907; G06N 5/04; H04L 51/00; H04L 9/0643; H04L 63/08; H04L 9/3242; H04L 63/0876; H04L 63/126
  See application file for complete search history.

(56) References Cited

U.S. PATENT DOCUMENTS

| | | | |
|---|---|---|---|
| 10,339,220 B2 | 7/2019 | Harari et al. | |
| 10,585,991 B2 | 3/2020 | Miller et al. | |
| 10,642,936 B2 | 5/2020 | Arquero et al. | |
| 10,887,764 B1 | 1/2021 | Mokady et al. | |
| 2002/0002464 A1* | 1/2002 | Petrushin | G10L 17/26 704/275 |
| 2009/0064303 A1 | 3/2009 | Dickinson et al. | |
| 2010/0332287 A1* | 12/2010 | Gates | G06Q 30/0203 705/7.32 |
| 2011/0067102 A1* | 3/2011 | Fukasawa | G06Q 10/107 709/206 |
| 2011/0208522 A1* | 8/2011 | Pereg | G06F 40/35 704/235 |
| 2011/0302003 A1 | 12/2011 | Shirish et al. | |
| 2014/0140496 A1 | 5/2014 | Ripa et al. | |
| 2015/0071415 A1 | 3/2015 | Thomson et al. | |
| 2015/0195406 A1 | 7/2015 | Dwyer et al. | |
| 2015/0358463 A1 | 12/2015 | O'Connor et al. | |
| 2017/0041296 A1* | 2/2017 | Ford | G06F 21/64 |
| 2017/0148264 A1 | 5/2017 | Pichette et al. | |
| 2017/0337478 A1 | 11/2017 | Sarikaya et al. | |
| 2017/0357636 A1 | 12/2017 | Shafiulla et al. | |
| 2018/0089171 A1 | 3/2018 | Arquero et al. | |
| 2018/0097940 A1 | 4/2018 | Beilis et al. | |
| 2018/0109540 A1 | 4/2018 | Amar et al. | |
| 2018/0124243 A1 | 5/2018 | Zimmerman | |
| 2018/0165062 A1 | 6/2018 | Yoo et al. | |
| 2018/0182385 A1 | 6/2018 | Stahl | |
| 2018/0349920 A1* | 12/2018 | Katib | G06Q 30/0185 |
| 2018/0364975 A1 | 12/2018 | Kwong et al. | |
| 2019/0132451 A1 | 5/2019 | Kannan | |
| 2019/0158671 A1 | 5/2019 | Feast | |
| 2019/0180288 A1 | 6/2019 | Shaev et al. | |
| 2019/0319900 A1 | 10/2019 | Varlow et al. | |
| 2019/0325897 A1* | 10/2019 | Liu | G10L 25/63 |
| 2020/0195779 A1 | 6/2020 | Weisman et al. | |
| 2020/0272727 A1 | 8/2020 | Watson et al. | |
| 2021/0090570 A1 | 3/2021 | Aharoni et al. | |
| 2021/0133765 A1* | 5/2021 | Adibi | G06Q 50/01 |
| 2021/0136198 A1 | 5/2021 | Leavitt et al. | |
| 2021/0136205 A1* | 5/2021 | Adibi | H04M 3/5237 |
| 2021/0142789 A1* | 5/2021 | Gurbani | G10L 15/16 |

OTHER PUBLICATIONS

European Patent Office Communication pursuant to Article 94(3) EPC dated Aug. 2, 2023, Application No. 20842353.3, 7 pages.

* cited by examiner

400

Contacts Analytics Service > New Category

New Category
Category Name
*Improper Greeting*
Criteria

Cancel  [Save]

Attribute

Type ▽ Attribute ▽
External ▽ Member Status ▽ equals ▽ Subscriber ▽ 🗑

[Or ▽]

Attribute

Type ▽ Attribute ▽
System ▽ Queue name ▽ Queue name  🗑
Subscriber ▽

[And ▽]

Keywords and phrases
○ Did include  ● Did not include
Time range
○ The entire length  ● The first ▽ 30 seconds ▽
Keywords and phrases
*Enter comma separated phrases* _____ [+ Add]  Clear  🗑

| Phrase | Speaker | |
|---|---|---|
| Thanks for being a subscriber | Agent | Remove |
| We value you as a subscriber | Agent | Remove |

[+ Add Criteria]

FIG. 4

Contact search

Search Parameters

Time range

Start date
*Dec 22, 2018*   To

End date
*Dec 23, 2018*

Start time
*hh:mm*   To

End time
*hh:mm*

☐ Limit search to only between the start time and end time for each day

Time zone
*Pacific Daylight Time, GMT-07:00* ▽

Agents

Agent login
🔍 *Search*

Agent name
🔍 *Search*

Contact ID

Contact ID
*Enter value*

Keywords

*"account is locked", "can't access my account"*

Comma separate different keywords. Use quotation marks "like this" to search for exact match.

More keyword settings ▽

[ Search contacts ]

FIG. 6

Contact Search

Search parameters

Dec 22, 2018 – Dec 23, 2018, "account is locked, can't access my account"    Edit

Common Themes

(Account Access 98) (Account is locked 76) (Password is not accepted 70) (Online banking 63) (Can't access online banking 55)
(Page says access denied 44) (Can't reset password 41) (Online checking account 33) (Online banking page is broken 32)

Contacts

Dec 22, 2018 - Dec 23, 2018  ⟲

| Contact ID | Channel | Initiation Timestamp | Phone Number | Queue | Agent | Recording/Transcript | Customer Number | Disconnect Timestamp |
|---|---|---|---|---|---|---|---|---|
| e7f4de0-7fdc-4778-928c-cd273651092a | Voice | 12/22/18, 6:01:50 am | +1 425-595-2370 | Queue Name | kenobio | ▷ Play recording | + 1 (###) ###-#### | 12/22/18, 6:14:20 am |
| 1po9ie0-rt764-2588-9y6c-cd21uy5109187q | Voice | 12/22/18, 7:45:22 am | +1 425-595-2371 | Queue Name | soloh | ▷ | ###-#### | 12/22/18, 8:07:53 am |
| 8547rt0-rt67c-876h-9erc-nw8eymdoOiOs | Chat | 12/22/18, 8:08:01 am | - | Queue Name | leiap | ▷ | - | 12/22/18, 8:24:20 am |
| 04hrdoi-ics7c-po8-8765-vse6kymd345t | Voice | 12/22/18, 9:31:03 am | Outbound | Queue Name | chewbacca | ▷ | ###-#### | 12/22/18, 9:55:23 am |
| f7f4367-e234-4321-168h-cd20986vs43st | Chat | 12/22/18, 9:40:32 am | - | Queue Name | leiap | ▷ | - | 12/22/18, 10:01:08 am |
| 56u4de-y452-7789-148b-cd200651065d | Voice | 12/22/18, 10:01:40 am | +1 425-595-2370 | Queue Name | kenogio | ▷ | + 1 (###) ###-#### | 12/22/18, 10:10:20 am |
| 065edd3-1ase-4778-928c-cd27365100 2a | Voice | 12/22/18, 10:42:10 am | +1 425-595-2371 | Queue Name | chewbacca | ▷ | + 1 (###) ###-#### | 12/22/18, 11:03:43 am |
| 2r47rt0-rt55c-w876-9erc-322123d0O10s | Voice | 12/22/18, 10:45:08 am | +1 425-595-2371 | Queue Name | skywalkerl | ▷ | + 1 (###) ###-#### | 12/22/18, 11:00:56 am |
| 6t54dw2-a307c-p08-8765-ue3w63nd346 | Chat | 12/22/18, 11:13:07 am | - | Queue Name | chewbacca | ▷ | + 1 (###) ###-#### | 12/22/18, 11:23:20 am |
| 5tf9de0-7fdc-4e18-928c-cdt4368990000 | Chat | 12/22/18, 11:16:35 am | - | Queue Name | vedard | ▷ | + 1 (###) ###-#### | 12/22/18, 11:34:45 am |

Rows per table: 10 ▽    1-10 of 98    < >

Contact Search

Search parameters

Dec 22, 2018 – Dec 23, 2018, "account is locked, can't access my account"

Common Themes

Search parameter > Account is locked > Identity theft ( Credit card denied  30 ) ( Online banking  27 ) ( State (OR)  26 ) ( Bill pay is blocked  18 ) ( State (WA)  3 )

Contacts

Dec 22, 2018 – Dec 23, 2018

| Contact ID | Channel | Initiation Timestamp | Phone Number | Queue | Agent | Recording/ Transcript | Customer Number | Disconnect Timestamp |
|---|---|---|---|---|---|---|---|---|
| e7f4de0-7f6c-4778-928c-cd273651002a | Voice | 12/22/18, 6:01:50 am | +1 425-595-2370 | Queue Name | kenobio | | +1 (###) ###-#### | 12/22/18, 6:14:20 am |
| 1po9le0-n764-2568-9y6c-cd2uy51t09l7o | Voice | 12/22/18, 7:45:22 am | +1 425-595-2371 | Queue Name | soloh | | ######## | 12/22/18, 8:07:53 am |
| 8547rt0-rt67c-876h-9erc-nwOeymdoCilOs | Chat | 12/22/18, 8:08:01 am | - | Queue Name | leiap | | ######## | 12/22/18, 8:24:20 am |
| 04 hrdoi-tcsic-pc8-8765-vse6wymd345t | Voice | 12/22/18, 9:31:03 am | Outbound | Queue Name | chewbacca | | - | 12/22/18, 9:55:23 am |
| f7f4367-e234-4321-168h-cd20986vs43st | Chat | 12/22/18, 9:40:32 am | - | Queue Name | leiap | | - | 12/22/18, 10:01:08 am |
| 56iu4de-y452-77t89-148b-cd2i0065110s5d | Voice | 12/22/18, 10:01:40 am | +1 425-595-2370 | Queue Name | kenobio | | +1 (###) ###-#### | 12/22/18, 10:10:20 am |
| o65edd3-lase-4778-928c-cd273651002a | Voice | 12/22/18, 10:42:10 am | +1 425-595-2371 | Queue Name | chewbacca | | +1 (###) ###-#### | 12/22/18, 11:03:43 am |
| 2r47rt0-rt55c-w876-9erc-322123dod10s | Voice | 12/22/18, 10:45:08 am | +1 425-595-2371 | Queue Name | skywalkerl | | +1 (###) ###-#### | 12/22/18, 11:00:56 am |
| 8154dvd2-a307c-pc8-8765-ue3ow63vs3346 | Chat | 12/22/18, 11:13:07 am | - | Queue Name | leiap | | +1 (###) ###-#### | 12/22/18, 11:23:20 am |
| 5119dte0-7f6c-4e18-928c-cdt436l990000 | Chat | 12/22/18, 11:16:35 am | - | Queue Name | kenobio | | +1 (###) ###-#### | 12/22/18, 11:34:45 am |

Rows per table: 10   1-10 of 30

FIG. 11

Contact Trace Record

Contact Summary

Contact Id 1po9ie0-7fdc-258-9erc-cd2iuy5109987q
Contact Start and end time 12/22/18, 3:01:00 – 3:10:20
Contact Duration 00:09:20
Customer number 123-456-7890
Agent soloh
Queue customer account
Actions triggered 8

Neutral 50%  ☐ Non-talk time 10%
Positive 30%  ☐ Customer talk time 60%
Negative 10%  ☐ Agent talk time 30%

Customer sentiment trend   Customer sentiment   Total talk time 00:09:20

Non-Talk
Customer
Agent

Contact Details   Contact Analysis

Audio and Transcript

🔍 *Search and Keywords and entities*

1:50/7:43   Speed: 1x ▷   ↶10 △ ↷10   All parties sentiment ▽   Share Link ⋖   Legend ⓘ

FIG. 12

Transcript

🙂 Agent 00:01
Hello. Thanks for calling [business name]. My name is Han Solo. Let's start with your date of birth, and please verify your address for me as well.

🙂 Customer 00:08
Hi. My birthday is February 1, 1981 and my address is 221B Baker Street.
I'll be moving soon, so I need to change that later 🙂 Agent 00:18
Well, happy birthday.

🙂 Customer 00:20
Thanks

😐 Agent 00:22
Hmm
I have a hard time finding your account. Do you happen to have your account ID?
Or tell me the last 4 digits of your security number.

🙂 Customer 00:40
My account ID is 123456789
And the last four digits of my social is 1234
Actually that's the wrong number, let me see.
It's 4567

🙂 Agent 01:03
Found ya. How may I help you today?

---

Actions triggered by this call
Total actions triggered: 8
1. Yelling flag
2. Loud volume notification displayed 3 times at 01:05, 01:28, 02:10 curing the call
3. Link to current promotions doc made available at ##:##
4. Link to change address form made available at ##:##
5. Swear word flag
6. Swear word notification to supervisor – 10:21 am

---

General comments

*Enter text*

Contact details | Contact analysis

Audio Transcript

🔍 Ac

Keywords and entities in this contact

Date of birth 00:04
Verify your address 00:06
Account ID 00:31, 00:42
Social Security 00:38, 00:48
How may I help you 01:03
Yelling 01:05
Bill 01:19
Account balance 01:21, 1:25
[Competitor name] 01:57, 02:02, 02:08

Customer sentiment ▽   Share Link   Legend ⓘ e.] My name is John Doe. Let's start with your date of birth, and please verify your address for me as well.

My address is 123 Main Street. that later.

SYSTEMS AND METHODS TO ANALYZE CUSTOMER CONTACTS

CROSS-REFERENCE TO RELATED APPLICATIONS

This application is related to and incorporates by reference for all purposes the full disclosure of U.S. patent application Ser. No. 16/698,457, filed Nov. 27, 2019, entitled "CUSTOMER CONTACT SERVICE WITH REAL-TIME AGENT ASSISTANCE", U.S. patent application Ser. No. 16/698,470, filed Nov. 27, 2019, entitled "CUSTOMER CONTACT SERVICE WITH REAL-TIME SUPERVISOR ASSISTANCE", U.S. patent application Ser. No. 16/698,478, filed Nov. 27, 2019, entitled "ENRICHMENT OF CUSTOMER CONTACT DATA", and U.S. patent application Ser. No. 16/698,484, filed Nov. 27, 2019, entitled "DIAGNOSTICS CAPABILITIES FOR CUSTOMER CONTACT SERVICES".

BACKGROUND

Many organizations use customer contact centers to facilitate communications with their customers. Customers may use a customer contact center to communicate with agents of an organization for many reasons, such as to ask questions about products and services, report problems, and more. However, organizations may find that incumbent legacy tools are slow, suffer from poor accuracy, or may be difficult to integrate with technologies for data analytics and real-time speech analytics offerings. Additionally, customer contact centers are often used and managed by non-technical supervisors and agents who may find it difficult to write code or build machine learning models. Accordingly, there are many difficulties involved in developing data analytics systems in the context of customer contact centers.

BRIEF DESCRIPTION OF THE DRAWINGS

Various techniques will be described with reference to the drawings, in which:

FIG. 4 illustrates at least a portion of a graphical user interface that can be used to manage categories, according to at least one embodiment;

FIG. 6 illustrate a contact search page, in accordance with at least one embodiment;

FIG. 7 illustrates a contact search result page that is provided to a client of a service provider in response to a client search request with a specified set of search parameters, in accordance with at least one embodiment;

FIG. 8 illustrates playback capabilities a contact search result page, according to at least one embodiment;

FIG. 9 illustrates contact theme filtering capabilities of a contact search result page, according to at least one embodiment;

FIG. 11 illustrates contact theme filtering capabilities of a contact search result page, according to at least one embodiment;

FIG. 12 illustrates at least a portion of a contact trace record page, according to at least one embodiment;

FIG. 13 illustrates at least a portion of a contact trace record page, according to at least one embodiment;

FIG. 14 illustrates searching of keywords and entities in a contact trace record page, according to at least one embodiment;

DETAILED DESCRIPTION

Figure 1:
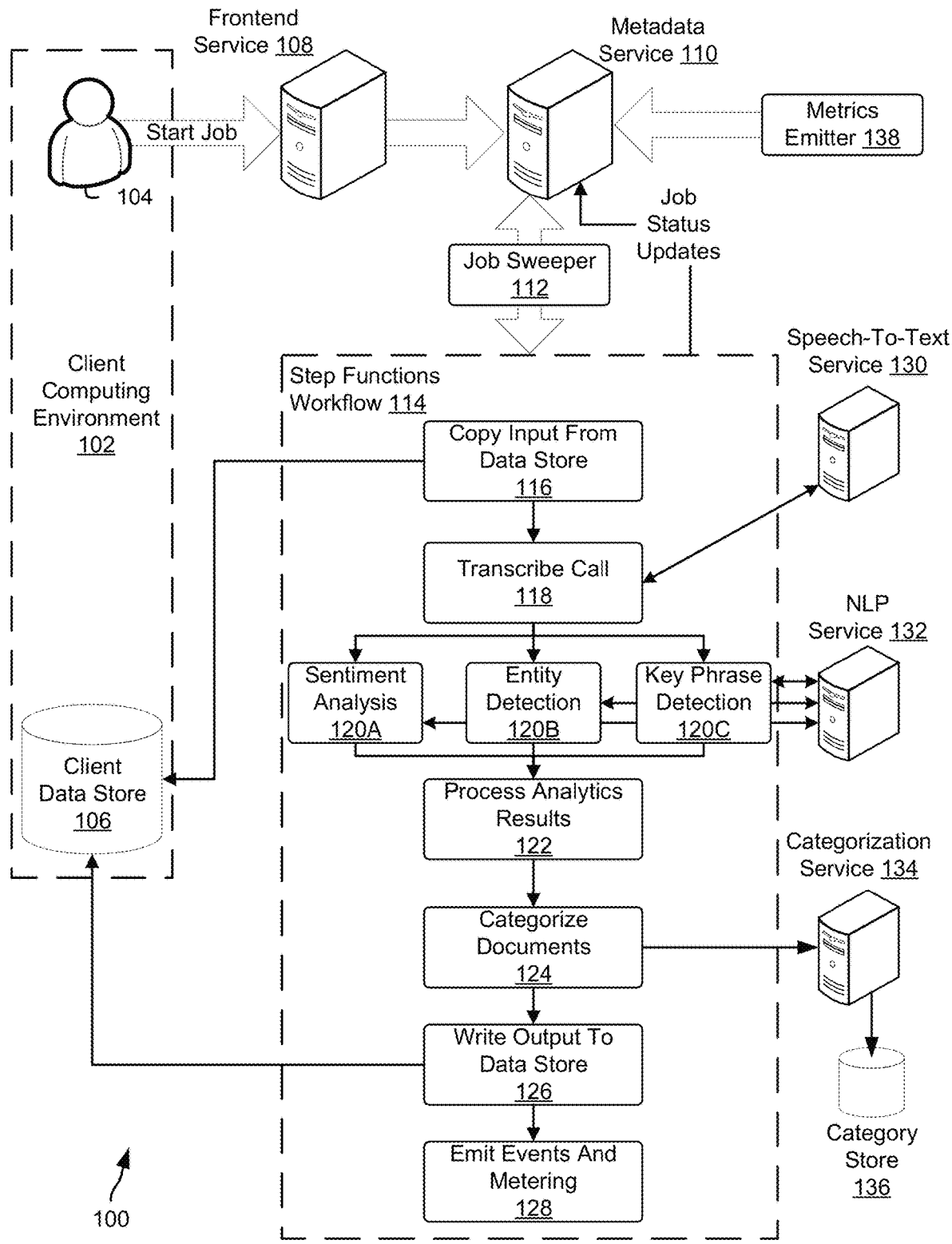
FIG. 1 shows an illustrative example of a computing environment, in which a contacts analytics service can be implemented, according to at least one embodiment.

Techniques described herein may be utilized to implement systems and methods to analyze contacts data. Contacts data may refer to various types of communications that occur within the context of a contact center. A contact center may refer to a physical or logical unit of an organization that manages customer interactions. A contact center may handle inbound and outbound customer communication over multiple channels such as telephone, web, chat, email, messaging apps, social media, text, fax, traditional mail, and more. Contact centers can make use various types of advanced technology to help resolve customer issues quickly, to track customer engagements, and to capture interaction and performance data.

Contacts analytics service may refer to a service or component of a service such as a contact center service that addresses a broad set of core speech analytics use cases without requiring technical expertise of users of the contact center service. In many cases, the users of a contact center service—supervisors and agents—may be trained to use the contact center service, but lack technical training to understand how to build and deploy computing infrastructure to perform data analytics. By providing an out-of-the-box experience directly within a contact center service, contacts analytics service can be used by supervisors and agents without requiring additional manual work and configuration and technical training by employees of an organization that uses a contact center service solution.

A computing resource service provider may include various backend services such as data storage services, compute services, serverless compute services, and more. A computing resource service provider may include a backend contact center service, which may be used to offer customers of the computing resource service provider powerful analytics capabilities that enable businesses to improve the quality of their customer interactions without requiring technical expertise. A contact center service may have one or more self-service graphical interfaces that make it easy for non-technical users to design contact flows, manage agents, and track performance metrics, etc. without requiring specialized technical skills. In at least some embodiment, a computing resource service provider configures and manages computing resources that provide the infrastructure for running a customer center service so that businesses do not need to make costly up-front investments into computer servers, information technology infrastructure, etc.

In at least one embodiment, contacts analytics service refers to a set of analytics capabilities powered by artificial intelligence and/or machine learning in a contact center service that make it easy for customers (e.g., organizations that use a computing resource service provider to support contact center capabilities) to offer better customer experience and improve operational efficiency of organizations' contact centers by extracting actionable insights from customer conversations. In at least one embodiment, contacts analytics service is integrated into a customer call service console and allows supervisors to conduct fast, full-text search on call and chat transcripts, discover themes and emerging trends from customer contacts, and improve agent performance with analytics-based coaching tools. Contacts analytics service may provide real-time analytics for both supervisors and agents during live calls which can provide actionable insights and suggestions to deliver improved customer support. Supervisors can use contacts analytics service's visual dashboard with call scoring to track all in-progress calls and intervene when customers are having a poor experience. Agents can use contacts analytics service's suggested answers to address live customer queries more effectively. Contacts analytics service does not requires technical expertise and can be easily used, taking just a few clicks in contact center service.

A contact center may refer to a service that a business or organization provides to its customers to provide support for those customers. For example, an organization may provide its customers access to a contact center to provide technical support, troubleshoot issues, manage products and services, and more. A contact center service may be one of the only—or even the only—personal connection an organization's customer has with the organization and this experience may have a big impact on customer trust and loyalty. A contact center service can be utilized by an organization to field large volumes of customer conversations every day which results in millions of hours of recorded calls. In at least some embodiments, a contact call center provides services to obtain accurate transcripts of calls and uses call data to perform data analytics, identify issues, common themes, opportunities for agent coaching, and various combinations thereof. In some cases, traditional call centers have various shortcomings, such as difficulties in making some or all of the aforementioned functionality available to their non-technical staff, which may result in a need for data scientists and programmers to apply machine learning techniques and manage custom applications over time. As an alternative, they can use existing contact center analytics offerings, but they are expensive, slow in providing call transcripts, and lack required transcription accuracy. This makes it difficult to quickly detect customer issues and provide objective performance feedback to their agents. The inability of existing tools to provide real-time analytics also prevents supervisors from identifying and helping frustrated customers on in-progress calls before they hang up. Similarly, agents struggle to quickly resolve customers' complex issues, and often put them on hold because finding answers scattered across their enterprise's knowledge base takes a lot of time. As a result of these challenges, many contact centers don't have analytics capabilities that they could use to reduce customer churn, long hold times, agent turnover, and even regulatory fines. Techniques described herein can be utilized to solve some or all of the technical challenges briefly described above.

Contacts analytics service may be utilized in the context of a contact center service to allow users of the service to address complex problems with AI-powered analytics capabilities that are available within the contact center service offerings, and does not require any coding or ML experience to use. In various embodiments, contacts analytics service uses highly accurate speech transcription technology to transcribe calls and automatically indexes call transcripts and chat-based interactions so that they are searchable in the contact center service console, which may be a graphical user interface that can be used by non-technical supervisors, and the supervisors can use the console to easily search contacts based on content and filter by sentiment to identify issues such as customers wanting to cancel services, return products, and other issues which may be pertinent to the supervisor's organization. In at least some embodiments, contacts analytics service implements a theme detection feature that allows supervisors to analyze multiple customer conversations and presents a set of themes that are causing increased call volumes, dissatisfied customers, and recurring issues. In at least some embodiments, contacts analytics service presents these themes in an easy to understand visual format that helps supervisors quickly respond to customer feedback and to perform remediations, if appropriate. In at least some embodiments, contacts analytics service includes agent coaching capabilities that enables supervisors to find opportunities to increase their agents' effectiveness—for example, contacts analytics service may generate a graphical illustration for past calls that makes it easy for supervisors to spot issues and share feedback with agents by commenting on specific portions of the conversation. Supervisors can track agent compliance with defined categorization rules that provide parameters for how agents interact with customers—for example, a supervisor may review call transcripts to determine how often an agent greets the customer in a call, which may be part of an agent handbook that guides agent behavior to provide a more pleasant and uniform customer experience. Supervisors can also track agent performance by defining categories that organize customer contacts based on content and characteristics such as silence duration, sentiment, talk speed, and interruptions. In at least some embodiments, contacts analytics service provides real-time assistance to supervisors and/or agents. In at least some embodiments, real-time supervisor assistance allows a supervisor to monitor call center analytics data in real-time, which may be aggregated across an entire call center, to specific product or service lines, or even a view onto a specific agent. In at least some embodiments, contacts analytics service provides a dashboard that shows analysis of all live calls happening in the call center and scores them based on customized criteria such as repeated requests to speak to a manager, yelling, or long silences. In at least some embodiments, a contacts analytics service dashboard allows supervisors to look across live calls and see where they may need to engage and assist in de-escalating a situation. In at least some embodiments, contacts analytics service provides real-time assistance to agents which can provide assistance to agents during live calls by automatically searching vast amounts of content contained in manuals, documents, and wikis and giving agents answers to customer questions as they are being asked, or surfacing the most relevant documents.

Organizations may interface with a service frontend that abstracts the use of one or more backend services that utilize machine learning, data analytics, and coordinate the use of various computing resources hosted or otherwise utilized by a computing resource service provider. In at least some embodiments, contacts analytics service is an out-of-the-box experience within a contact center service that enables the customer (e.g., an organization, or supervisors and/or agents thereof) to deliver better outcomes for their end users without requiring technical expertise to wrote code, build custom solutions, machine learning models, etc.

In at least one embodiment, data analytics capabilities can be enabled through a computing resource service provider management console for a contact center service provided by said computing resource service provider. Contacts analytics service may be provide capabilities for agents and supervisors that are integrated into a contact center service's user experience (e.g., graphics-based consoles and interfaces). In at least some embodiments, supervisors have access to new and enhanced existing user interface elements within a contact center service that allow them to categorize conversations, setup call scoring, search historical contacts, derive themes, provide post-call agent coaching, and various suitable combination thereof. In at least one embodiment, contacts analytics service provides a real-time agent assistance interface (e.g., as a widget) which provides an agent with guidance as to the next best action. In at least one embodiment, real-time interfaces can be embedded within existing tools or deliver to agents in a custom UI by using APIs supported by contacts analytics service. Contact trace records (CTR) in a contact summer center can be enriched with metadata from contacts analytics service which may include the following non-limiting examples: transcriptions, sentiment, and categorization tags. In at least some embodiments, businesses can easily export this information and use business intelligence or data visualization tools to perform further analysis by combining with their data from other sources.

Contacts analytics service may be a component or subservice of a contact center service that provides an organization 100% visibility into customer interactions. Contacts analytics service may be configured to automatically transcribe calls and using machine learning to extract intelligence and insights from them. Contacts analytics service can be used by organizations to identify customer experience issues and agent training gaps. In at least one embodiment, contacts analytics service includes a console that a supervisor can use to filter conversations by characteristics such as sentiment and silence duration. In at least one embodiment, contacts analytics service can be used by an organization to use quality and performance management features such as call categorization and scoring, and theme detection directly within a contact center service.

Contacts analytics service may be implemented as a scalable service of a computing resource service provider that provides real-time agent assistance that scales to thousands of agents handling millions of calls. In at least one embodiment, contacts analytics service may be used by an organization to provide answers to customers on a wide range of questions in a rapid manner. In at least some embodiments, contacts analytics service provides efficient access to large volumes of data such as call transcripts, which provides benefits to supervisors by making it easier for them to analyze past interactions and provide timely feedback to agents. In at least some embodiments, supervisors are able to get real-time or near real-time visibility into live interactions between agents and an organization's customer. In at least one embodiment, reducing delays for supervisors makes it easier for supervisors to analyze past interactions and provide timely input and feedback to agents. In at least one embodiment, supervisors receive real-time visibility into live interactions and agents get in-call recommendations with answer and relevant articles from knowledge bases that help them provide quick and helpful responses to customers' questions. In at least some embodiments, contacts analytics service can be used to provide real-time agent assistance that reduces the amount of time agents spend researching customer issues and/or increase the rate at which customer issues are resolved on the first call.

In at least some embodiments, contacts analytics service is a component of a customer contact service. Contacts analytics service may, in accordance with at least one embodiment, deliver post-call analysis features, real-time AI-powered assistance for supervisors (e.g., real-time supervisor assist), real-time AI-powered assistance for agents (e.g., real-time agent assist), and combinations thereof. In at least some embodiments, post-call analytics features refers to a set of features are provided in a post hoc manner, providing analytics and insights to data after calls, chats, and other customer interactions occur. In some cases, call data is collected in a central repository and is aggregated and analyzed to determine insights that can be used by supervisors.

In some embodiments, customer calls are automatically transcribed and indexed, and can be accessed within a customer contact service UI. Call audio and transcripts may be provided together with additional metadata associated with the call, such as sentiment scoring for different segments of a call. A contact search page may be used for conducting fast full-text search on call transcripts. In at least some embodiments, users can filter by entities (e.g., product names), sentiment, and other call characteristics. In some cases, calls are analyzed to extract different call characteristics which may include one or more of the following non-limiting examples: talk speed, interruptions, silence (e.g., gaps in speech), speaker energy, pitch, tone, and other voice characteristics. In at least some embodiments, a rich set of filtering parameters can be leveraged by users based on criteria such as silence duration and number of interruptions to identify potential areas for improvement.

Contacts analytics service may be used to implement various uses cases. For example, for past calls, contacts analytics service may record the call audio, transcribe the audio, and index the transcript to provide fast full-text search that can be used by supervisors to diagnose problems such as customer churn by searching for past conversations where customers have expressed frustration with the company's products or mentioning cancelling their services. Organizations may use this capability to investigate the magnitude of known issues by searching through transcripts of past customer conversations and categorizing the calls to identify common issues. Contacts analytics service may be used to search through specific segments of a call to see whether agents are following protocols set by the organization. For example, an organization may have a protocol for how customer interactions should be handled at the start and end of a call. An organization may specify that an agent should greet customers a certain way at the beginning of a call (e.g., "Thanks for being a valued customer" or "Thanks for being a subscriber" based on the customer's relationships to the company). An organization may specify that agents should, prior to the end of a call, check with the customer that all of his/her questions were resolved as part of the call. Calls may be analyzed against a set of categorization rules that define rules for customer interactions (e.g., customer greeting rules) and calls which fail to meet various rules may be flagged to help supervisors ensure compliance.

Contacts analytics service may be used for theme and trend detection, which can be used to flag potential issues to the attention of a supervisor. While search may be effective at diagnosing known issue, theme detection may be used by customers to discover new issues which may have been previously unknown. Contacts analytics service may be used to perform theme detection by analyzing multiple transcribed conversations at once and presenting a set of themes. In at least some cases, themes are presented in a visual format and surface findings in an easy-to-understand format for supervisors. In at least some embodiments, contacts analytics service employs machine learning in an unsupervised manner and/or post-processing techniques to extract similar key phrases across conversations, perform intelligent grouping, and display result themes in a ranked order along with a count or severity value that indicates the magnitude of the issue. Contacts analytics service may provide trend detection capabilities that allow customers (e.g., organizations and supervisors/agents thereof) to detect anomalous patterns in their customer conversations. Trend detection may be utilized, in various embodiments, to allow businesses to discover new issues which are seeing increased magnitude in a customer specified period (e.g., 24 hour period) and investigate earlier. For example, if an organization released a coupon code to be used with certain products and services but discovered an issue where they saw an increase in calls with the phrase "broken coupon code" then contacts analytics service may flag "broken coupon code" as a trending flag which may allow a supervisor to investigate the issue, as there may not be an easy way for customers to detect whether such an issue is on their end or on the business's end.

Theme and/or trend detection may have various use cases. In at least some embodiments, organizations (e.g., business leaders of such) may use theme and/or trend detection to understand top reasons for customer outreach over a period of time and/or for specific products or business workflows. For example, theme and/or trend detection can be used to detect commonalities such as product returns, and use a data-driven approach to determine when to determine a root cause for the product returns. In at least some embodiments, theme detection can be used by an organization to make changes in their products or processes to improve call deflection rates (e.g., increase in volume and/or proportion of calls handled by self-service tools or automated customer assistance tools).

In at least some embodiments, contacts analytics service generates a rich call waveform that provides a visual representation of a given call's details, such as progression of customer and agent sentiment during the call, segments with silence, key phrases spoken, interruptions, talk speed, and call volume. Supervisors can use call audio and rich metadata to quickly identify areas of improvement for agents and to identify patterns and areas of improvement so that agents can better resolve customer issues and provide a better customer experience when they contact the organization via the customer contact service.

Contacts analytics service may, in at least some embodiments, be used to categorize calls and chats into categories based on custom rules, logics, and criteria, which can include the use of keywords and phrases, acoustic characteristics such as silence duration, cross-talk, and talk speed. Supervisors can use contacts analytics service to quickly identify calls and chats with criteria of interest that they want to track, in accordance with at least one embodiment. Accordingly, an organization can use contacts analytics service to more effectively train supervisors and/or agents. In at least some embodiments, contacts analytics service can be used to solve the problem of attrition in contact centers and/or used to help supervisors provide more specific feedback. For example, contacts analytics service can be used to provide a data-driven approach to improving customer contact experiences, which may, using traditional techniques, be more haphazard and ad hoc. For example, instead of supervisors listening to a randomly selected sample of calls and relying upon skewed customer satisfaction surveys, contacts analytics service can be used to analyze and categorize all calls. Supervisors can use contacts analytics service to review comments and/or feedback for specific portions of historic calls, categorize historic calls to determine compliance with different organizational rules or categories. Agents can receive objective feedback provided by supervisors in at least some embodiments. Supervisors can, in at least some embodiments, mark specific calls with a thumbs up or thumbs down and/or comments and an agent can listen to the portion of the call where the supervisor provided feedback for taking more concrete corrective measures. In some embodiments, contacts analytics service provides an interface which supervisors can use to assign labels/tags for recurring searches (e.g., mapping to topics like customer churn and agent script adherence). Tagged calls, in some embodiments, are directly searched upon in a customer contact center or can be exported from the customer contact center and, for example, analyzed by a separate business intelligence tool.

Contacts analytics service, in at least some embodiments, provides real-time analytics capabilities which can be used analyze call and chat data in real-time and provide assistance to supervisors and/or agents. In at least some embodiments, contacts analytics service exposes a graphical dashboard to supervisors that shows real-time analytics of all live calls of a customer contact center. Real-time analytics dashboards may present sentiment scores for calls as interactions evolve, allowing supervisors to look across live calls and see where they may be needed to engage and/or de-escalate and/or help an agent.

In at least some use cases, contacts analytics service provides a dashboard that allows supervisors to track live calls being handled by agents and displays call scores, customer sentiment scores, categorizations, and other information that can be used by supervisors to prioritize calls that need their attention. In at least some embodiments, supervisors receive alerts for calls involving challenging situations such as repeated customer requests for escalation, yelling, use of profanity or forbidden language, frustrated tone, references to competitors, or inability of an agent to solve the customer's problem. A supervisor may use a contacts analytics service dashboard to detect challenging situations as they develop, allowing a supervisor to quickly intervene and de-escalate the situation.

Supervisors may be able to setup actions (e.g., providing agent prompts and assigning call scores) based on call characteristics such as keywords. For example, contacts analytics service may transcribe call audio in real-time and detect instances where an agent says "I don't know" or "I don't handle that" to detect instances in which an agent's responses may cause customers frustration. In at least some embodiments, customer/agent tone (e.g., customer yelling at agent) or failure by agent to adhere to script and compliance procedures may be flagged to a supervisor dashboard to provide supervisors more transparency into how customer issues are being resolved.

In at least some embodiments, contacts analytics service provides real-time agent assistance. Contacts analytics service may use artificial intelligence and machine learning to provide in-call assistance to agents based on real-time call audio which is being transcribed and analyzed to generate suggestions to agents to help them better solve customers' issues. In at least some embodiments, real-time transcripts of calls and/or chats are provided to Kendra which can then provide specific answers or give a list of relevant documents from the company's knowledge base (e.g., using a document ranking feature) to help an agent more quickly locate an answer to the customer's specific question.

In at least some embodiments, contacts analytics service presents, real-time feedback to agents as a widget or plug-in of a customer contact center interface which agents uses. Contacts analytics service may provide visual cues to agents to provide agents awareness of customer sentiment during calls, and as to their own speaking style to make it easier for agents to make adjustments. For example, a contacts analytics service agent dashboard may surface a visual indicator to agents when they are speaking too quickly, they are not speaking loudly enough, when the agent's sentiment score decreases, and more. Agents can use contacts analytics service to identify in real-time adjustments to their own speaking style to show more empathy, speak slower, etc., to improve customer interactions. In at least some embodiments, organizations use feedback to make agents more aware of various call characteristics such as silence duration, talk speed, interruption frequency, amplitude/speaker energy, and customer sentiment.

Contacts analytics service may provide an agent dashboard that provides real-time contextual in-call guidance. In at least some embodiments, an agent dashboard includes a "next best action" suggestion for agents to help them answer customers questions, promote relevant sales offers, read out regulatory disclosures, and more. In at least some embodiments, call audio is transcribed in real-time and submitted to an AI-based suggestions platform to provide a "next best action" suggestion as to the next action that the agent should take. For example, various types of next best actions may include: a greeting script to read to a customer (e.g., at the start of a call); a specific answer to a question asked by a customer; a link to one or more knowledge base article that contacts analytics service believes is most relevant to helping an agent answer a customer's question; a prompt alerting the agent to read a mandatory disclosure (e.g., as per organizations' rules, legal and/or regulatory requirements, etc.) In at least some embodiments, real-time agent assistance tools provided by contacts analytics service are used to help agents improve their soft skills by providing immediate automated feedback during the call.

In at least some embodiments, a client (e.g., organization or employees thereof such as supervisors and/or agents) of a customer contact service uses contacts analytics service's real-time capabilities to quickly identify themes and trends from a given set of customer conversations (e.g., conversations in text and/or voice) and API support for third party application integration (e.g., as a widget of a customer solution). In at least one embodiment, customers are able to access to data (e.g., call transcripts, categorizations) generated by customer contact service and contacts analytics service in a data storage service (e.g., a bucket accessible from the data storage service) which clients are able to combine with other data sources for analysis in business intelligence tools and to apply data analytics to the data. In at least some embodiments, contacts analytics service supports one or more of the following capabilities: API support, redaction capabilities (e.g., PHI, PII, PCI redaction), and ability to provide a unified view across voice and chat interactions.

In at least one embodiment, contacts analytics service is implemented as an independent software-as-a-solution (SAAS) application that integrates with different contact center software solutions. In at least one embodiment, contacts analytics service provides an integrated experience within a contact center service by launching features that enable AI-powered capabilities that non-technical users are able to use without additional training.

Contacts analytics service provides an agent feedback widget that can be easily embedded within existing tools (such as Salesforce) used by agents, in accordance with at least one embodiment. Contacts analytics service may support APIs to give organizations additional flexibility to provide feedback to agents in their custom UI. Agents can review their performance feedback in a "Supervisor Feedback" GUI in a contact center service. In various embodiments, supervisors have access to new and enhanced existing pages within a contact center service that allow them to configure suggested actions for agents, setup call scoring, search historical contacts, and provide post-call agent feedback.

In at least some embodiments, contacts analytics service automatically redacts sensitive data from chat logs, call transcripts, and other text-based records. Non-limiting examples of sensitive data may include one or more of the following: credit card numbers; social security numbers; patient health records; date of birth; passwords or pass phrases; cryptographic keys or other secret material; personal identification number (PIN); and more. In at least some embodiments, sensitive data includes personal health information (PHI) and/or personally identifiable information (PII). In at least some embodiments, contacts analytics service is payment card industry (PCI) compliant and can automatically redact PCI data from both call audio and chat transcript to ensure that sensitive customer information is not exposed to unauthorized employees within the organization. In at least some embodiments, sensitive data is redacted from contacts analytics service GUI and stored in an encrypted format. In at least some embodiments, an organization may have access to a cryptographic key that can be used to decrypt sensitive data of chat logs if such data is needed, such as in cases where such information is required for compliance with statutory and/or regulatory reasons.

Contacts analytics service stores metadata (including call transcript) along with the call recordings in a bucket of a data storage service, in accordance with at least one embodiment. A client of a customer contact service may access the data storage service to obtain call recordings, metadata, and other information which can be integrated with the client's own business intelligence tools, other systems (e.g., CRM tools), or other services offered by a computing resource service provider. Contacts analytics service may support post-call analytics features such as full-text search, theme detection, and agent coaching. Post-call analytics features may be available for audio and/or text interactions. In at least some embodiments, real-time analytics for agents and supervisors are currently only available for audio calls.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: improving customer experience and call center operations without requiring technical expertise by supervisors and agents; improving security of computer systems through diagnostics and discovery capabilities by making it easier for analysts and supervisors to detect security issues (e.g., in accordance with FIGS. 7-11).

FIG. 1 shows an illustrative example of a computing environment 100, in which a contacts analytics service can be implemented, according to at least one embodiment. In at least one embodiment, FIG. 1 illustrates a client computing environment 102 that includes a client 104 and a client data store 106. FIG. 1 illustrates, in accordance with at least one embodiment, an implementation of a contacts analytics service that can be used by a client to process and analyze contacts between agents and customers.

In at least one embodiment, a client computing environment 102 refers to a physical and/or logical organization of resources of a client. A client may refer to an organization that runs a contact center which customers of an organization can contact to ask questions, request help, and more. In at least one embodiment, an organization's client computing environment includes computer systems that are used to receive contacts from customers. Contacts data may refer to different types of touch points that customers can use to contact an organization, and may include the following non-limiting examples: phone calls; chat messages; e-mails; social media messaging systems; online messaging; and more. An organization may have a team of dedicated agents and/or supervisors that are tasked with handling contacts with clients. For example, a customer may use a telephone to call a contact center (e.g., via a toll-free number) which is routed through a customer contact service to an available agent. The agent may receive the call and begin talking with a customer to address the customer's reason(s) for calling the organization. Contacts with an organization (e.g., via a customer contact center) may be recorded in a client data store 106 and such contact data may be analyzed by a contacts analytics service to generate insights, identify themes and trends, perform diagnostics, combinations thereof, and more. A client computing environment 102 may refer to one or more physical computer servers, software running thereon, human resources (e.g., agents and supervisors employed by an organization), etc. In some cases, a client computing environment 102 is or includes a data center with computing resources connected to a computing resource service provider via a network.

Client 104 may refer to a client computer system connected to a server (e.g., computing resource service provider) over a network. In some cases, client 104 refers to a user or operator of a client computer system, and may be an employee of an organization that utilizes a computing resource service provider to host a customer contact service and/or contacts analytics service. In some cases, an employee of an organization runs client software on a computer system in client computing environment 102 that includes a graphical user interface (GUI) such as a graphical dashboard which includes user interface (UI) elements which can be used to start a job. A job may refer to a request to perform a task, such as to run analytics on customer contact data. Client 104 may start a job by using various UI elements to generate a request that is routed across a network to a frontend service 108.

Client data store 106 may refer to an electronic data store that an organization uses to store contact data. Contact data may refer to audio recordings of calls between agents and customers, chat logs of online conversations between agents and customers, video interactions between agents and customers, and more. Contact data may be stored in various formats, such as compressed audio files (e.g., MP3), compressed text files (e.g., as ZIP files) and more. Client data store 106 may be implemented using any suitable type of data storage medium, including hard disk drives, data storage services, databases, network area storage (NAS) devices, and more. In some cases, a combination of different types of data storage devices and/or services are used to store customer contact data. In at least one embodiment, client data store 106 refers to a data storage service of a computing resource service provider (e.g., hosted by a computing resource service provider on behalf of client organization) which an organization is able to access over a network. In some cases, client data store 106 may refer to data storage devices and services that are operated and managed by an organization and/or physically located within a data center or office of the client. In some embodiments, a client uses a computing resource service provider to host a data store, as well as provide access to a customer contact service.

A service may comprise a frontend service frontend 108 and a backend service. Frontend service 108 may be implemented in accordance with service frontends described elsewhere in this disclosure, such as those discussed in connection with FIG. 3. In at least one embodiment, client 104 uses client software that is configured to establish a client-server relationship with a service of a computing resource service provider. A client may connect to a service via frontend service 108 which receives requests from clients and routes them to backend services. Frontend service 108 may be a frontend service of a customer contact service which may be one among several services offered by a computing resource service provider to its customers. In at least one embodiment, client 104 interacts with a GUI to setup a job to be run, and client-side software translates the GUI setup to a web service API request which is transmitted from the client computer system to frontend service 108 via a network. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In some cases, a network may include or refer specifically to a telephone network such as a public switched telephone network or plain old telephone service (POTS).

Frontend service 108 may route a request to run a job to a metadata service 110. Metadata service may be a backend service of a web server that stores jobs to execute and tracks the status of jobs as they are being executed. In at least one embodiment, metadata service 110 receives a request to run a job for a client and generates a job. In at least one embodiment, a job is a record in a database that includes information indicating how to run the job, such as a network location of a customer bucket, a set of contacts to run the job on, and more. In at least one embodiment, a job includes a field in which job status is stored, which may indicate how much progress has been made towards executing the job—for example, the job status information may indicate the job is not yet started, a particular stage in a workflow that is in progress or completed, that the job has been completed, etc. A timestamp may be included with the job status update, which can be used to track how long a particular stage in a workflow has been running. In at least one embodiment, customers are able to define custom workflows to run for their jobs, and each job is mapped to a particular workflow based at least in part on a customer identifier.

In various embodiments, job sweeper 112 is software and/or hardware that is used to execute a workflow for a job. For example, job sweeper 112 may be an event-driven function implemented in accordance with an event-driver compute service such as those described in connection with FIG. 26. In at least one embodiment, job sweeper 112 is an event-drive function that is triggered when a metadata service 110 adds a new job. In some cases, job sweeper 112 runs on a periodic basis and runs jobs in batches. Upon a new job being added (e.g., to a queue or stack), an event-driven compute service may instantiate computing resources to run job sweeper 112. In at least one embodiment, job sweeper 112 finds a new job, determines a workflow for the job, and coordinates execution of the workflow such as step functions workflow 114 illustrated in FIG. 1. In at least some embodiments, the job specifies a specific workflow which the job sweeper uses a scaling service or workflow manager service to coordinate. A workflow may be executed using a scaling service, such as those described in connection with FIG. 25.

Step functions workflow 114 may refer to a series of operations that are specified to run a job. The workflow may be specified in the job, either directly or indirectly. For example, the job may specify a set of capabilities of comprehend service 132 to utilize as part of the workflow. A step function workflow may include a series of steps, some of which may be executed in parallel and others which are to be executed sequentially. A workflow may specify a set of dependencies that describes how the workflow is to be executed. A workflow may be represented as a directed acyclic graph where nodes represent different steps and directed edges represent dependencies. If step A is a dependency of step B, then the workflow may require step A to be completed prior to step B. For example, a sentiment analysis step may have a dependency on a transcribing step, since text generated by the transcribing step is used as an input to perform sentiment analysis. In at least one embodiment, steps 116-128 are each executed as a separate event-driven function, such that completion of one or more event-driven functions cause another event driven function to run the next step in the workflow. In at least one embodiment, some or all of steps 116-128 are batched together as a single event-driven function. In various embodiments, a scaling service is used so that computing resources for each step of a workflow can be scaled up or down as needed based on demand. Step functions workflow 114 may be executed using a scaling service or components thereof in accordance with FIG. 25. One or more portions of step functions workflow 114 may be executed asynchronously.

In at least one embodiment, a customer role is assumed to perform at least some parts of step functions workflow 114. When a principal assumes a destination role, it may receive a resource identifier and a hashed message such as a keyed-hash message authentication code (HMAC). The resource identifier may be a resource identifier associated with the destination role and may be in a human readable format. An HMAC may also be associated with the destination role but is not human readable in at least some embodiments. An HMAC may include security information that may be used to grant permissions to resources that the destination resource may access, and may further include an expiration time that indicates when the HMAC expires. For example, an HMAC for a role may be set to expire every 15 minutes. Upon expiration, an HMAC may be invalidated and no longer able to be used for submitting requests on behalf of the assumed role. Attempting to submit a request with an invalid HMAC may result in an authorization service denying the request.

An application programming interface (API) call may be used to assume a role. When a principal (e.g. user or role) assumes a role, it may have permissions associated with the role. For example, a role may have access to a certain database, computing resources (such as a virtual machine), or cryptographic keys. A principal such as a user may assume the role and then request access to the resource by providing the resource name and HMAC associated with the role. A computer system may receive the request and use an authorization module to determine whether the requestor (in this case, the role) should be granted access to the resource. The requestor may check whether an access control list associated with the resource includes the role as being sufficiently privileged to access the resource. An access control list may be implemented using various types of data structures such as an array, a vector, a map, a hash, etc. and/or structured storage such as a database table or any combination thereof. Additionally, the authentication module may verify the HMAC. The HMAC may be verified by generating a new HMAC using the key and checking if it matches the HMAC provided in the request. Additionally, once the HMAC has been verified to be authentic, the expiration time for the HMAC may be compared against the system clock. If the expiration time of the HMAC code is earlier than the service's current system time, it may indicate that the HMAC code has expired and that the requestor does not have access to the requested resource.

There are several aspects to the use of HMAC codes in accordance with various implementations. First, in some examples, the HMAC code includes an expiration time—when the HMAC expires, the principal assuming the destination role no longer has the rights associated with the destination role and until the principal obtains a new HMAC code that is no longer expired. When an HMAC code expires, a backend system may automatically detect that the HMAC code has expired, and generate a new HMAC code that is set to expire 15 minutes after it was generated. Upon expiration of an HMAC code, a principal may submit a request to for the new HMAC code.

As part of step functions workflow 114, an event-driven compute service may execute an event-driven function to copy input data from data store 116. In at least some embodiments, a role associated with client 104 is assumed and, upon assumption of the client role, a request is made to client data store 106 for contacts data. Contacts data may include audio recordings of calls between agents and customers, chat logs of online conversations between agents and customers, video interactions between agents and customers, and more. Audio recordings may be stored as audio files, such as MP3 files. Chat logs may be recorded in any suitable text-based format and one or more chat logs may be compressed in a ZIP file. Contacts data may be copied from a client bucket of a data storage service client bucket to a bucket controlled by a contacts analytics service. In at least one embodiment, the job that kicked off the step functions workflow 114 includes a time period that indicates a subset of contacts data that should be analyzed. For example, a job may indicate that contacts data from the previous 24-hour period should be copied and analyzed. Upon copying contacts data as inputs from client data store 106, the next step in the step functions workflow may be executed, and the job's status in metadata service 110 may be updated to indicate that contacts data was successfully copied from data store.

Once contacts data has been copied, a step of step functions workflow is to transcribe calls 118 included in the input data. Audio recordings of customer calls may be transcribed using a speech-to-text service 130. Speech-to-text service 130 illustrated in FIG. 1 may be in accordance with those described elsewhere in this disclosure, such as those discussed in connection with FIG. 2. In at least some embodiments, speech-to-text service 130 uses artificial intelligence and/or machine learning techniques to map audio waveforms to text. Speech-to-text service 130 may utilize neural networks such as recurrent neural networks (RNNs), deep neural networks (DNNs), variational autoencoders (VAEs), long short-term memory (LSTM) neural networks, convolutional neural networks (CNNs), and more. A speech-to-text service may receive audio waveforms as inputs and produce text as outputs. In some cases, contacts data includes chat logs or other text-based contacts data. In some cases, this step is optional, such as in cases where client data store 106 solely includes text-based contacts data. Transcription of text-based contacts data may be skipped, as the data is already in a text-based format. However, in at least one embodiment, audio-based contacts data (e.g., video and audio recordings) may be transcribed using a speech-to-text service 130. In at least one embodiment, speech-to-text service 130 receives audio data (e.g., in the form of an audio or video file) and generates a text-based transcript of the audio data. In at least some embodiments, speech-to-text service 130 organizes the transcript by turns, breaking down the audio into different turns based on the speaker. Transcripts may be partitioned by speaker, by sentence, by time (e.g., a fixed duration wherein each turn lasts 15 seconds or a fixed number wherein an entire call is partitioned into N segments of equal length). For example if an agent speaks for the first 10 seconds of a call and a customer speaks for the next 15 seconds, text for the first turn may include the agent's speech from the first 10 seconds and text for the second turn may include the customer's speech from the next 15 seconds. Speech-to-text service 130 may be a service of a computing resource service provider. Speech-to-text service 130 may be accessed via a web service API request that accepts audio data (e.g., the data itself or a reference to such data) as an input and produces a text-based transcript (e.g., in a text file or other text-based file format). Speech-to-text service 130 may generate metadata for audio which can include periods of silence, cross-talk (e.g., where multiple speakers talk over each other), and more. Metadata may be included as part of a transcript output. Upon receiving requested call transcripts from speech-to-text service 130, the next step in the step functions workflow may be executed, and the job's status in metadata service 110 may be updated to indicate that calls have been successfully transcribed.

In at least one embodiment, text-based contacts data (e.g., transcripts generated by speech-to-text service 130 or text-based contacts data obtained from client data store 106) are analyzed using a natural language processing (NLP) service. In at least one embodiment, NLP service 132 is a service of a computing resource service provider. In at least one embodiment, NLP service 132 is in accordance with those described elsewhere in this disclosure, such as those discussed in connection with FIG. 2. In at least one embodiment, NLP service 132 uses artificial intelligence and/or machine learning techniques to perform sentiment analysis 120A, entity detection 120B, key phrase detection 120C, and various combinations thereof. In at least one embodiment, text-based contacts are organized by turns—for example, turns may alternate based on which party was speaking or typing on a contact. Each sentence spoken may correspond to a turn (e.g., successive turns may be from the same speaker). In at least some embodiments, each turn is analyzed separately for sentiment analysis 120A, entity detection 120B, key phrase detection 120C, and various combinations thereof. In some embodiments, for the text of a turn, sentiment analysis 120A, entity detection 120B, key phrase detection 120C, and various combinations thereof are processed in parallel by NLP service 132. In an embodiment, other natural language processing capabilities offered by NLP service 132 are utilized to analyze text-based contacts data. In at least one embodiment, sentiment analysis 120A, entity detection 120B, key phrase detection 120C, and various combinations thereof are executed as individual event-drive functions on a per-turn basis.

Sentiment analysis 120A may refer to analyzing text (e.g., a turn, being a portion of a text-based transcript of an audio recording) and determining one or more characteristics of the call. For example, sentiment analysis 120A of a statement may generate a sentiment score that indicates a sentiment of the statement in question was positive, neural, negative, or mixed. Sentiments may be separated by speaker. A sentiment score may be generated based on successive sentiments of a speaker—for example, if a customer's sentiment of a first turn is positive, it may be assigned an initial sentiment score value of +1; if the customer's sentiment on his/her next turn is still positive, the sentiment score may increase from +1 to +2, and so on. In some cases, sentiment scores are in a bounded range of values, such as between −5 and +5, such that additional positive turns after reaching a maximum sentiment score simply leaves the sentiment score at the maximum value. In some cases, sentiment score is reset when a neural or negative turn follows a positive run, and vice versa. Sentiment analysis 120A may be performed turn by turn in a synchronous manner for a chat log. Sentiment scores for individual turns can be used to generate an overall sentiment score for an entire call or chat.

Entity detection 120B may refer to detect entities in a document or text-based portion thereof. An entity may refer to a textual reference to the unique name of a real-world object such as people, places, and commercial items, and to precise references to measures such as dates and quantities. For example, in the text "Jane moved to 1313 Mockingbird Lane in 2012," "Jane" might be recognized as a PERSON, "1313 Mockingbird Lane" might be recognized as a LOCATION, and "2012" might be recognized as a DATE. For example, entity detection 120B may be used on a call transcript to identify products, dates, events, locations, organizations (e.g., competitors), persons, quantities, titles, and more. In at least some embodiments, NLP service 132 supports a set of default entities and furthermore supports adding custom entities. In at least some embodiments, a client can supply a set of training data which is used by NLP service 132 to train a neural network to recognize a custom entity.

Key phrase detection 120C may refer to finding key phrases in a document or text-based portion thereof. A key phrase may refer to a string that includes a noun phrase that describes a particular thing. A key phrase may comprise a noun and one or more modifiers that distinguish it. For example, "day" is a noun and "a beautiful day" is a noun phrase that includes an article ("a") and an adjective ("beautiful") describing the noun. In various embodiments, key phrases have scores that indicates the level of confidence that NLP service 132 has that the string is a noun phrase. In various embodiments, a turn (e.g., transcribed from audio recording) is parsed to identify key phrases which can be indexed and searched upon to perform diagnostics, trend and theme detection, and more.

NLP service 132 may be a service of a computing resource service provider that provides a set of web service API commands that can be used to identify key phrases from documents or other text-based data sources. In at least some embodiments, NLP service 132 offers a set of natural language processing capabilities such as 120A-120C illustrated in FIG. 1, which are merely illustrative of example capabilities offered by NLP service 132 and other natural language processing capabilities may be supported by NLP service 132. In some embodiments, an audio recording or audio call (e.g., real-time call) is transcribed using speech-to-text service 130 to generate a text-based transcript. As part of transcribing the audio source, the transcript may be organized by turns, which alternate when speakers change. An event-driven function may submit turns of a text-based transcript to NLP service 132 which provides sentiment scores for the turns. Analytics results generated by NLP service 132 may be aggregated and stored as a set of output file.

Upon performing analytics using NLP service, step functions workflow may further include a step to process analytics results 122. The analytics results processed may be outputs from the NLP service 132 described above. In at least one embodiment, the processing of the data includes translating the data into a human readable format. In at least one embodiment, sentiment scores are calculated based on sentiment analysis. Post processing steps such as categorization and translation of output data to a human-readable format (e.g., converting to JSON format) may be performed. The analytics may be processed to generate an output which is provided to the categorization step of the workflow. A human-readable medium or human-readable format may refer to a representation of data or information that can be naturally read by humans—in contrast, a machine-readable format may refer to a format that can be easily processed by a computer but difficult for a human to interpret (e.g., a bar code).

Categorization service 134 may be used to categorize documents 124. The documents may be the output generated by processing analytics results. Categorization service 134 may have access to a category store 136 that stores a set of categorization rules. Categories may be defined by client 104. Categorization service 134 may provide a set of default categories, such as determining when there are instances of prohibited words (e.g., use of profanity by agents). Categorization service 134 may generate a set of results including information on which categories were matched, as well as points of interest associated with those categories. These results may be encoded in an output file and the outputs may be written to data store 126. A client role may be assumed to store the output in client data store 106. Finally, the workflow may include a final step to emit events and/or metering 128 which may be used for billing and various other applications. Metrics emitter 138 may refer to a service, daemon, or any suitable monitoring component that may track the status of jobs. Metrics emitter 138 may track how long certain jobs have been pending and whether they have been pending at specific stages for longer than a specified time, indicating that there may be an issue with the job. Such jobs may be re-started, terminated, or notifications may be sent to client 104 alerting the client to investigate. Different stages may be expected to take different amounts of processing time—for example, transcribing audio to text may be particularly demanding compared to other steps in a workflow and may be expected to take longer than other steps. If a job fails, a contacts analytics output or transcript file is not generated, according to at least one embodiment. In at least one embodiment, if a customer start a new job with the same input parameters as an existing job, a new job with a new job id will be started and all intermediate outputs will be re-generated (e.g., step functions workflow is re-run in its entirety). In at least one embodiment, if NLP jobs succeed but individual documents in the NLP job fail, the job fails.

Figure 2:
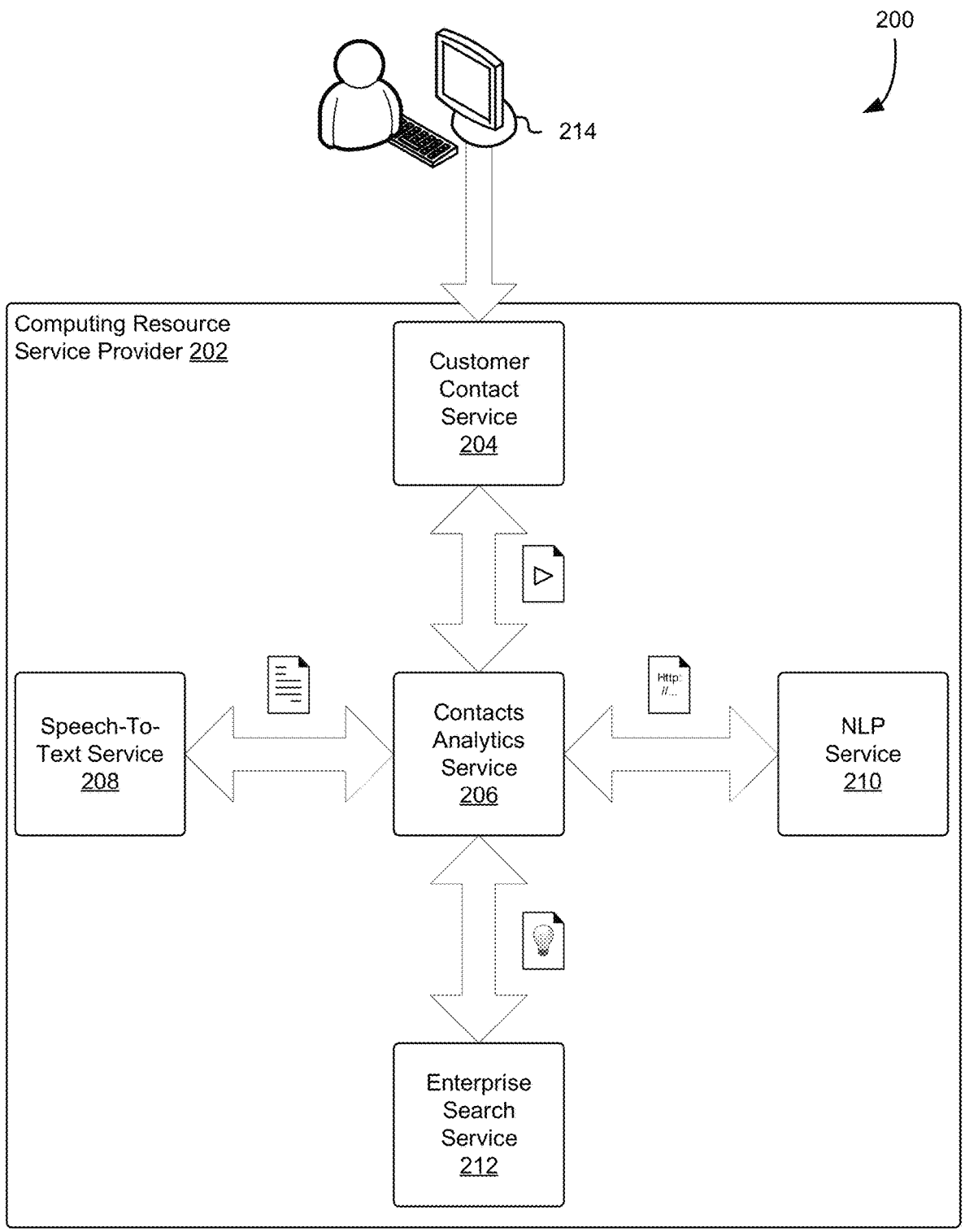
FIG. 2 shows an illustrative example of a computing environment in which various services are implemented within the context of a computing resource service provider, according to at least one embodiment.

FIG. 2 shows an illustrative example of a computing environment 200 in which various services are implemented within the context of a computing resource service provider 202, according to at least one embodiment. A computing resource service provider described herein may be implemented using techniques described in FIG. 27. In at least one embodiment, a computing resource service provider 202 offers computing capabilities to clients. For example, a computing resource service provider may implement various services such as a customer contact service 204, a contacts analytics service 206, a speech-to-text service 208, a natural language processing (NLP) service 210, an enterprise search service 212, and combinations thereof. Various additional services may be offered by computing resource service provider 202 which are not illustrated in FIG. 2 for the sake of clarity—for example, the computing resource service provider may further implement a data storage service, a compute service, a serverless compute service, an event-driven compute service, an authorization service, an authentication service, a data streaming service, and more. FIG. 2 illustrates a server architecture which may be used to implement various embodiments within the scope of this document.

In at least one embodiment, a computing resource service provider 202 provides various capabilities which can be access to clients such as client 214 via a network. The network may be any appropriate network, including an intranet, the Internet, a cellular network, a local area network, a satellite network or any other such network and/or combination thereof, and components used for such a system depend at least in part upon the type of network and/or system selected. A computing resource service provider may implement customer contact service 204 as a service which client 214 is able to interact with. Client 214 may interface with a service frontend which routes requests to customer contact service 204 which may be an example of a service backend.

Customer contact service 204 may be a service of computing resource service provider 202. A customer contact service described herein may be implemented using one or more servers, such as those described in connection with FIG. 27. Customer contact service 204 may be used by an organization to run a customer contact center. The customer contact service 204 may implement various capabilities related to facilitating customer contacts. For example, when a customer calls a phone number or initiates a chat, those calls and chats may be routed to customer contact service 204 and the customer contact service 204 may route the customer contact to an available agent. Customer contact service 204 may provide call and chat capabilities to agents via a graphical user interface which may also provide the agents with access to an organization's resources that can be used to help facilitate resolution of customer issues. In at least some embodiments, the agent is able to view an agent dashboard which provides suggestions to organization resources, knowledge bases, or suggested answers to customer questions. Agents may be employees of an organization. Customer contact service 204 may provide a supervisor dashboard or graphical user interface which supervisors can use to monitor the status of customer contacts by agents, including trend and theme detection and diagnostics capabilities. Customer contact service 204 may implement features described in connection with FIG. 1.

Contacts analytics service 206 may be a service of computing resource service provider 202. A contacts analytics service described herein may be implemented using one or more servers, such as those described in connection with FIG. 27. Customer contact service 204 may use contacts analytics service 206 to process contacts data such as audio calls (e.g., recordings or real-time audio stream) between agents and customers to identify issues. In some embodiments, contacts analytics service 206 is a software component or module implemented within customer contact service 204. Contacts analytics service may obtain contacts data (e.g., audio or text-based contacts data) and process the data to identify diagnostics, insights, and trends. Contacts data may, for example, be real-time data (e.g., streaming audio or on-going chat conversation) or recordings (e.g., audio recordings or chat logs).

In at least one embodiment, contacts analytics service 206 utilizes speech-to-text service 208. A speech-to-text service described herein may be implemented using one or more servers, such as those described in connection with FIG. 27. Contacts analytics services may obtain contacts data that includes audio data and provide such audio to speech-to-text service 208 to generate a transcript. The transcript may be organized by speaking turns and may read similarly to a chat log. Speech-to-text service 208 may obtain an audio waveform and parse the audio waveform by speaker (e.g., by parsing the waveform into an agent channel and customer channel). Speech-to-text service 208 may use a neural network such as recurrent neural networks (RNNs), deep neural networks (DNNs), variational autoencoders (VAEs), long short-term memory (LSTM) neural networks, convolutional neural networks (CNNs), and more to convert audio waveforms to text. Speech-to-text service 208 may be in accordance with those described elsewhere in this disclosure, such as those discussed in connection with FIG. 1.

Transcripts, chat logs, and other text-based contacts data may be provided by contacts analytics service 206 to NLP service 210. A NLP service described herein may be implemented using one or more servers, such as those described in connection with FIG. 27. NLP service parse text-based inputs to perform various natural language processing techniques such as those described in connection with FIG. 1. For example, chat logs may be organized into turns and each turn may be provided to NLP service 210 to determine a sentiment of the turn. Sentiments can be used to determine the overall mood and progression of a conversation—for example, if the sentiment of a customer starts out as negative and trends positive after successive turns, then that contact may be considered a good contact. However if a customer's sentiment trends negative and ends negative at the end of a customer contact, that may indicate that there was a difficulty with the contact and may require additional investigation by a supervisor. NLP service 210 may perform entity and key phrase detection to identify important aspects of customer contacts. NLP insights may be encoded in an output file or response that is provided to contacts analytics service 206. In some cases, NLP service 210 parses contacts data and generates suggestions to questions or issues presented by customers as part of a real-time agent assistance feature. For example, NLP service 210 may parse a customer's turn to detect key phrases and entities that indicate that the customer is having trouble with a product and is requesting a return. NLP service 210 may generate suggested responses, such as troubleshooting steps, which may be surfaced to an agent via customer contact service 204.

Contacts analytics service 206 may interface with enterprise search service 212. An enterprise search service described herein may be implemented using one or more servers, such as those described in connection with FIG. 27. Enterprise search service 212 may have access to an organization's internal documents such as FAQs and knowledge bases. For example, an organization may have internal documents on where produce is sourced, sustainability practices, and other information, which may be stored in various FAQs—a customer can ask those questions in multiple ways. Enterprise search service 212 may be used to parse customer questions and maps those questions to the most appropriate FAQs. Enterprise search service 212 may use machine learning techniques to make context-aware search recommendations. For example, a customer may ask whether an organization's retail stores are open on a particular day. Enterprise search service 212 may determine the customer's geolocation, and use geolocation to determine store hours in the customer's vicinity, including whether the particular day is on a holiday which may affect typical store hours. Enterprise search service 212 may make a determination of the specific context of the question, so it returns a specific answer—for example, that stores in the USA may be closed on Thanksgiving Day, but are opened the following day (Black Friday) at midnight. In at least some embodiments, enterprise search service 212 searches for the most relevant documents based on what was asked. Enterprise search service 212 may be implemented using elastic search and machine learning and/or artificial intelligence techniques.

Client 214 may refer to a client computing device or a user of a client computing device. Client 214 may, for example, refer to an agent or supervisor of an organization that is a customer to a computing resource service provider. Client 214 may submit a request for access to various computing resources (e.g., services or computing resources thereof) of computing resource service provider 202. The request, in some examples, is a web service application programming interface request (also referred to simply as a web service request), may be received by a service frontend. The service frontend may be a system comprising a set of web servers (e.g., a single web server or a set of web servers which may be managed by a load balancer). Web servers of the frontend may be configured to receive such requests and to process them according to one or more policies associated with the service. Web servers or other components of the frontend may be configured to operate in accordance with one or more SSL and/or TLS protocols, such as referenced herein. The request for access to the service may be a digitally signed request and, as a result, may be provided with a digital signature. The service frontend may then send the request and the digital signature for verification to an authentication service. Customer contact service 204 may be used to implement various GUI-based dashboard to client 214, such as those described in connection with FIGS. 4-17.

Figure 3:
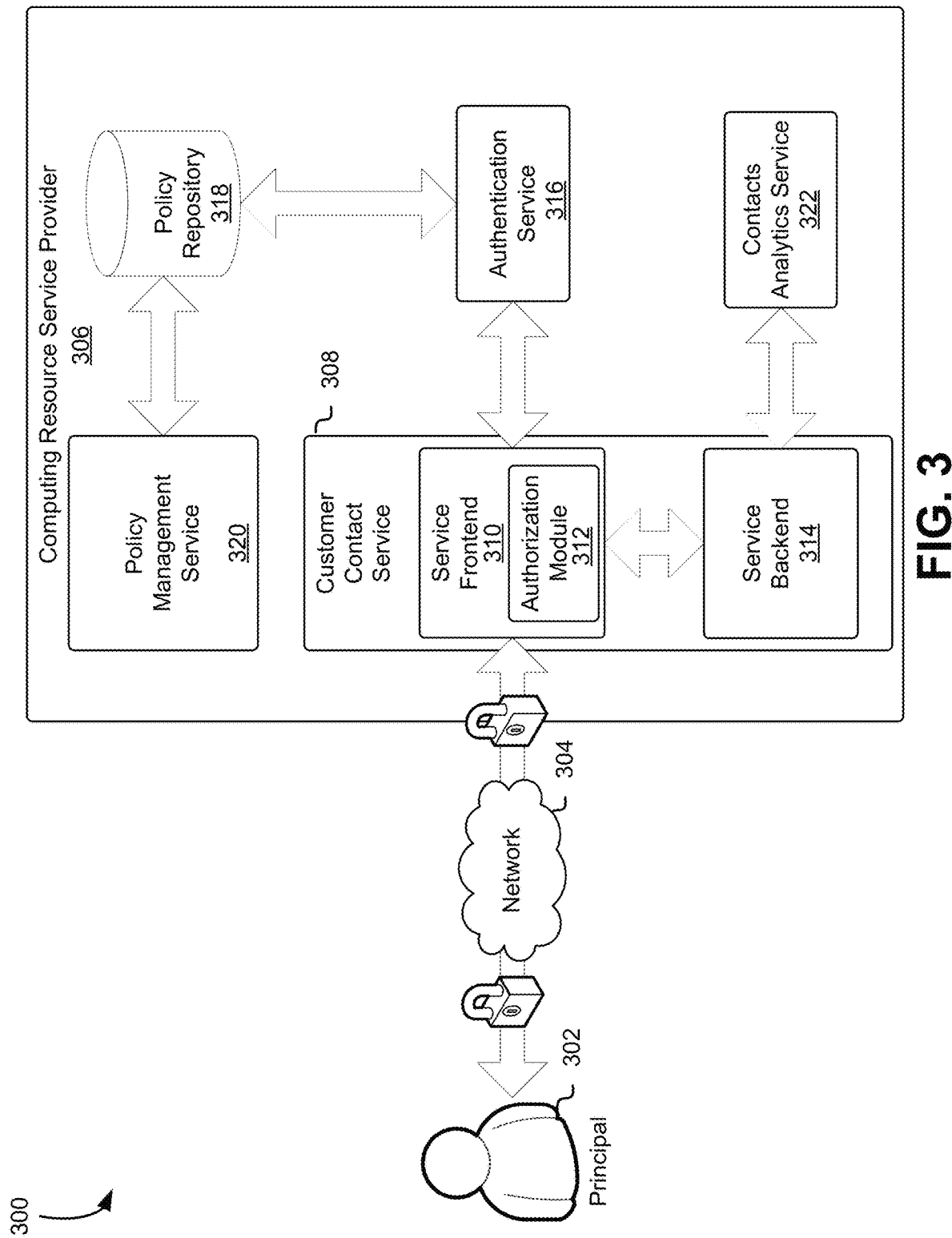
FIG. 3 is an illustrative example of an environment in which various embodiments of the present disclosure can be practiced.

FIG. 3 is an illustrative example of an environment 300 in which various embodiments of the present disclosure can be practiced. In an embodiment, a principal 302 may use a computing device to communicate over a network 304 with a computing resource service provider 306. Principal 302 may be a client such as those described elsewhere in this disclosure. For example, principal 302 may be an employee of an organization (e.g., agent, supervisor, engineer, system administrator, data scientist) that accesses a customer contact service 308 for various reasons, such as to make customer contacts, manage customer contacts, analyze themes and trends in customer contacts, develop insights into customer contacts, and more. Communications between the computing resource service provider 306 and the principal 302 may, for instance, be for the purpose of accessing a customer contact service 308 operated by the service provider 306, which may be one of many services operated by the service provider 306. The customer contact service 308 may comprise a service frontend 310 and a service backend 314. The principal 302 may issue a request for access to a customer contact service 308 (and/or a request for access to resources associated with the customer contact service 308) provided by a computing resource service provider 306. The request may be, for instance, a web service application programming interface request. The principal may be a user, or a group of users, or a role associated with a group of users, or a process representing one or more of these entities that may be running on one or more remote (relative to the computing resource service provider 306) computer systems, or may be some other such computer system entity, user, or process. Generally, a principal is an entity corresponding to an identity managed by the computing resource service provider, where the computing resource service provider manages permissions for the identity. Note, however, that embodiments of the present disclosure extend to identities not managed by the computing resource service provider, such as when identities are anonymous or otherwise unspecified. For example, a policy may apply to anonymous principals.

The principal 302 may correspond to an identity managed by the computing resource service provider 306, such as by the policy management service or another service. The identity may be one of multiple identities managed for an account of a customer of the computing resource service provider, and the computing resource service provider may manage accounts for multiple customers. Note that, while the principal 302 may correspond to a human, such a human may communicate with the computing resource service provider 306 through a suitably configured computing device which may perform operations (e.g., generation and transmission of requests) on behalf of the principal 302. The principal 302 may communicate with the computing resource service provider 306 via one or more connections (e.g., transmission control protocol (TCP) connections). The principal 302 may use a computer system client device to connect to the computing resource service provider 306. The client device may include any device that is capable of connecting with a computer system via a network, such as example devices discussed below. The network 304 may include, for example, the Internet or another network or combination of networks discussed below.

The computing resource service provider 306, through the customer contact service 308, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments. Note that such services and resources are provided for the purpose of illustration and embodiments of the present disclosure may utilize other services and/or resources.

The request for access to the customer contact service 308 which, in some examples, is a web service application programming interface request (also referred to simply as a web service request), may be received by a service frontend 310. The service frontend 310 may be a system comprising a set of web servers (e.g., a single web server or a set of web servers which may be managed by a load balancer). Web servers of the frontend 310 may be configured to receive such requests and to process them according to one or more policies associated with the customer contact service 308. Web servers or other components of the frontend 310 may be configured to operate in accordance with one or more SSL and/or TLS protocols, such as referenced herein. The request for access to the customer contact service 308 may be a digitally signed request and, as a result, may be provided with a digital signature. The service frontend 310 may then send the request and the digital signature for verification to an authentication service 316. The authentication service 316 may be a stand-alone service or may be part of a service provider or other entity. The authentication service 316, in an embodiment, is a computer system configured to perform operations involved in authentication of principals. In some examples, requests submitted to the service frontend 310 are digitally signed by the principal (i.e., by a computing device used by or operating on behalf of the principal) using a symmetric cryptographic key that is shared between the principal 302 and the authentication service 316. The authentication service, therefore, may use a copy of the symmetric cryptographic key to verify digital signatures of requests purported to have been generated by the principal 302. However, in other embodiments, the authentication service 316 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 302 corresponding to the private cryptographic key. Consequently, in some embodiments, the authentication service may use a public cryptographic key specified by the certificate. Generally, the authentication service may utilize a cryptographic key that is registered with the authentication service 316 in association with the principal 302.

Upon successful authentication of a request, the authentication service 316 may then obtain policies applicable to the request. A policy may be a set of information that defines a set of permissions with respect to a set of resources. An access control policy may be a type of policy that is associated with access to resources and specifies a set of cipher suites suitable for accessing the resources. The policy may be applicable to the request by way of being associated with the principal 302, a resource to be accessed as part of fulfillment of the request, a group in which the principal 302 is a member, a role the principal 302 has assumed, and/or otherwise. To obtain policies applicable to the request, the authentication service 316 may transmit a query to a policy repository 318 managed by a policy management service 320, which may be the policy management service discussed above in connection with FIG. 1. The query may be a request comprising information sufficient to determine a set of policies applicable to the request. The query may, for instance, contain a copy of the request and/or contain parameters based at least in part on information in the request, such as information identifying the principal, the resource, and/or an action (operation to be performed as part of fulfillment of the request). The policy repository, which may be a database or other system operable to process queries, may process the query by providing any policies applicable to the request. Note that, if authentication of the request is unsuccessful (e.g., because a digital signature could not be verified), policies applicable to the request may not be obtained.

Having obtained any policies applicable to the request, the authentication service 316 may provide an authentication response and, if applicable (e.g., when there is a positive authentication response), the obtained policies back to the service frontend 310. The authentication response may indicate whether the response was successfully authenticated. The service frontend 310 may then check whether the fulfillment of the request for access to the customer contact service 308 would comply with the obtained policies using an authorization module 312.

An authorization module 312 may be a process executing on the service frontend that is operable to compare the request to the one or more permissions in the policy to determine whether service is authorized to satisfy the request (i.e., whether fulfillment of the request is authorized). For example, the authorization module may compare an API call associated with the request against permitted API calls specified by the policy to determine if the request is allowed. If the authorization module 312 is not able to match the request to a permission specified by the policy, the authorization module 312 may execute one or more default actions such as, for example, providing a message to the service frontend that causes the service frontend to deny the request, and causing the denied request to be logged in the policy management service 320. If the authorization matches the request to one or more permissions specified by the policy, the authorization module 312 may resolve this by selecting the least restrictive response (as defined by the policy) and by informing the service frontend whether the fulfillment of the request is authorized (i.e., complies with applicable policy) based on that selected response. The authorization module 312 may also select the most restrictive response or may select some other such response and inform the service frontend whether the fulfillment of the request is authorized based on that selected response. Note that, while FIG. 3 shows the authorization module 312 as a component of the service frontend 310, in some embodiments, the authorization module 312 is a separate service provided by the computing resource service provider 306 and the frontend service may communicate with the authorization module 312 over a network.

Service frontend 310 may be configured to communicate with a service backend 314 that may be used to access one or more computing resources. For example, service backend 314 may have access to a contacts analytics service 322 which may be implemented in accordance with techniques described elsewhere such as those discussed in connection with FIGS. 1, 2, 18, and 19. In some embodiments, client requests are received at service frontend 310 and fulfilled at least in part by service backend 314 routing the request (or generating a second request based on the client request) to another service of computing resource service provider 306. Service backend 314 may have access to computing resources such as a data storage service which service backend 314 uses to store contacts data to a client bucket or storage location.

In some examples, access control information stored in a policy or resource metadata repository is associated with resources and specifies a set of cipher suites suitable for the resources. For a particular resource, the access control information may specify or otherwise indicate a set of cipher suites such that, to fulfill an API request received over a cryptographically protected communications session and involving the resource, the cryptographically protected communications session must utilize a cipher suite in the set. The set may be specified explicitly (e.g., with an identifier for each cipher suite in the set and/or an identifier for the set), implicitly (e.g., with a security level for the resource), and/or otherwise. As with other access control information, the access control information may specify conditions involving when requirements regarding cipher suites apply, such as which API requests the requirements apply to (i.e., which type(s) of requests), which may be all API requests whose fulfillment involves access to the resource, which principals the requirements apply to (which may be all principals), and other requirements. In some examples, access control information specifies conditions involving contextual information which, for an API request, may include a source network address (e.g., source Internet Protocol (IP) address), a time of day when the request is submitted, a network from which the request is submitted (e.g., an identifier of a private network or a subnet of a private network), and other information. In one example, a source network address of an API request may be mapped to a geographic location (which may be defined in various ways, such as in accordance with geopolitical boundaries and/or legal jurisdictions) and applicability of one or more conditions may apply to the geographic location. For instance, certain geographic locations may require certain cipher suites be in use for fulfillment of certain requests (e.g., requests whose fulfillment involves access to certain resources).

Note that, while FIG. 3 shows a particular configuration of a distributed system of a computing resource service provider, other configurations are also considered as being considered within the scope of the present disclosure. For example, authentication and authorization determinations may be made by different components of a distributed system (e.g., the service frontend 310). As another example, applicable request-mapping rules and authorization rules may be stored in the policy repository and part of obtaining applicable policy may include application of the request-mapping rules to determine the proper authentication rules.

As described throughout this document, such as in connection with FIG. 1, an output file may be generated by a contacts analytics service. For example, a contacts analytics service may cause a step functions workflow to be triggered which generates an output file that is compiled from the use of other services such as transcription services (e.g., a speech-to-text service) and analytics services (e.g., a natural language processing service). A contacts analytics output file—which may be referred to simply as an output file or transcript based on context—my refer to an output file or object that is vended when a contacts analytics job (e.g., job illustrated in FIG. 1) completes. In at least one embodiment, a contacts analytics output comprises information about a job such as input metadata, the call or chat transcript, sentiment, key phrases, entities, categories, and additional derived metrics such as non-talk time, talk speed, etc. In at least one embodiment, a contacts analytics service writes an output file to a customer contact service's data bucket. In at least some embodiments, the output file is used to facilitate customer contacts searches and detailed contact trace record (CTR) pages, such as those described in connection with FIGS. 12-13. In some embodiments, contacts analytics service writes an output file to a customer contact service's data storage bucket and the output file is then copied to a customer's data storage bucket (e.g., organization's data storage bucket) and the customer may perform subsequent business intelligence (BI), machine learning, or aggregate the customer analytics output data with other data of the organization.

In various embodiments, a contacts analytics output file includes some or all end-customer-specified inputs to a request to start an analytics jobs. Examples of customer-specific inputs may include a language code which can be used by a downstream NLP service to determine the language in which to use. In various embodiments, internal input parameters which are used by a customer contact service and downstream services and which are not exposed to the end customer may be omitted from the output file. Examples of internal input parameters may a data access role resource name (RN) and the input data configuration which points to a network location of a data storage bucket owned by a customer contact service (note that this network location is different from the customer's data storage bucket).

A contacts analytics output file may, in various embodiments, be zipped before being saved (e.g., copied) to a customer's data bucket. In some cases, multiple contacts analytics output files are aggregated to one zipped file. In some cases, in a zipped file includes a single contacts analytics output file and multiple zipped files may be saved to a customer's data bucket.

In at least one embodiment, a contacts analytics output file generated from an audio source (e.g., audio recording) may be represented as, or based on, the following:

```
{
    "Participants": {
        "52b61899-1f78-4253-8072-fbda7f7b9072": "AGENT",
        "4A20212C": "CUSTOMER"
    }
    "Channel": "VOICE",
    "AccountId": 467045747823,
    "JobId": "2fe2d2a1-6770-4188-a43a-8535485e1554",
    "JobStatus": "COMPLETED",
    "LanguageCode": "en-US",
    "CustomModels": [
        {
            "Type": "TRANSCRIPTION_VOCABULARY",
            "Name": "MostCommonKeywordsTranscriptionV1"
        },
        {
            "Type": "TEXT_ANALYSIS_ENTITIES",
            "Name": "Top100EntitiesV2"
        }
    ],
    "CustomerMetadata": {
        "InputSvcUri": "svc://connect-747d90ef9/connect/poc-1/CallRecordings/2019/07/
        "ContactId": "75c88693-4782-4b27-a5f9-fc45a8ee7616",
        "InstanceId": "fe9e4e32-17fb-40a8-b027-5a1a65d1acb0"
    },
    "Transcript": [
        {
            "ParticipantId": "52b61899-1f78-4253-8072-fbda7f7b9072",
            "MessageId": "sldkgldk-3odk-dksl-hglx-3dkslgld",
            "Content": "Hello, my name is Jane, how may I assist you?",
            "BeginOffsetMillis": 0,
            "EndOffsetMillis": 300,
            "Sentiment": "NEUTRAL",
```

```
            "Entities": [
                {
                    "Text": "Jane",
                    "Type": "PERSON",
                    "BeginOffsetCharacters": 15,
                    "EndOffsetCharacters": 20
                }
            ]
        },
        {
            "ParticipantId": "4A20212C",
            "MessageId": "l40d9sld-dlsk-z;xl-dlwl-38222ldl",
            "Content": "I'm having trouble accessing my Foobar Application account today.
            "BeginOffsetMillis": 500,
            "EndOffsetMillis": 945,
            "Sentiment": "NEGATIVE",
            "Entities": [
                {
                    "Text": " Foobar Application",
                    "Type": "TITLE",
                    "BeginOffsetCharacters": 32,
                    "EndOffsetCharacters": 47
                },
                {
                    "Text": "today",
                    "Type": "DATE",
                    "BeginOffsetCharacters": 56,
                    "EndOffsetCharacters": 61
                }
            ],
            "KeyPhrases": [
                {
                    "Text": "trouble",
                    "BeginOffsetCharacters": 11,
                    "DndOffsetCharacters": 18
                },
                {
                    "Text": "my Foobar Application account",
                    "BeginOffsetCharacters": 29,
                    "EndOffsetCharacters": 55
                },
                {
                    "Text": "today",
                    "BeginOffsetCharacters": 56,
                    "EndOffsetCharacters": 61
                }
            ]
        }
    ],
    "Categories": {
        "MatchedCategories": [ "Swearing", "Interruptions" ],
        "MatchedDetails": {
            "Swearing": {
                "PointsOfInterest": [
                    {
                        "BeginOffsetMillis": 0,
                        "EndOffsetMillis": 300
                    },
                    {
                        "BeginOffsetMillis": 360,
                        "EndOffsetMillis": 500
                    }
                ]
            },
            "Interruptions": {
                "PointsOfInterest": [
                    {
                        "BeginOffsetMillis": 0,
                        "EndOffsetMillis": 500
                    },
                    {
                        "BeginOffsetMillis": 360,
                        "EndOffsetMillis": 500
                    }
                ]
            }
        }
    },
```

```
"ConversationCharacteristics": {
    "TotalConversationDurationMillis": 7060,
    "NonTalkTime": {
        "TotalTimeMillis": 172,
        "Instances": [
            {
                "BeginOffsetMillis": 3,
                "EndOffsetMillis": 60,
                "DurationMillis": 57
            },
            {
                "BeginOffsetMillis": 45,
                "EndOffsetMillis": 160,
                "DurationMillis": 115
            }
        ]
    },
    "TalkTime": {
        "TotalTimeMillis": 90000
        "DetailsByParticipant": {
            "52b61899-1f78-4253-8072-fbda7f7b9072": {
                "TotalTimeMillis": 45000
            },
            "4A20212C": {
                "TotalTimeMillis": 45000
            }
        }
    },
    "TalkSpeed": {
        "DetailsByParticipant": {
            "52b61899-1f78-4253-8072-fbda7f7b9072": {
                "AverageWordsPerMinute": 34
            },
            "4A20212C": {
                "AverageWordsPerMinute": 40
            }
        }
    },
    "Interruptions": {
        "TotalCount": 2,
        "TotalTimeMillis": 34,
        "InterruptionsByInterrupter": {
            "52b61899-1f78-4253-8072-fbda7f7b9072": [
                {
                    "BeginOffsetMillis": 3,
                    "EndOffsetMillis": 34,
                    "DurationMillis": 31
                },
                {
                    "BeginOffsetMillis": 67,
                    "EndOffsetMillis": 70,
                    "DurationMillis": 3
                }
            ]
        }
    },
    "Sentiment": {
        "OverallSentiment": {
            "52b61899-1f78-4253-8072-fbda7f7b9072": 3,
            "4A20212C": 4.2
        },
        "SentimentByPeriod": {
            "QUARTER": {
                "52b61899-1f78-4253-8072-fbda7f7b9072": [
                    {
                        "BeginOffsetMillis": 0,
                        "EndOffsetMillis": 100,
                        "Score": 3.0
                    },
                    {
                        "BeginOffsetMillis": 100,
                        "EndOffsetMillis": 200,
                        "Score": 3.1
                    },
                    {
                        "BeginOffsetMillis": 200,
                        "EndOffsetMillis": 300,
                        "Score": 3.6
                    },
```

```
        {
            "BeginOffsetMillis": 300,
            "EndOffsetMillis": 400,
            "Score": 3.1
        }
    ],
    "4A20212C": [
        {
            "BeginOffsetMillis": 0,
            "EndOffsetMillis": 100,
            "Score": 3.1
        },
        {
            "BeginOffsetMillis": 100,
            "EndOffsetMillis": 200,
            "Score": 3.2
        },
        {
            "BeginOffsetMillis": 200,
            "EndOffsetMillis": 300,
            "Score": 3.6
        },
        {
            "BeginOffsetMillis": 300,
            "EndOffsetMillis": 400,
            "Score": 3.6
        }
    ]
            }
        }
      }
   }
}
```

Figure 25:
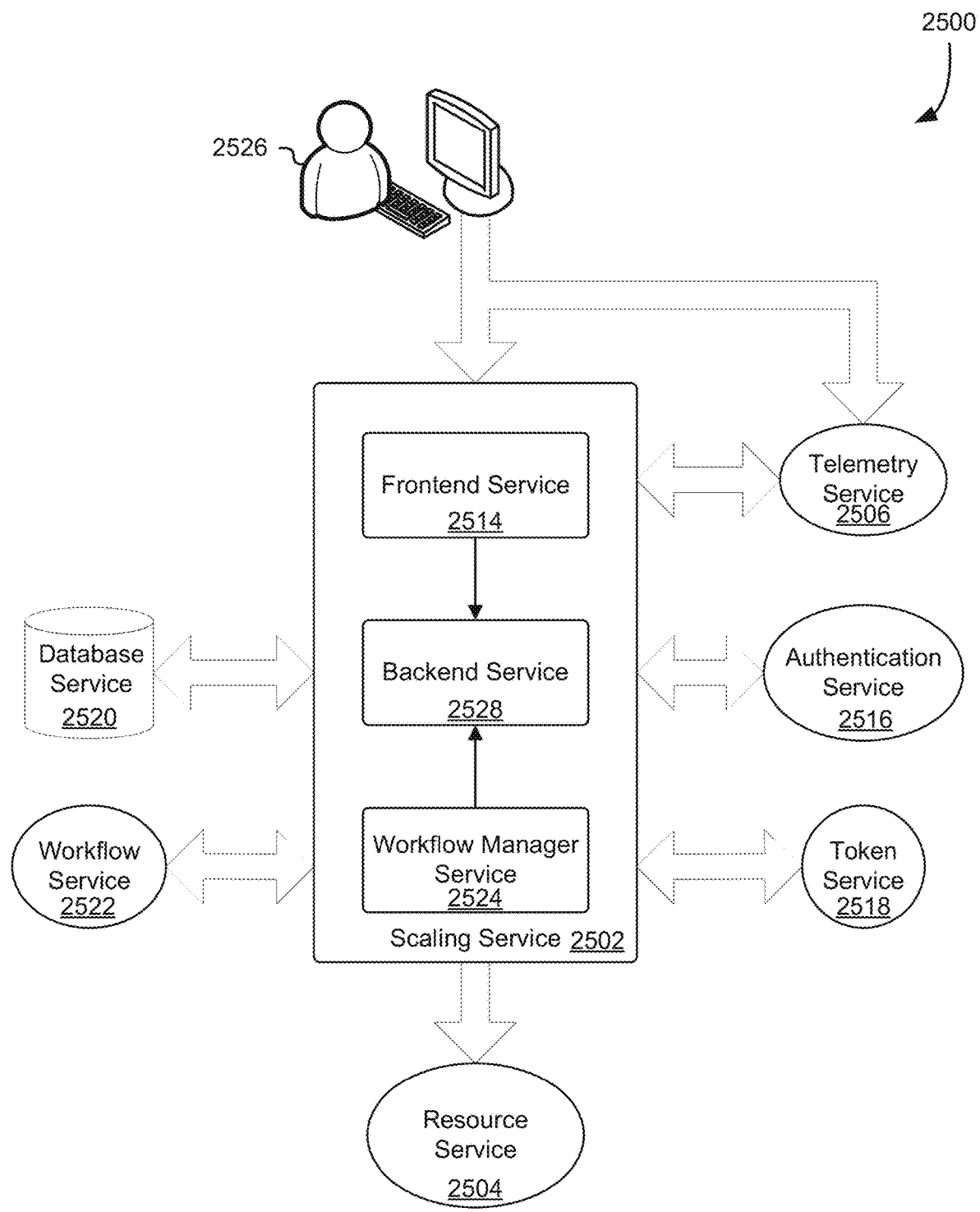
FIG. 25 illustrates system architecture of a scaling service that may interact with other services in an environment, in accordance with at least one embodiment.

In various embodiments, a client submits a contacts analytics job and a workflow such as those described in connection with FIGS. 1 and 25 is used to coordinate execution of a step functions workflow that generates a contacts analytics output or transcript, as shown above for an audio contacts data source.

In at least some embodiments, a contacts analytics output file or transcript file is encoded in a human-readable format (e.g., JSON) and may have one or more of the following fields. It should be noted that the fields described herein are merely illustrative, and other nomenclature may be used to represent the fields described herein. A channel may refer to the modality of a customer contact. For example, a channel field may be chat, voice call, video call, and more. For example, an accountId field may represent the end customer's account identifier and may be distinguishable from an account identifier associated with the customer contact service account which submits a job. For example, a jobId field may be a job identifier which serves as a unique identifier that resolves to a particular contacts analytics job and can be used to disambiguate one job from another.

In at least some embodiments, a contacts analytics output file or transcript file includes a transcript field that is partitioned by sentences for calls, and by messages (may be multi-sentence) for chats. A transcripts filed may include both the transcript text as well as any segment-level metrics that are generated—for example, by a NLP service. In various embodiments, chat messages don't have duration field whereas audio has a duration field that indicates how long it took for a particular sentence or turn took. Chats may have a single field, absoluteTimestamp, and calls may have two fields—relativeOffsetMillis and durationMillis. For example, BeginOffsetMills/EndOffsetMillis fields may refer to offsets in milliseconds from the beginning of the audio, end of audio. For example, absoluteTime field may refer to an ISO8601 formatted absolute timestamp to the millisecond a message was sent. In at least one embodiment, only one of absoluteTime or relativeOffsetMillis is needed. For example, beginOffsetCharacters/endOffsetCharacters fields in the entities/key phrases output may refer to the character offsets in a particular portion of a transcript where the entity or key phrase begins. For example, a categories field may refer to a list of categories which the conversation triggered.

In at least one embodiment, a contacts analytics output file generated from a text-based source (e.g., chat log) may be represented as, or based on, the following:

```
{
    "Channel":"chat",
    "Transcript":[
        {
            "ParticipantId":"52b61899-1f78-4253-8072-fbda7f7b9072",
            "Message_id":"sldkgldk-3odk-dksl-hglx-3dkslgld",
            "Content":"Hello, my name is Jane, how may I assist you?",
            "AbsoluteTime":"2019-07-23T13:01:53.23",
            "BeginOffsetMillis":500,
            "EndOffsetMillis":945
        },
```

```
{
    "ParticipantId":"4A20212C",
    "Message_id":"l40d9sld-dlsk-z;xl-dlwl-38222ldl",
    "Content":"I'm having trouble accessing my Foobar Application account today.",
    "AbsoluteTime":"2019-07-23T13:01:53.23",
    "BeginOffsetMillis":1014,
    "EndOffsetMillis":1512
  }
],
"Categories":{
    "Swearing":{
      "IsRealTime":true,
      "StartAndEndAbsoluteTime":[
        {
          "StartAbsoluteTime":"2019-07-23T13:01:53.23",
          "EndAbsoluteTime":"2019-07-23T13:01:53.23"
        },
        {
          "StartAbsoluteTime":"2019-07-23T13:01:53.23",
          "EndAbsoluteTime":"2019-07-23T13:01:53.23"
        }
      ]
    },
    "Interruptions":{
      "IsRealTime":true,
      "StartAndEndAbsoluteTime":[
        {
          "StartAbsoluteTime":"2019-07-23T13:01:53.23"
        },
        {
          "StartAbsoluteTime":"2019-07-23T13:01:53.23"
        }
      ]
    }
  }
}
```

Customer contact service may have a concept of call recordings—once a customer call recording finishes, customer contact service may take that audio file and perform all of this analysis with various backend services such as transcribing the audio to text and running natural language processing algorithms on the text. In some cases, contacts analytics service also performs its own post-processing and generate an output file, such as described above, which is saved to a data bucket of the customer contact service. Customer contact service may then copy that output into a customer's data bucket and the customer may take the contacts analytics output and ingest it in their application for various use cases. As a first example, customers (e.g., organizations) can ingest contacts analytics output files in their elastic search cluster (e.g., for keyword search to see how often agents comply with certain categories). As a second example the contacts analytics data can be exported by customers so that they can combine this data with other data sets and aggregate the data—an example of this may be that contacts analytics data is used to determine how often an agent complies with an organization's greetings category, which is combined with other organization data such as how often the agent was tardy to work to create an agent score card using additional metadata that an organization may store internally.

Figure 5:
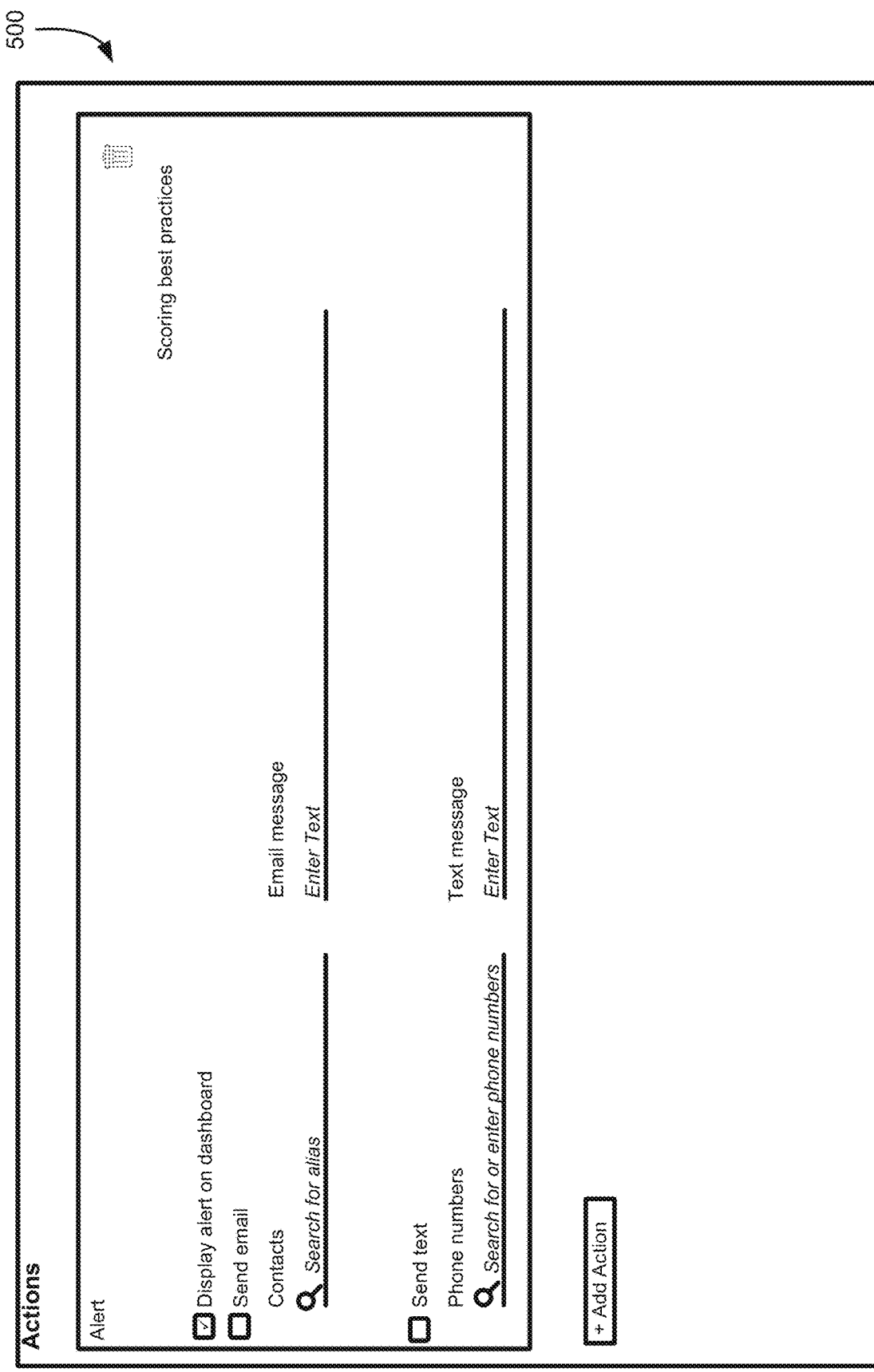
FIG. 5 illustrates at least a portion of a graphical user interface that can be used to manage categories, according to at least one embodiment.

FIGS. 4 and 5 may collectively illustrate a graphical user interface that can be used to manage categories. For example, FIGS. 4 and 5 may be presented to a client of a customer contact service that utilizes a contacts analytics service as a backend service. In at least some embodiments, a first part 400 and second part 500 of a categories UI is illustrated in FIGS. 4 and 5. In at least one embodiment, a client such as a supervisor, QA specialist, or other member of an organization may use the GUI described in FIGS. 4 and 5 to generate categories. Customer contacts may be processed to determine which categorization rules are met in particular customer contacts. Categories may apply to various types of customer contacts of various modalities, including but not limited to audio and chat interactions with customers of an organization.

FIGS. 4 and 5 as illustrated may include various UI elements, which may be illustrated in the thickened lines and text. While a text-based GUI is illustrated for clarify, graphics and other types of graphical icons may be utilized. Categories may be persisted and managed by a categorization service and/or category data store, which may be in accordance with techniques described in connection with FIG. 1. In at least one embodiment, a contacts analytics service interfaces with a categorization service as backend services to support features presented to a user via a customer contact service.

In a first part 400 of a categorization UI, the UI may allow a user to create new categories, manage existing categories, such as by editing or copying existing categories, or deleting existing categories. For example, FIG. 4 illustrates the creation of a new category. A user may type in a name of a category—for example, in FIG. 4, the category being created is named "Improper Greetings" category and may be a rule that is used to detect when agents of an organization are not properly greeting subscribing customers in accordance with the organization's internal processes. Italicized text as illustrated in FIG. 4 may refer to input fields in which a user can type in a custom text string.

A category may support rules-based categorization where a user can specify a set of criteria for when a category is met. For example, a category may be keyed on certain attributes being true or false. For example, as illustrated in FIG. 4, an attribute may have a type, a specific attribute (options of which may vary based on the selected type), a matching criteria, and a value. As shown in FIG. 4, a category may be applied when an external type with attribute member status is equal to subscriber, meaning that member status indicates that a contact is with a subscriber. Attributes may specify various properties of customer contacts so that only customer contacts that meet the attributes of a category are tagged as such. A drop-down menu or text input box may be used by the user to specify various properties of an attribute.

Attributes may be combined using various Boolean operators. For example, FIG. 4 illustrates a second attribute specifying that if a system queue is a subscribers queue, then the second attribute is matched. A Boolean operator "Or" combines the two attributes, such that a condition is satisfied if either the first attribute (encoding a first condition that a customer is a subscriber) or second attribute (the contact is from a subscribers queue) is met. The order in which various conditions are evaluated may be performed in any suitable order, as determined by a categorization service, such that it is not necessarily the case that the standard order of operations is always honored.

FIG. 4 further illustrates key words and phrases. Keywords and phrases may refer to specific keywords and phrases that are searched upon in customer contacts in connection with criteria defined under the keywords and phrases. In various embodiments, an analytics service may perform natural language processing to extract keywords and phrases from a contacts data source such as a call recording or chat log. FIG. 4 illustrates. As illustrated in FIG. 4, a user can specify that a category is met when a key word or phrase is included or is not included during a specified time range. The specified time range may, for example, be the first portion of a call, the last portion of a call, anywhere in the call, or numerous other variations. FIG. 4 illustrates a category to detect improper greetings when the phrases "Thanks for being a subscriber" or "We value you as a subscriber" are not spoken by the agent within the first 30 seconds of a call. In some embodiments, substantially similar variations of the specified keywords or phrases may be sufficient (e.g., they are treated equivalently). Whether a particular phrase is sufficiently similar to a specified keyword or phrase may be determined using natural language processing to determine whether the two have similar syntactic meaning. For example, if an agent speaks "Thank you for being a subscriber" it may be determined to be substantially similar to the specified phrase "Thanks for being a subscriber" and therefor meet the phrase specified in FIG. 4. Different keyword and phrases can be specified for different speakers. Users may add and remove keywords and phrases. In some cases, there is a maximum number of keywords and phrase the user can add.

FIG. 5 may illustrate a second part 500 of a categories UI. FIG. 5 illustrates various actions that can be taken if category rules such as those described in connection with FIG. 4 are met. For example, if a Boolean rule is evaluated to be TRUE, then the alert illustrated in FIG. 4 may be triggered. For example, an alert may send an email, send a text message, or display an alert in a supervisor or agent dashboard. In at least one embodiment, an agent is prompted with a reminder to thank a customer for being a subscriber.

An alert may be displayed in a supervisor dashboard for various categories. For example, a dashboard such as those described in connection with FIGS. 12 and 13 may surface information as to which customer contacts met certain categories. Supervisors may filter by category to determine, for example, which agents failed to properly greet subscribing customers. The supervisor's dashboard may include additional information such as sentiment scores which can be used for performing business intelligence or analytics. For example, an organization can collect aggregated data across multiple agents over a period of time to determine whether greeting customers in a particular manner (e.g., thanking subscriber at the start of a call) results in higher customer sentiment. In at least one embodiment, an alert can be sent to a supervisor using a notification service, which may push a notification to a queue which can be obtained by subscribing supervisors. In various embodiments, categories can be defined based on content of communications as well as acoustic characteristics in the case of audio contacts. For example, calls may be categorized to identify instances of long silence, talking too fast, interruptions, more.

FIG. 6 illustrate a contact search page 600, in accordance with at least one embodiment. A supervisor may have access to contact search page 600 through a graphical user interface (e.g., webpage) exposed by a customer contact service such as those described elsewhere in this disclosure, such as those discussed in connection with FIGS. 1 and 2. Data generated by a contacts analytics service may be indexed and used to identify contacts that meet a particular search query. Contact search page 600 may be used to perform ad hoc analysis and post hoc analysis for analysis. Contact search may also be used to discover themes and trends which may not have been.

Contact search page 600 may be a graphical interface that is accessible to clients of a customer contact service (e.g., scoped to supervisors or a defined set of permissioned users). Contact search page, in at least one embodiment, allows a client of a customer contact service to search through all contacts (e.g., any interactions between customer and agent, regardless of modality). In various embodiments, contacts search page 600 supports a rich set of search parameters beyond agent name and contact identifier (e.g., a unique identifier assigned to a contact) such as searching by keyword. For example, if a supervisor has an impression that there has been a lot of account login issues, then he or she can search for customer contacts that include the words "account is locked" or "can't access my account" in keywords and as a supervisor you can look into issues with that. Similarly, contact search page can also be scoped to a particular agent, customer, or event particular contact identifier. In at least some embodiments, conversation characteristics from output calls for silent, non-talk time, cross-talk, etc. can also be searched upon. In some embodiments, contact search page 600 includes additional search parameters not illustrated in FIG. 6, such as capabilities to search by categories. Search results may be displayed in accordance with some or all of FIGS. 7-10.

Pressing the "Search contacts" button may initiate a search of some or all contacts data of a client such as an organization. The search may be initiated by a client computing device, routed to a service frontend over a network, the request authenticated and authorized, and then routed to a backend service that executes a search. The search may be indexed using contacts analytics output files that includes metadata about audio calls, including but not limited to the textual content of the call (e.g., transcript of the audio) but also conversation characteristics from output call for silent, non-talk time, cross-talk, and more. Categories may be searched upon to determine which customer contacts did or did not meet certain categories. For example, a supervisor can search for contacts in which an agent performed an improper greeting.

FIG. 7 illustrates a contact search result page 700, in accordance with at least one embodiment. In at least one embodiment, contact search result page 700 is provided to a client of a service provider in response to a client search request with a specified set of search parameters. In at least one embodiment, search parameters may include various parameters such as a time period to search over and one or more keywords or phrases. Searches may be performed using NLP techniques so that literal as well as semantic matches are returned. In at least one embodiment, contact search result page 700 allows a user to edit an executed search to modify the search parameters.

Contact search result page 700 may display a set of common themes that are detected for the search parameters. Common themes may refer to keywords and phrases that are positively correlated with search parameters. For example, FIG. 7 illustrates a search result over a specified period of time for instances of "account is locked" and "can't access my account" which has a high correlation with "account access" which can be deduced by the number of instances of "account access" keyword within the search result—in fact, all 98 search results that matched the search parameters were also associated with "account access," which can be seen by the "98" in the circle under the Common Themes section as well as the bottom of the search results. Other common themes may be listed as well, in order of magnitude or frequency. For example, "account is locked" and "password is not accepted" are also relatively high occurrences in the search results. Supervisors can use the common themes to discover potential issues which are more specific than the search parameters or identify potential root causes to a problem that customers report experiencing. In some embodiments, contact search result page 700 allows a client to download contacts data for the search results—for example, a client may be able to download contacts analytics output files for all 98 search results shown in FIG. 7 as a single zipped file. Clients may take the downloaded data and use them to perform business intelligence and use additional data internal to the client. In at least one embodiment, a contact ID is a Globally Unique Identifier (GUID) or Universally Unique Identifier (UUID).

Contact search result page 700 may display a page of search results with various fields which may be displayed. FIG. 7 merely displays one among several possible set of fields to report in a search result page. FIG. 7 illustrates the following fields:

| | |
|---|---|
| Contact ID | Unique identifier associated with a particular customer contact |
| Channel | Method of communication (e.g., chat or voice) |
| Initiation Timestamp | Start of customer contact |
| Phone Number | Phone Number |
| Queue | Queue from which the contact was made |
| Agent | Agent name or identifier that handled the customer contact |
| Recording/Transcript | Call recording or chat transcript of customer contact. Can be viewed, played, downloaded, or deleted |
| Customer Number | Customer contact information |
| Disconnect Timestamp | End of customer contact |

Figure 8:
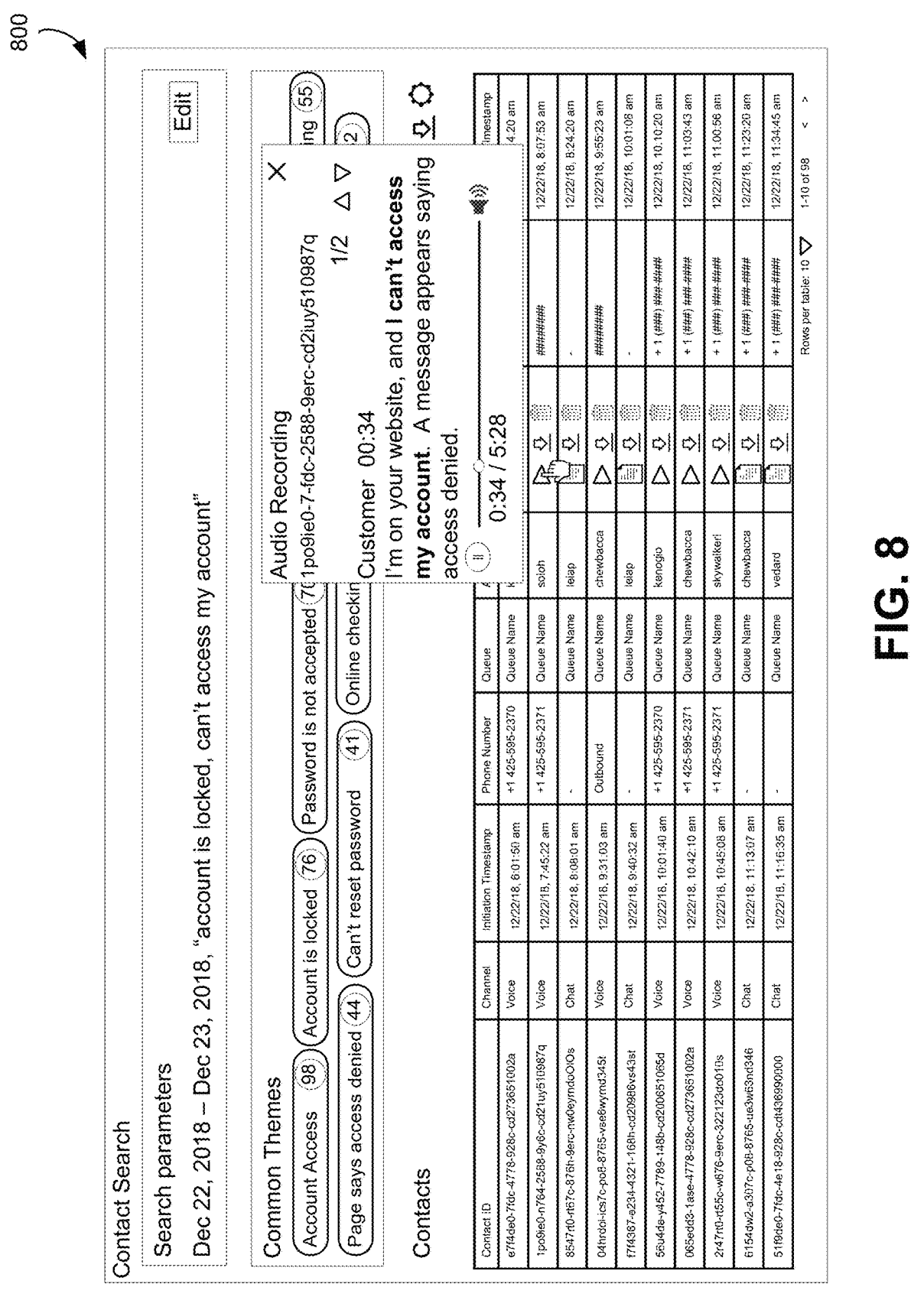

FIG. 8 illustrates playback capabilities a contact search result page 800, according to at least one embodiment. In at least one embodiment, a contacts analytics service transcribes audio and process the transcribed text to identify entities, keywords, and phrases. In some cases, customer sentiment is also encoded and can be viewed from the contact search result page. In at least one embodiment, each audio contacts data is transcribed by turn, based on who was speaking at a given point in time. FIG. 8 illustrates an example in which a user clicks on the audio of the second search result with contact ID "1po9ie0-7-fdc-2588-9erc-cd2iuy510987q" which plays the audio of the customer contact and displays additional information. The prompt may include the total call duration, and a speech-to-text transcript of the turn that is being re-played. In some cases, keywords, phrases, entities, categories, or a combination thereof are highlighted, bolded, or otherwise surfaced to the user. For example, under the search, the "I can't access my account" phrase is highlighted, which may represent keywords, phrases, entities, categories, etc. of interest to the user.

In some embodiments, audio contacts data is ingested by a contacts analytics service which uses a speech-to-text service to transcribe the audio contacts data source into a transcript of the audio contact. The transcript may be organized into turns. The transcript may be provided to a NLP service which performs sentiment analysis, entity detection, keyword detection, phrase detection, and more processing. Contacts analytics service may perform additional post-processing, such as assigning a sentiment score to portions of the audio contact and/or a sentiment score for the overall contact. Transcripts may be provided to a categorization service that checks whether a set of rules-based categories (or a portion thereof) are met by the contact. In some embodiments, clicking on a chat transcript brings up a prompt that shows the conversation between an agent and customer.

Figure 9:
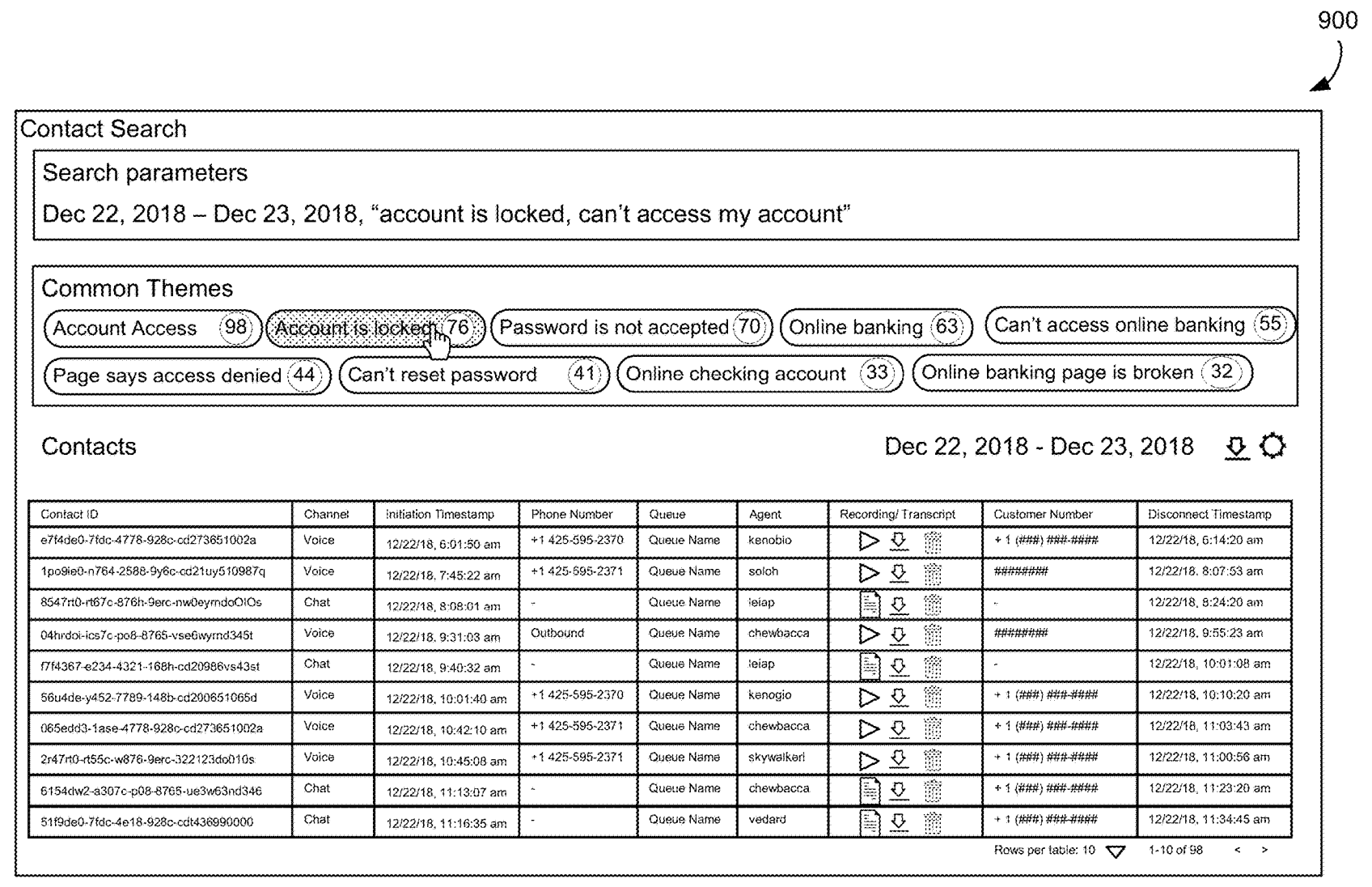

FIG. 9 illustrates contact theme filtering capabilities of a contact search result page 900, according to at least one embodiment. FIG. 9 may be implemented in the context of contact search described in FIGS. 9-11. FIG. 9 may illustrate a scenario in which a user submitted a search for a set of parameters—for example, for keywords or phrases "account is locked" or "can't access my account" over Dec. 22, 2018 to Dec. 23, 2018. Search results may be populated as shown in FIG. 9, but additional themes that the user may not be aware of may also be surfaced, which allows the user to explore additional. Themes may be listed by frequency, with the most common themes being shown first. For example, FIG. 9 shows the following themes:

Account Access—98 instances
    Account is locked—76 instances
    Password is not accepted—70 instances
    Online banking—63 instances
    Can't access online banking—55 instances
    Page says access denied—44 instances
    Can't reset password—41 instances
    Online checking account—33 instances
    Online banking page is broken—32 instances The user may review the common themes presented, and select any a theme to drill in deeper to learn new insights or identify root causes or previously undiscovered issues. For example, in FIG. 9, the user may click on "Account is locked" theme which was surfaced using metadata generated by a contacts analytics service. This flow may be continued on FIG. 10.

Figure 10:
FIG. 10 illustrates contact theme filtering capabilities of a contact search result page, according to at least one embodiment.

FIG. 10 illustrates contact theme filtering capabilities of a contact search result page 1000, according to at least one embodiment. FIG. 10 may be implemented in the context of contact search described in FIGS. 9-11. In at least one embodiment, a user clicked on the "Account is locked" theme in FIG. 9 which results in the flow on FIG. 10, which displays the 76 contacts that fall under the "Account is locked" theme. Furthermore, there may be a hierarchy displayed on the search page "Search parameter>Account is locked" which can be used to navigate to different levels of the search. For example, clicking on "Search parameters" may bring the user back to the original search results in FIG. 9.

Contact search result page 1000 may show the most relevant sub-themes under a theme. Note that the themes presented in contact search result page 1000 are the most commonly occurring themes of the subset of contacts that match to "Account is locked"—accordingly, these themes may differ from those in FIG. 9. For example, FIG. 10 illustrates the following themes:
- Password is not accepted—70 instances
- Online banking—63 instances
- Identity theft—30 instances
- Online banking page is broken—20 instances
- Online checking account—15 instances
- Can't reset password—11 instances
- Shared Accounts—6 instances
- Security Settings—5 instances It should be noted that exploring sub-themes results may, as in FIG. 10, surface themes that were not visible on search themes, since the search domain is different. For example, FIG. 10 shows that of the 76 instances of "Account is locked" there were 30 instances of identity theft also associated with the accounts being locked. This insight may lead the user to conclude that there is a rise in identity theft and to take action accordingly, such as to increase security measures and to inform agents to use more robust methods to authenticate users, such as requiring the use of multi-factor authentication during periods of higher than usual risk. In at least some embodiments, a user can click on the "Identity theft" theme to drill deeper into sub-themes associated with reports of identity them. This flow may be continued on FIG. 11.

FIG. 11 illustrates contact theme filtering capabilities of a contact search result page 1100, according to at least one embodiment. FIG. 11 may be implemented in the context of contact search described in FIGS. 9-11. In at least one embodiment, a user clicked on the "Identity theft" theme in FIG. 10 which results in the flow on FIG. 11, which displays the 30 contacts that fall under the "Identity theft" theme. Furthermore, there may be a hierarchy displayed on the search page "Search parameter>Account is locked>Identity theft" which can be used to navigate to different levels of the search. For example, clicking on "Search parameters" may bring the user back to the original search results in FIG. 9 and clicking on "Account is locked" may bring the user back to the search results in FIG. 10. In at least one embodiment, additional themes can be discovered to identify more particularly useful information relating to identity theft. For example, as shown in FIG. 11, it may be the case that 26 of the 30 instances of identity theft were reported in Oregon state. A supervisor may use this information to impose stricter authentication requirements on Oregon but not other states.

FIG. 12 illustrates a first portion of a contact trace record page 1200, according to at least one embodiment. FIGS. 12 and 13 may collectively illustrate a contact trace record page. In at least one embodiment, a user is able to review a contact trace record for a customer contact. For example, a user may navigate to a contact trace record page through a contact search result by clicking on the result for a particular contact. In at least some embodiments, a contacts analytics output file is obtained and the data from the output file is used to populate a contact summary card, contact analysis, call transcript, categorizations, entities, keywords, phrases, and more.

Contact trace record page 1200 may be a visualization of some or all data of an output file generated by a contacts analytics service. Contact trace record page 1200 may include a contact summary section that includes some or all of the following information: contact id, start and end times (e.g., based on an initiation timestamp and a disconnect timestamp), contact duration, customer number, agent, queue, and actions triggered (e.g., categories). Actions triggered may refer to categories that matched. The contact trace record page 1200 may include a graph of the customer sentiment trend, which may be based on a rolling sentiment score. The contact trace record page 1200 may include aggregate data, such as aggregate statistics on the customer sentiment. For example, a graph may show what percentage of the call a customer's sentiment was positive, neutral (e.g., neural or mixed), or negative. In some embodiments, the percentages are based on what proportion of turns were positive, neutral, or mixed. In some embodiments, the percentages are based on what portion of call length that the customer's sentiment was positive, neutral, or mixed (e.g., a longer positive sentiment is weighted more heavily than a shorter negative sentiment). In at least some embodiments, total talk time is broken up, by percentage, to each speaker. In some cases, periods of silence are denoted non-talk time.

The contact trace record page 1200 may present additional contact details and/or contact analysis information. Contact trace record page 1200 may, in at least one embodiment, display audio and transcript information. In at least some embodiments, users can search for specific words or phrases in the audio, which may be matched against a transcript of the audio generated by a speech-to-text service. Visualizations of the audio may be presented in the contact trace record page 1200. The audio may be color coded by speaker—bar heights may represent loudness and the bars may be of different colors for when agent is speaking, customer is speaking, when both are speaking (e.g., cross-talk), and for periods of silence. In at least some embodiments, sentiments and/or sentiment scores are displayed. In at least some embodiments, audio playback may be made available in the page, which may include filters for party sentiment, playback speed may be adjusted to be faster or slower than typical, and more.

FIG. 13 illustrates a second portion of a contact trace record page 1300, according to at least one embodiment. FIGS. 12 and 13 may collectively illustrate a contact trace record page. In at least one embodiment, a user is able to review a contact trace record for a customer contact. For example, a user may navigate to a contact trace record page through a contact search result by clicking on the result for a particular contact. In at least some embodiments, a contacts analytics output file is obtained and the data from the output file is used to populate a contact summary card, contact analysis, call transcript, categorizations, entities, keywords, phrases, and more.

In at least one embodiment, contact trace record page 1300 displays a transcript of an audio recording of a customer contact (e.g., video or audio call). In at least one embodiment, the transcript is a text-based transcript of audio that is generated by a speech-to-text service. The transcript may be organized by turns, and an emoticon may be displayed next to each turn, indicating the sentiment of the turn. For example, the first turn shown in FIG. 13 the first speaker is the agent (e.g., as shown by the agent speaking at 00:01) and that the sentiment of the speaker's first turn was neutral. The transcript may highlight or otherwise surface information relating to categories, entities, keywords, phrases, etc., of the transcript which were identified using natural language processing techniques.

In at least some embodiments, a contacts analytics service automatically redacts sensitive data from chat logs, call transcripts, and other text-based records. Non-limiting examples of sensitive data may include one or more of the following: credit card numbers; social security numbers; patient health records; date of birth; passwords or pass phrases; cryptographic keys or other secret material; personal identification number (PIN); and more. In at least some embodiments, sensitive data includes personal health information (PHI) and/or personally identifiable information (PII). In at least some embodiments, contacts analytics service is payment card industry (PCI) compliant and can automatically redact PCI data from both call audio and chat transcript to ensure that sensitive customer information is not exposed to unauthorized employees within the organization. In at least some embodiments, sensitive data is redacted from contacts analytics service GUI and stored in an encrypted format. In at least some embodiments, an organization may have access to a cryptographic key that can be used to decrypt sensitive data of chat logs if such data is needed, such as in cases where such information is required for compliance with statutory and/or regulatory reasons.

FIG. 13 further illustrates actions that were triggered by the call. Actions may refer to categories or other points of interest which may have been identified while processing the call audio. For example, the call triggers illustrated in FIG. 13 show eight actions triggered: yelling; loud volume (occurring three times over the course of the call); a link to current promotions; a link to change address form; a swearing word flag (e.g., profanity); and swear word notification to supervisor. In at least some embodiments, contact trace record page 1300 includes a text box in which a supervisor can added comments which are associated and/or stored with metadata associated with the customer contact, and the comment can be shared (e.g., using the sharing button in the upper right corner of the "general comments" prompt).

FIG. 14 illustrates searching of keywords and entities in a contact trace record page 1400, according to at least one embodiment. FIG. 14 is implemented in the context of contact trace record pages described elsewhere in this disclosure, such as FIGS. 12 and 13, according to at least one embodiment. In at least one embodiment, a user is able to review a contact trace record for a customer contact. For example, a user may navigate to a contact trace record page through a contact search result by clicking on the result for a particular contact. In at least some embodiments, a contacts analytics output file is obtained and the data from the output file is used to populate a contact summary card, contact analysis, call transcript, categorizations, entities, keywords, phrases, and more. A contacts analytics output file may encode metadata such as sentiments, keywords, and entities that are extracted from text inferred (e.g., using one or more speech neural networks) from audio. In at least one embodiment, a user can start typing in keywords and entities and automatically be prompted with keywords and entities that match the search string. For example, if a user start to type "Ac"—as in "Account ID"—a menu may appear with different keywords and entities relevant to the contact.

Figure 15:
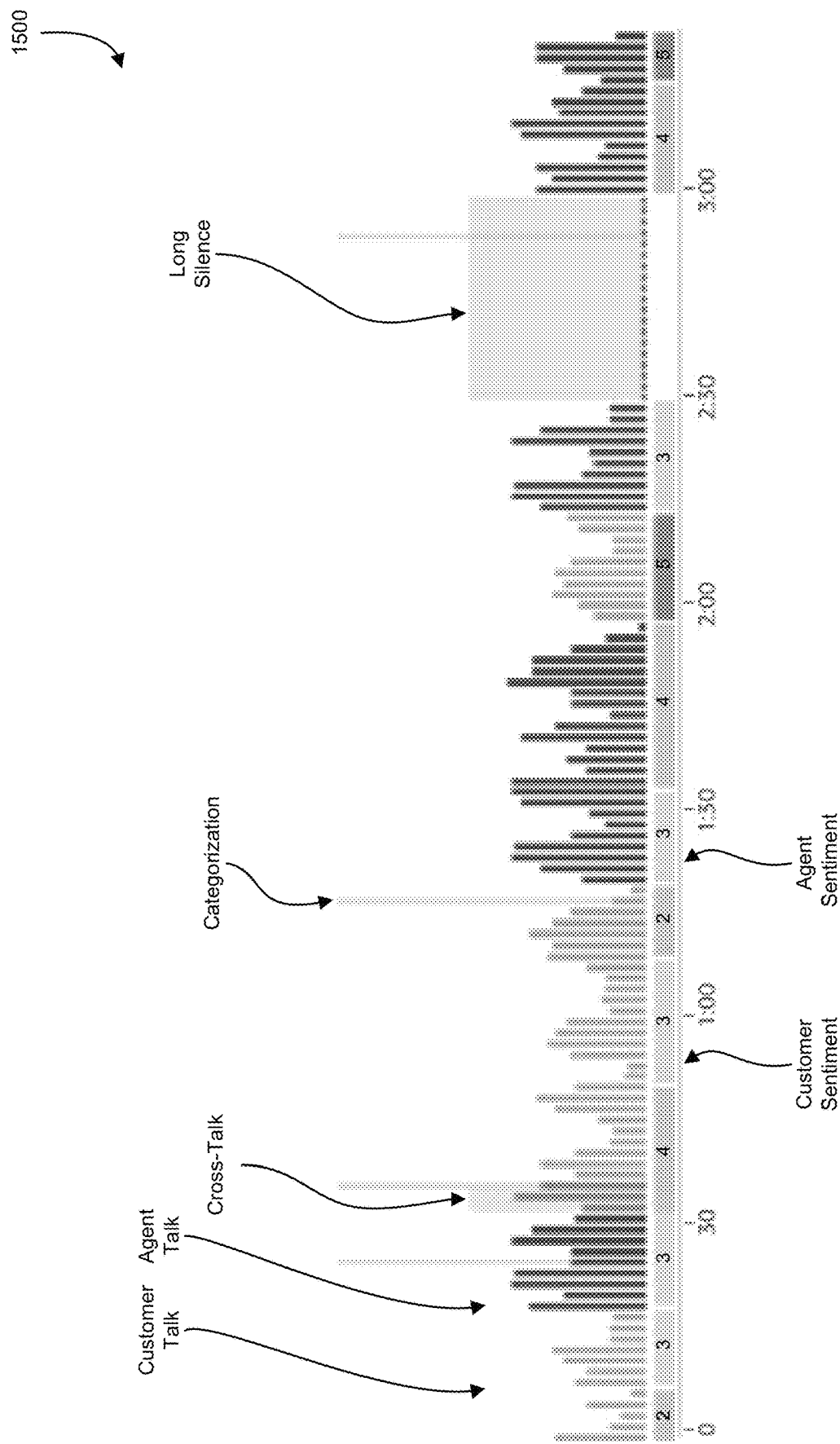
FIG. 15 illustrates a diagram of detailed audio data and metadata which may be presented in a contact trace record page, in accordance with at least one embodiment.

FIG. 15 illustrates a diagram 1500 of detailed audio data and metadata, in accordance with at least one embodiment. In at least one embodiment, FIG. 15 illustrates details of an audio call which can be surfaced in a contact trace record such as those described elsewhere in this disclosure. In at least one embodiment, FIG. 15 illustrates various points of interest which may be presented to a user visually as different colors, with mouse-over descriptions, and more. For example, the vertical bars shown in FIG. 15 may correspond to loudness with longer vertical bars representing louder sounds (e.g., speech). A consistently high loudness may be categorized as shouting. The vertical bars may be color coded such that different speakers may be illustrated as different colors—for example, the customer's bars may be light blue, the agent's bars may be dark blue, cross-talk (where both agent and customer are speaking over each other) may be orange, and periods of silence may be yellow. In at least some embodiments, sentiment scores are shown in the contact audio visualization. For example, for each turn, a color or numeric score may be shown. Additionally, categories may be shown. For example, when someone swears, there may be a visual indicator that a category for profanity was triggered. In at least one embodiment, FIG. 15 illustrates a long silence from 2:30-3:00 that triggers a "long silence" category which may be useful for detecting when agents are failing to provide customers consistent feedback.

In various embodiments, organizations can use contacts analytics output files for various use cases. For example, an organization can take sentiment scores for customer contacts and ingest them in their own models (e.g., machine learning models) and train the models to help identify pain points and identify instances where supervisors should be alerted, additional information presented to agents in real-time, and more. As a second example, organizations (e.g., employees thereof) can adjust various settings to set threshold associated with sentiments and define actions or categories based on certain thresholds being exceeded. For example, a run of N negative sentiments coupled with an overall negative sentiment score may be categorized as a bad interaction and a supervisor may be notified (e.g., after the fact or in real-time).

Figure 16:
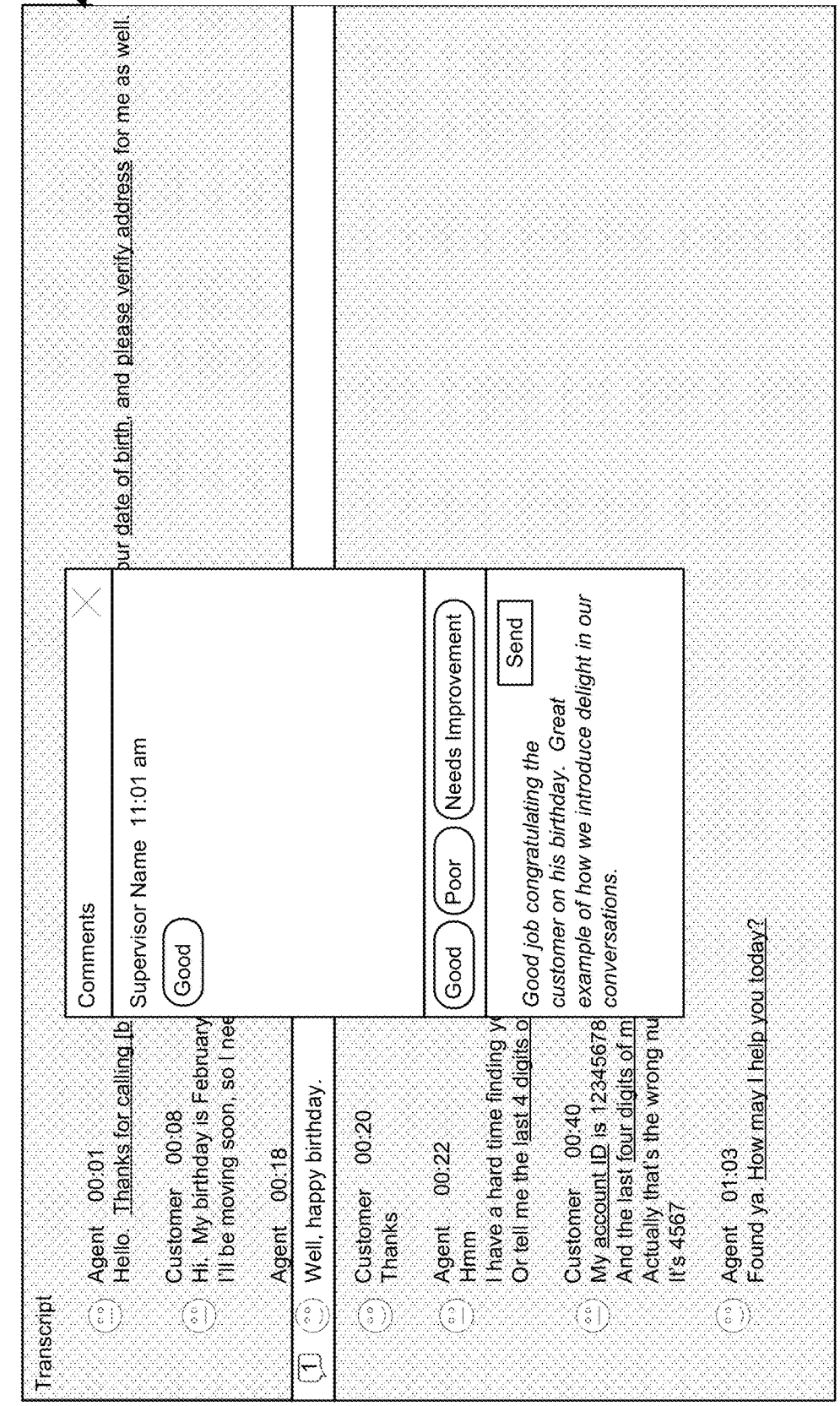
FIG. 16 illustrates commenting in a contact trace record page, in accordance with at least one embodiment.

FIG. 16 illustrates commenting functionality of a contact trace record page 1600, in accordance with at least one embodiment. In at least one embodiment, FIG. 16 illustrates a contact trace record page or a portion thereof. For example, FIG. 16 may be implemented as a part of a contact trace record page described in connection with FIGS. 12-13. In at least on embodiment, a supervisor can review customer contacts (e.g., by drilling into a specific customer contact from a contact search result) and offer comments to help agents improve. In at least one embodiment, a supervisor can click on a specific turn or portion of text and add comments. In at least one embodiment, clicking on part of the transcript brings up a comment window in which the supervisor can select whether the commented text was "Good" "Poor" "Needs Improvement"—other classifications are also possible to help organize comments. In a least one embodiment, a supervisor can comment that an agent wishing a customer a happy birthday as part of a conversation is "Good" and add additional comments on how congratulating the customer on his birthday is an example of how the organization can introduce delight into their conversations with customers.

Figure 17:
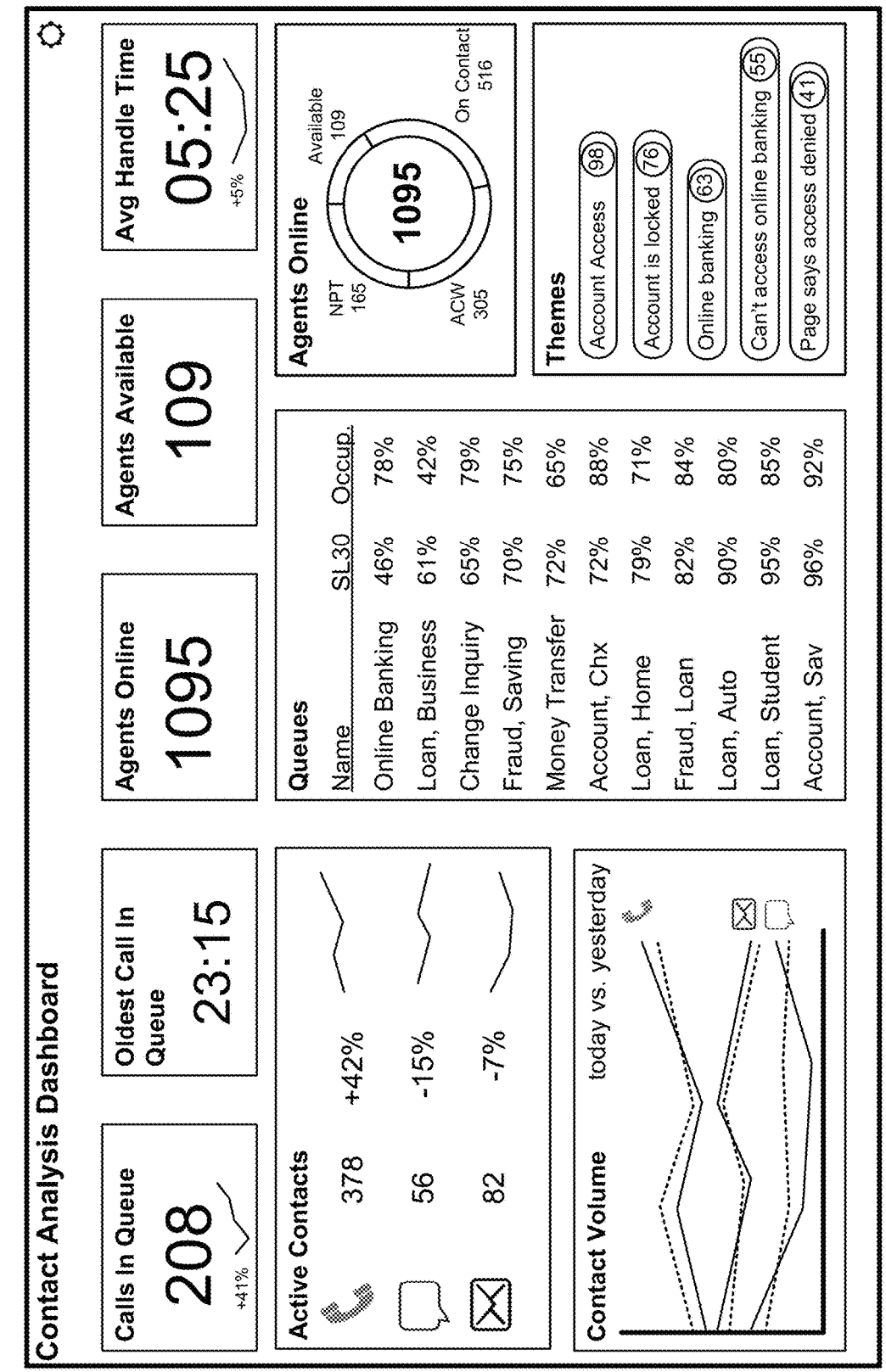
FIG. 17 illustrates a contact analysis dashboard, in accordance with at least one embodiment.

FIG. 17 illustrates a contact analysis dashboard 1700, in accordance with at least one embodiment. Contact analysis dashboard 1700 may be a graphical interface that supervisors use to monitor and manage customer contacts in the context of a customer contact service, such as those described in connection with FIGS. 1-2. In various embodiments, a customer contact service utilizes a backend contacts analytics service to process large amounts of contacts data which is aggregated and reported to the contact analysis dashboard.

A contact analysis dashboard 1700 surfaces various information at a glance to a supervisor. In various embodiments, contact analysis dashboard 1700 is a web-based UI. Contact analysis dashboard 1700 surfaces aggregate statistics at the top of the UI, in at least one embodiment, and displays one or more aggregate statistics. One example of an aggregate statistic is calls in queue, which may surface the number of calls in a queue. In some cases, a trend line may also show how the number of calls in the queue is changing over time. One example of an aggregate statistic is oldest call in queue, which may be a selection of the call in the queue that is oldest. Another example of an aggregate statistic is agents online, which may be a count of the total number of agents online. Agents available may show the number of agents that are available to take new calls. Average handle time (AHT) may refer to the average length of a customer interaction, which includes hold time, talk time, and after-call work (ACW). ACW may refer to the time agents take to wrap up a call. ACW activities may include data-entry, activity codes, dispositions, form completion and post-call communication by the agent after a customer call.

A contact analysis dashboard 1700 may have one or more panes that describe various call center-related activities. For example, an active contacts pane may display the number of active contacts via different modalities (e.g., calls, chats, and emails) and trend lines and percentages that show relative load. In some embodiments, a contact volume pane displays a more detailed view into the volume of contacts over different modalities. In some cases, a contact volume pane provides comparisons, such as comparing the current day's loads against those of the previous day or historic averages.

A queue pane may illustrate different queues, which may be different ways in which customers contact a customer call service—for example, customers that call regarding online banking may be placed in one queue and customers calling regarding home loans are placed in a different queue. Queue occupancy and may be color coded such that higher occupancy percentages are better. In at least some embodiments, a pane for agents online shows a breakdown of the activity of the agents online. In at least one embodiment, themes across all contacts may be displayed, and may be used for issue discovery similar to a contact search result.

Figure 18:
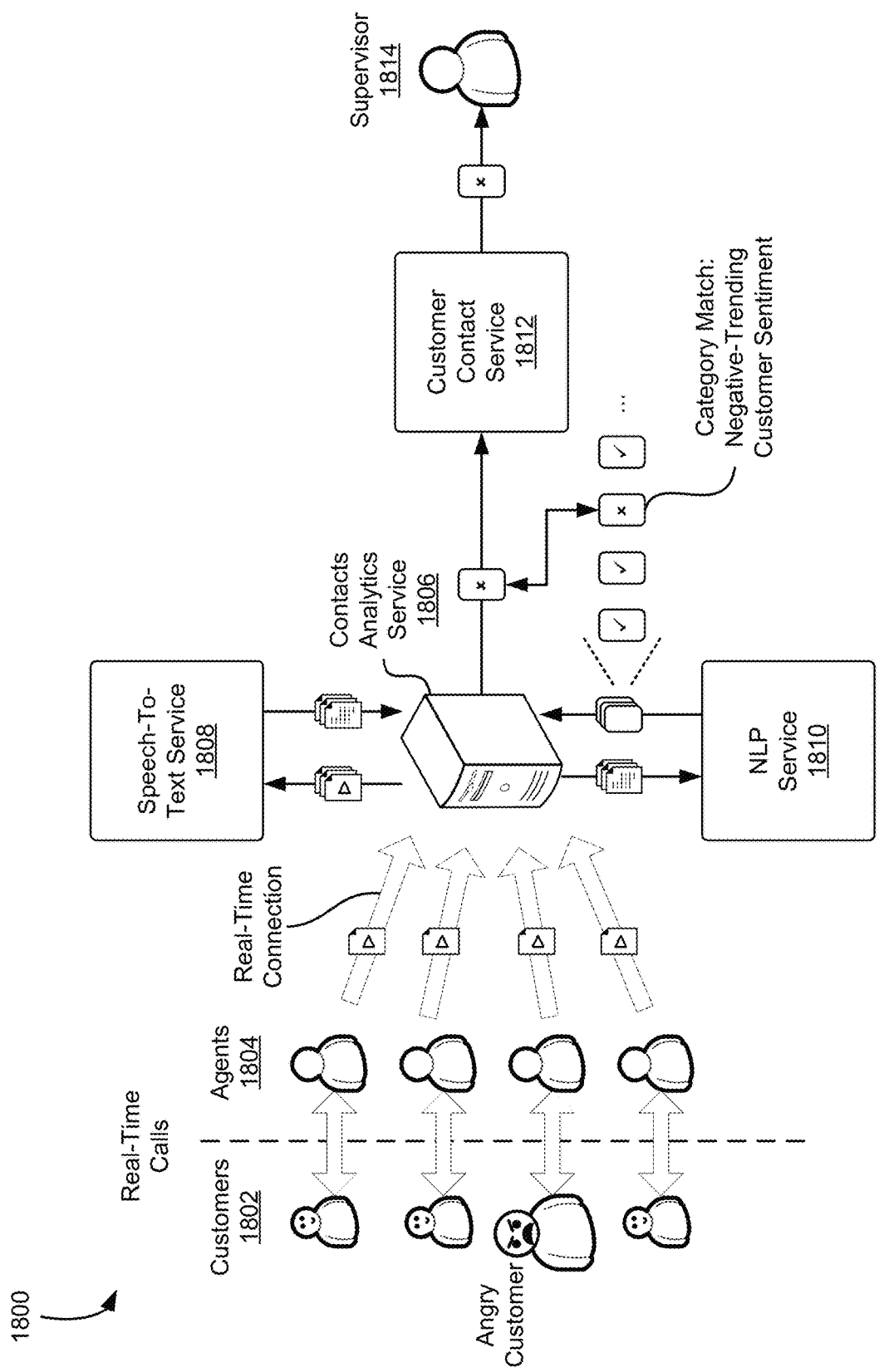
FIG. 18 illustrates a customer contact service that supports real-time calls between customers and agents, in accordance with at least one embodiment.

FIG. 18 illustrates a computing environment 1800 in which various embodiments may be practiced. In accordance with at least one embodiment, computing environment 1800 illustrates a service architecture for real-time supervisor assistance. FIG. 18 may be implemented in the context of a computing resource service provider.

In at least one embodiment, FIG. 18 illustrates a computing resource service provider that supports a customer contact service such as those described in connection with FIG. 1. Customer contact service may be utilized by an organization to provide support to customers such as customers 1802 illustrated in FIG. 18. Customer contact service may be a scalable service that can scale up or down computing resources as needed based on demand, and may be implemented in accordance with techniques described elsewhere in this disclosure, such as those discussed in connection with FIG. 25. A supervisor may be responsible for overseeing customer contacts and for managing a group of agents.

FIG. 18 illustrates a customer contact service that supports real-time calls between customers 1802 and agents 1804. Customers 1802 may be customers of an organization and the organization may employ agents 1804 to answer questions from customers, resolve issues, and so on. In at least one embodiment, FIG. 18 illustrates an architecture in which a supervisor is alerted to potentially problematic customer contacts in real-time. Agents may be employees of an organization that are tasked with communicating with customers, troubleshooting, technical support, customer support, etc. Agents 1804 may have access to a computer system connected to a customer contact service that provides the agents with access to knowledge bases, internal customer resources, and backend system to process returns, update subscriptions, and more.

Customers 1802 and agents 1804 may be connected via a network. The network may include a combination of POTS and voice-over-IP (VOIP) network connections. Customers 1802 may initiate a phone call which is routed to agents 1804 via a VOIP system. Once connected, customers and agents can speak to each other. In various embodiments, customers may have different sentiments based on their reasons for calling as well as the responses of agents. For example, if an agent is being unhelpful or rude, a customer may become frustrated or angry. As illustrated in FIG. 18, customers may exhibit positive sentiments (e.g., as illustrated in FIG. 18 by the customers with smiles) as well as negative sentiments (e.g., as illustrated in FIG. 18 by the angry customer). Real-time supervisor assist can be used to notify supervisor 1814 of a customer's negative sentiment and allow the supervisor to intervene or provide guidance to an agent, in accordance with at least one embodiment.

In at least one embodiment, active calls are connected in real-time to contacts analytics service 1806. Contacts analytics service 1806 may be implemented in any suitable manner, such as in accordance with techniques described in connection with FIG. 1. In at least one embodiment, the real-time connection provides an on-going stream of audio contacts data from one or more agents to contacts analytics service 1806. A real-time connection may be established with agents using a WebSocket protocol, according to at least one embodiment. A WebSocket connection may be used to establish a real-time bidirectional communications channel between a client (e.g., agent or agent's computer system) and a server (e.g., contacts analytics service 1806). A WebSocket connection may be implemented using a TCP connection.

A WebSocket connection may be established between agents and a contacts analytics service 1806 or a component thereof. In some cases, a scalable service is utilized to ensure that period of high activity do not cause performance bottlenecks at contacts analytics service 1806. A Web Socket connection or other suitable real-time connection may be utilized to provide audio from customer-agent calls to contacts analytics service 1806. It should be noted that "real-time" in this context may involve some delays for buffering, batches, and some tolerance for delay may be acceptable. For example, audio may be batched in 15 or 30 second increments. In some embodiments, audio is batched and released when a channel goes silent—for example, if a customer speaks for 25 seconds and then stops to allow an agent to respond, call audio for the customer's 25 seconds of speaking may be batched and then released when the customer stops talking or when the agent begins to talk, thereby signaling the end of the customer's turn, in accordance with at least one embodiment.

In at least one embodiment, real-time customer contacts data (e.g., audio or text) is streamed to contacts analytics service 1806. Contacts analytics service 1806 may provide audio source data to speech-to-text service 1808 and speechto-text service 1808 may provide a transcript of the provided audio. Speech-to-text service 1808 may be in accordance with those described elsewhere in this disclosure, such as those discussed in connection with FIGS. 1 and 2.

Transcribed audio may be organized in turns, as described elsewhere in this disclosure. In some cases, real-time audio provided to speech-to-text service 1808 may include a fragment of a turn—that is, that someone was still speaking. In some cases, contacts analytics service 1808 holds the fragment and when the rest of the fragment is obtained (e.g., when the remainder of the turn is transcribed), the contacts analytics service 1808 stitches together the fragments—reconstructing complete turns may be performed so that accurate sentiment scores can be determined based on the entire turn, rather than just a portion thereof. In some cases, speech-to-text service 1808 will retain a fragment, reconstruct the full turn, and provide the full turn to NLP service 1810. For a call, transcribed text may be stored in a file and subsequent audio that is transcribed for the call may be appended to the same file so that, at the end of the call, the entire transcript is in the file. In various embodiments, fragments are not provided to NLP service 1810, as assessing sentiment based on a portion of a turn rather than the entire turn may generate inaccurate sentiment predictions.

NLP service 1810 may be in accordance with those discussed in connection with FIGS. 1 and 2 and may be used to perform sentiment analysis, entity detection, keywords and phrases detection, and more. NLP service 1810 may generate metadata or annotations to transcripts generated by speech-to-text service 1808 and provide those results to contacts analytics service 1806. In at least one embodiment, a categorization service is used to determine whether certain transcripts match a particular rules-based category specified by a client. In at least one embodiment, a category is matched against content and/or conversation characteristics of a customer contact. For example, an audio call may be analyzed to determine whether it includes profanity (e.g., content-based rule) or long periods of silence (e.g., a characteristics-based rule) to determine whether a category applies to a specific customer contact or portion thereof.

In some embodiments, audio data is routed through a data streaming service (e.g., Amazon Kinesis or Apache Kafka) offered by a computing resource service provider. In some embodiments, real-time connection is routed to contacts analytics service through indirectly, such as through customer contact service 1812. NLP service may generate metadata for each completed turn of a real-time audio communication between a customer and an agent.

After calling speech-to-text service 1808 and NLP service 1810 to transcribe audio to text, perform sentiment analysis, and extract keywords, phrases, and entities, contacts analytics service 1806 may call a categorization service to perform additional post-processing and assign categories to the real-time call. For example, a category to identify a potentially problematic call may rely on successive negative sentiment scores, loud volume, profanity uttered by the customer, utterances of the customer referencing competitor products/threats to cancel a subscription, and various combinations thereof. A categorization may be applied to the angry customer illustrated in FIG. 18 based on a negative-trending customer sentiment, which may be based on a successive run of negative sentiments and/or a downward trend of customer sentiment from positive to negative. Such a category may be presented to supervisor 1814 via customer contact service 1812, which may surface a notification or a dashboard may have a dedicated widget or UI element for surfacing potentially problematic calls. Supervisor 1814 may then listen in on the agent's call, provide suggestion to the agent to help diffuse the situation, or any of several other actions may be taken by the supervisor 1814 to improve the customer's sentiment.

Figure 19:
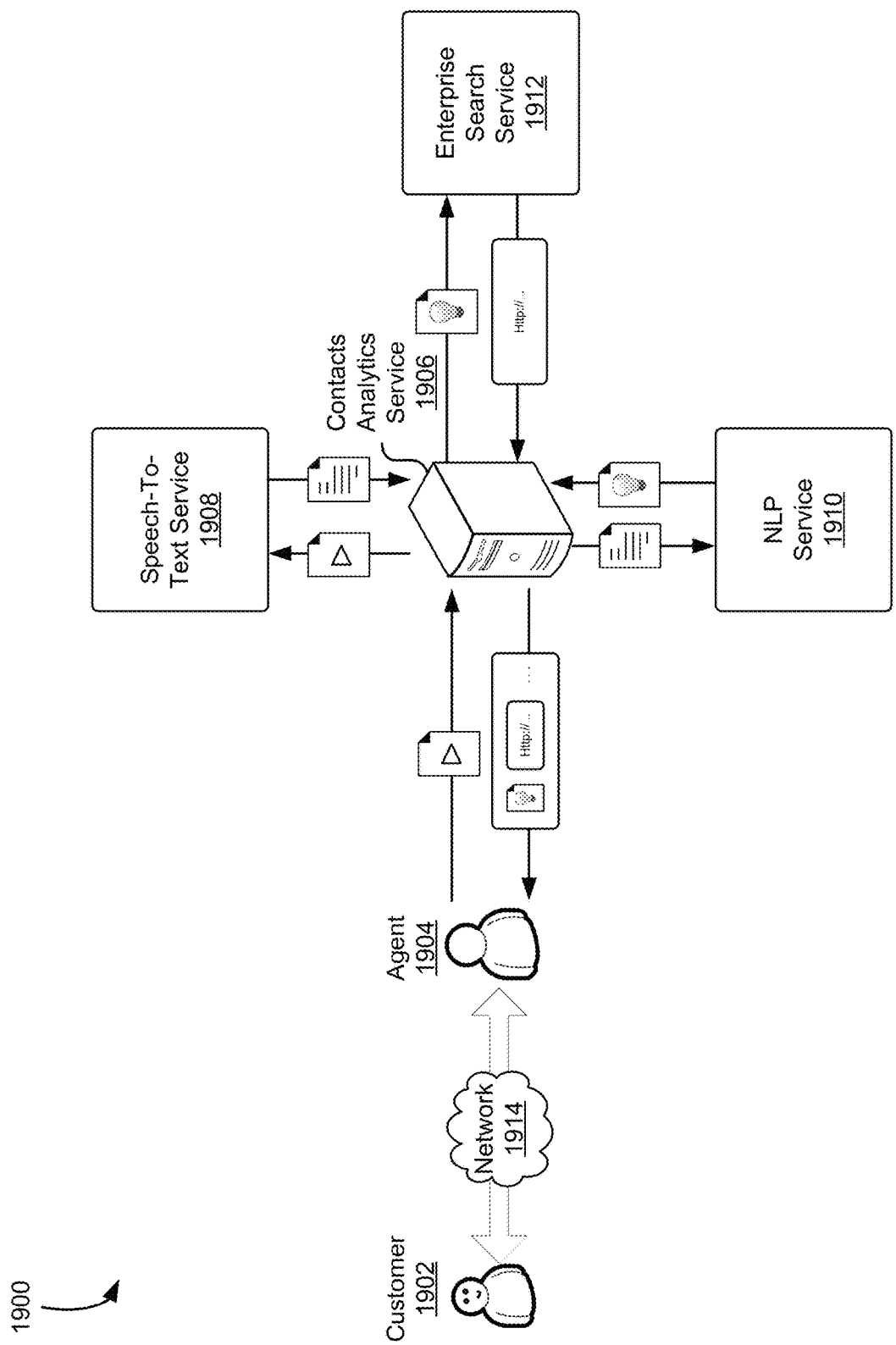
FIG. 19 illustrates a computing environment in which a customer contact service supports real-time calls between a customer and an agent, in accordance with at least one embodiment.

FIG. 19 illustrates a computing environment 1900 in which a customer contact service supports real-time calls between a customer 1902 and an agent 1904. Embodiments in accordance with FIG. 19 may be implemented in the context of other embodiments described in this disclosure, such as those discussed in connection with FIGS. 1 and 2. Customer 1902 may be a customer of an organization that employ agent 1904 either directly or indirectly. Agent 1094 may be tasked to answer questions from customers, resolve issues, and so on. In at least one embodiment, FIG. 19 illustrates an architecture in which contacts analytics service 1906 may be utilized to provide real-time agent assistance. Real-time agent assistance may refer to features in which customer contacts information is piped to a computing resource in real-time. "Real-time" assistance in various contexts described herein may refer to systems in which data (e.g., audio data) from contacts are piped to a service provider as they are received. Real-time features described herein may allow for buffering and tolerances of several seconds may be acceptable as long as responsiveness between a customer and agent allows for such delays. Tolerances of several seconds, tens of seconds, or even minutes may be acceptable based on the context for a customer contact. As an example, a real-time architecture as described herein may buffer source audio for a speaker's ongoing turn and send it to contacts analytics service 1906 once the speaker has finished, thereby ending that speaker's turn. An ongoing turn may refer to a turn which has not yet completed—for example, if a turn changes each time a speaker changes, an ongoing turn may end when the speaker finishes speaking. Agent 1902 may have access to a computer system connected to a customer contact service that provides the agents with access to knowledge bases, internal customer resources, and backend system to process returns, update subscriptions, and more. However, there may be an overwhelming amount of information, articles, etc. that it may be difficult for agent 1902 to determine, in real-time or within several seconds to minutes, where to find certain information that a customer requests.

In at least one embodiment, a WebSocket connection is established between agent 1904 and contacts analytics service 1906 or a component thereof. In some cases, a scalable service is utilized to ensure that period of high activity do not cause performance bottlenecks at contacts analytics service 1906. A WebSocket connection or other suitable real-time connection may be utilized to provide audio from customer-agent calls to contacts analytics service 1906. It should be noted that "real-time" in this context may involve some delays for buffering, batches, and some tolerance for delay may be acceptable. For example, audio may be batched in 15 or 30 second increments or for the duration one party speaks. In some embodiments, audio is batched and released when a channel goes silent—for example, if a customer speaks for 25 seconds and then stops to allow an agent to respond, call audio for the customer's 25 seconds of speaking may be batched and then released when the customer stops talking or when the agent begins to talk, thereby signaling the end of the customer's turn, in accordance with at least one embodiment.

In some embodiments, audio data is routed through a data streaming service offered by a computing resource service provider. In some embodiments, real-time connection is routed to contacts analytics service through indirectly, such as through a customer contact service such as those described in connection with FIGS. 1 and 2. NLP service may generate metadata for each completed turn of a real-time audio communication between a customer and an agent.

In at least some embodiments, a data connection between agent 1904 and a service provider (e.g., contacts analytics service) is established and is used to provide an audio stream of contacts between agent 1904 and customers such as customer 1902 illustrated in FIG. 19. In some embodiments, agent 1904 establishes a connection a real-time communications channel and uses it for multiple calls; in some embodiments, a real-time communications channel is setup when agent 1904 is connected with a customer and terminated when the contact ends.

In at least some embodiments, agent 1904 sends a stream of audio data to contacts analytics service 1906 and audio from the stream—or a portion thereof, such as in cases where unfinished turn are buffered and then submitted when addition audio for the remainder of the turn (e.g., when an active speaker finishes speaking) is received—is submitted to speech-to-text service 1908 and speech-to-text service 1908 generates a transcript of the portion of the customer contact that was provided. The portion of the transcript may be provided to contacts analytics service 1906 which may aggregate the received portion with previously received portions to maintain a running record of an active customer contact. The entire running record may be provided to NLP service 1910 which may generate sentiment scores, detects entities, keywords, and phrases, etc. using any of numerous natural language processing techniques. In some cases, only the most recent portion of the transcript generated is provided to NLP service 1910. Additional post-processing may be performed by a categorization service. For example, contacts analytics service may provide a running transcript or a portion thereof to a categorization service to perform additional post-processing and assign categories to the real-time call. For example, a category to identify a potentially problematic call may rely on successive negative sentiment scores, loud volume, profanity uttered by the customer, utterances of the customer referencing competitor products/threats to cancel a subscription, and various combinations thereof. NLP service 1901 may be used to generate insights, which may include entity detection, sentiment analysis, and more, which are provided to contacts analytics service in any suitable format, such as in a JavaScript Object Notation (JSON) file.

In at least some embodiments, various post-processing and analytics performed on the audio contact stream can provide insights which can be relayed back to agent 1904. For example, if a customer's sentiment score is trending negative or remains negative, an indication may be surfaced to the agent 1904 via a notification, a popup, or in a widget that is loaded in a graphical interface that agent 1904 operates while handling customer calls. As a second example, categories can be matched to an agent, which may remind the agent to, for example, thank the customer for being a subscriber. As yet another example, a category may be based on audio characteristics, such as if the agent's speaking volume is too long, if the agent presents long periods of silence, if the agent is overly apologetic, and other such characteristics. Categories may be matched more broadly to conversation characteristics, which may include characteristics of various types of communications such as text-based communications and audio-based communications: for example, while speaking volume may not make sense in the context of text-based conversation characteristics, long periods of silence may be flagged as a characteristic of a text-based chat conversation. By flagging these characteristics in real-time, agents are able to correct such behavior and provide customers with a better call experience.

In some cases, customer 1902 and agent 1904 are connected to an audio call and contacts analytics service 1906 is used to provide suggestions to questions asked by customer 1902. An audio stream is transcribed and processed to generate suggestions. In some cases, contacts analytics service or a serviced used by contacts analytics service is unable to determine a suggestion or unable to determine a suggestion with sufficient confidence. Contacts analytics service may provide real-time transcripts and/or metadata to enterprise search service 1912 and enterprise search service 1912 may return the most relevant internal documents, knowledge bases, websites, etc. of an organization that match the customer's question. In various embodiments, enterprise search service 1912 provides references to various internal and/or external documents to contacts analytics service and contacts analytics service provides those to agent 1904. Agent 1904 may look up the most relevant the most relevant internal documents, knowledge bases, websites, etc. to determine a suggestion or answer to customer 1902, or may provide links to the publicly available resources to customer 1902 that may help the customer.

In an embodiment, network 1914 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In some cases, a network may include or refer specifically to a telephone network such as a public switched telephone network or plain old telephone service (POTS).

Figure 20:
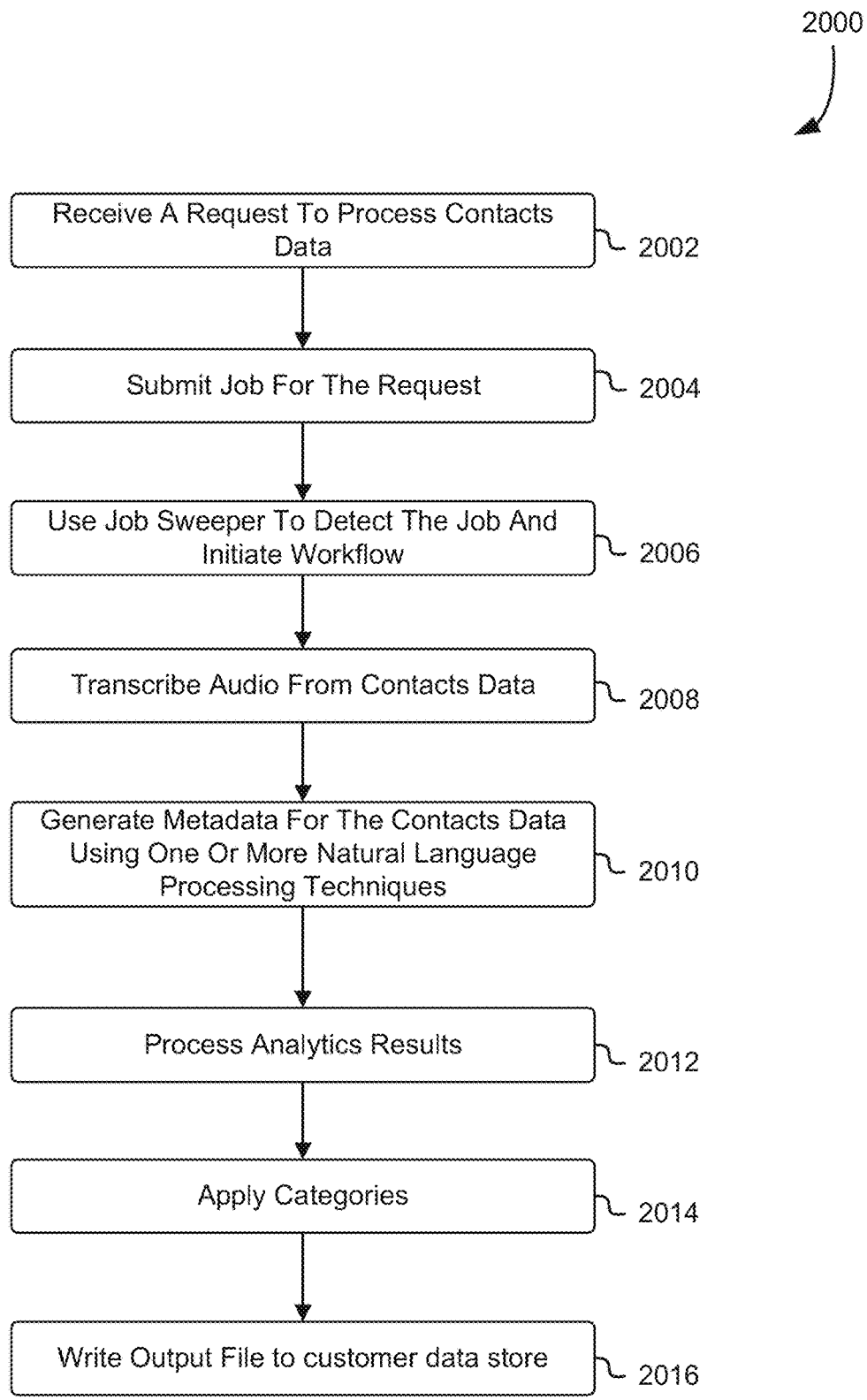
FIG. 20 shows an illustrative example of a process to generate contacts analytics output data, in accordance with at least one embodiment.

FIG. 20 shows an illustrative example of a process 2000 to generate contacts analytics output data, in accordance with at least one embodiment. In at least one embodiment, some or all of the process 2000 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 2000 can be implemented in the context of embodiments described elsewhere in this disclosure, such as those discussed in connection with FIGS. 1-19.

In at least one embodiment, a computer system to perform the process executes a program to receive 2002 a request to process contacts data. In at least one embodiment, the request is a web service API request that is received by a service frontend, authenticated, and routed to a backend service to be processed. In at least one embodiment, a computer system to perform the process executes a program to submit 2004 a job for the request. The job may be submitted to a database of a metadata service which a job sweeper monitors or periodically queries for new jobs. A new job may be submitted with a job status indicating it has not yet been started. In at least one embodiment, a computer system to perform the process executes a program to use 2006 a job sweeper to detect the job and initiate a workflow. The job sweeper may be in accordance with those described in FIG. 1, and may initialize a step functions workflow. A scalable service may be utilized in execution of the workflow.

In at least one embodiment, a computer system to perform the process executes a program to transcribe 2008 audio from contacts data. Contacts data may be in various forms, such as audio recordings, real-time audio streams, non-audio forms such as chat logs. For audio-based contacts data, a speech-to-text service may be utilized to transcribe the audio into a text-based transcript. In at least one embodiment, a computer system to perform the process executes a program to generate 2010 metadata for the contacts data using one or more NLP techniques such as those discussed in connection with FIGS. 1 and 2. For example, NLP techniques may include sentiment analysis, entity detection, keyword detection, and more. In at least one embodiment, a computer system to perform the process executes a program to process 2012 analytics results. Processing analytics results may include generating a human-readable output file in a JSON format. In at least one embodiment, a computer system to perform the process executes a program to apply categories 2014. Categories may be triggered based on rules that a customer can define. Categories can be used to identify certain communications and/or points of interest in communications, such as an agent's compliance with an organization's scripts. In at least one embodiment, a computer system to perform the process executes a program to write 2016 an output file to a customer data store. A customer role may be assumed and, upon assumption, the system performing the process copies an output file to a data bucket of the customer.

Figure 21:
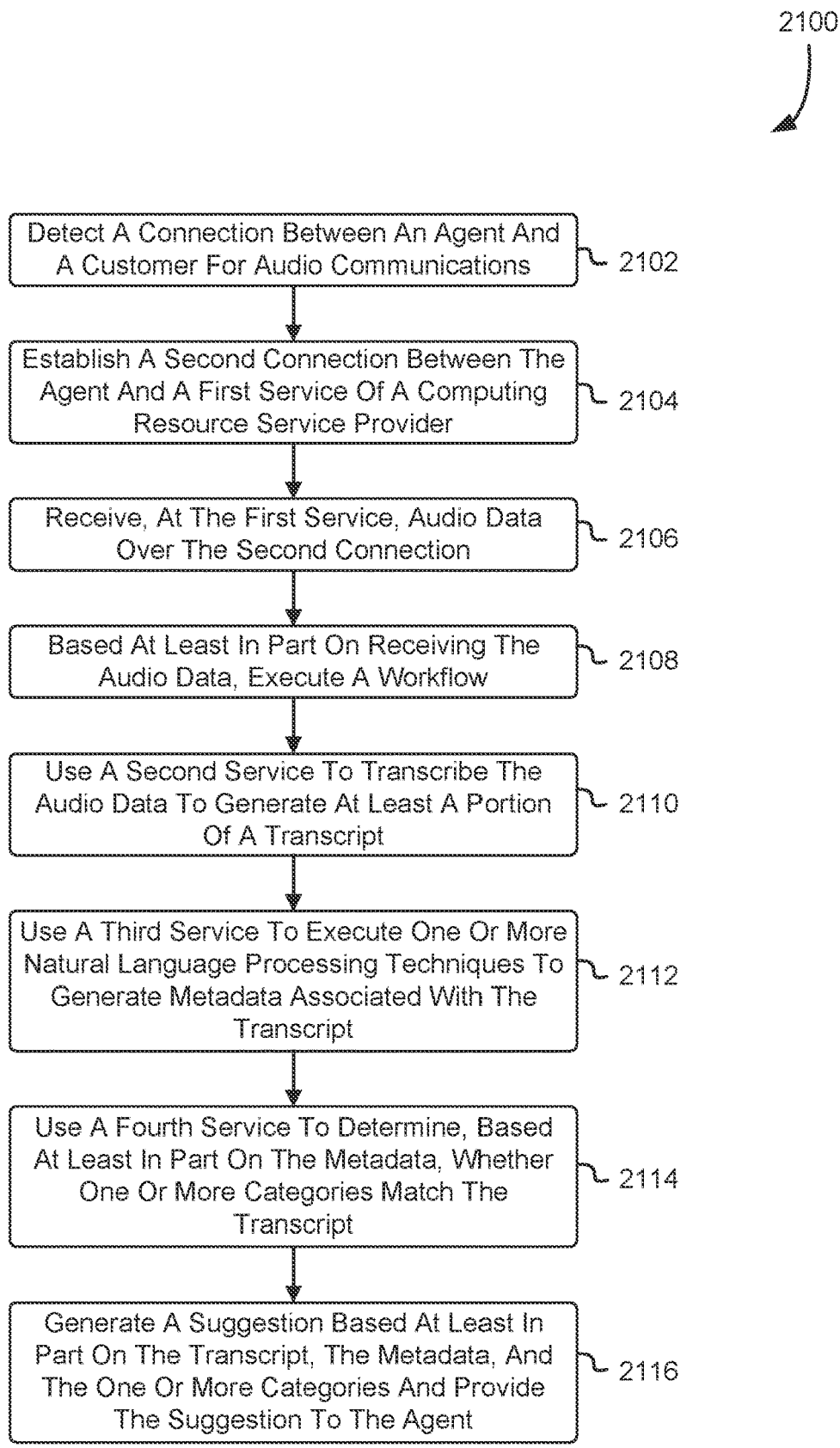
FIG. 21 shows an illustrative example of a process to implement real-time agent assistance, in accordance with at least one embodiment.

FIG. 21 shows an illustrative example of a process 2100 to implement real-time agent assistance, in accordance with at least one embodiment. In at least one embodiment, some or all of the process 2100 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2100 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 2100 can be implemented in the context of embodiments described elsewhere in this disclosure, such as those discussed in connection with FIGS. 1-19.

One or more aspects of process 2100 may be implemented in accordance with embodiments described throughout this disclosure, such as those discussed in connection with FIG. 19. A system that implements process 2100 may include hardware and/or software to detect 2102 a connection between an agent and a customer for audio communications. The system may establish 2104 a second connection between the agent and a first service of a computing resource service provider. The system may receive 2106, at the first service, audio data over the second connection. The system may, based at least in part on receiving the audio data, execute a workflow 2108. The workflow performed by the system may include a step to use 2110 a second service to transcribe the audio data to generate at least a portion of a transcript. The workflow performed by the system may include a step to use 2112 a third service to execute one or more natural language processing techniques to generate metadata associated with the transcript. The workflow performed by the system may include a step to use 2114 use a fourth service to determine, based at least in part on the metadata, whether one or more categories match the transcript. The workflow may have other steps that are omitted from process 2100 for clarity. For example, there may be additional steps of a step functions workflow to emit events and metering, which may be implemented according to techniques described in connection with FIG. 21. The system may generate 2116 a suggestion based at least in part on the transcript, the metadata, and the one or more categories and provide the suggestion to the agent.

Figure 22:
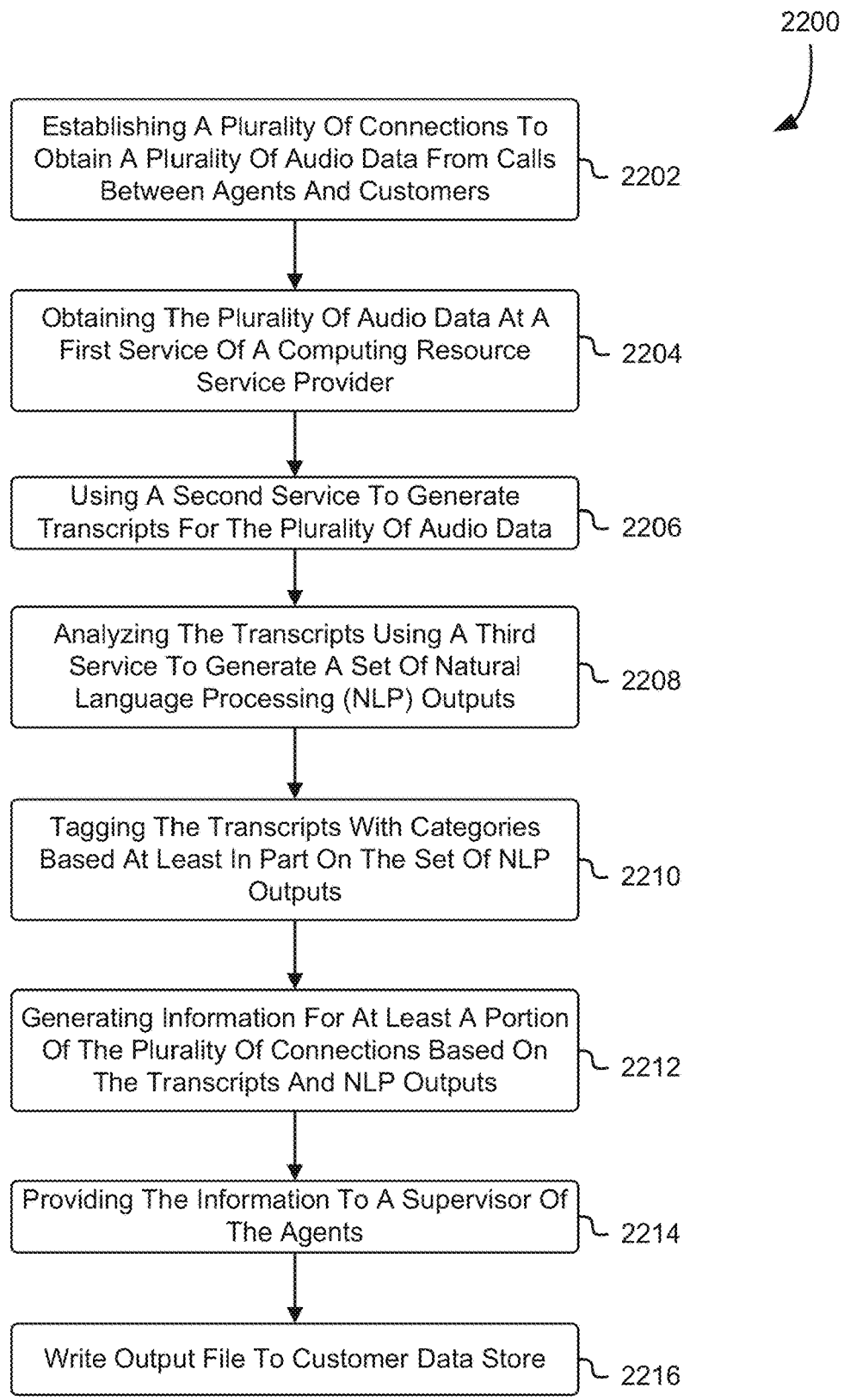
FIG. 22 shows an illustrative example of a process to implement real-time supervisor assistance, in accordance with at least one embodiment.

FIG. 22 shows an illustrative example of a process 2200 to implement real-time supervisor assistance, in accordance with at least one embodiment. In at least one embodiment, some or all of the process 2200 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2200 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 2200 can be implemented in the context of embodiments described elsewhere in this disclosure, such as those discussed in connection with FIGS. 1-19.

A system that implements process 2200 may, in at least some embodiments, include software and/or hardware to establish 2202 a plurality of connections to obtain a plurality of audio data from calls between agents and customers. When an agent is connected to a customer (e.g., phone call), a direct connection may be established between the agent and a service of a computing resource service provider that pipes the audio stream of the agent and customer to the service. The architecture may be in accordance with FIG. 18. The system may obtain 2204 the plurality of audio data at a first service of a computing resource service provider. The plurality of audio data may refer to a plurality of Web Socket connections connected to a contacts analytics service The system may use 2206 a speech-to-text service to generate transcripts for the plurality of audio data. The system may analyze 2208 the transcripts using a natural language processing (NLP) service to generate metadata about the calls, such as keyword and phrase matches, entity matches. The system may tag 2210 the transcripts with categories based at least in part on the set of NLP outputs. A categorization service such as those discussed in connection with FIG. 1 may be used to determine whether a particular transcript triggers one or more categories. The system may generate 2212 information for at least a portion of the plurality of connections based on the transcripts and NLP outputs and may provide the information to a supervisor of the agents. The information generated may be information relating to categories or NLP metadata, such as detecting when a customer's sentiment is trending negatively, whether profanity was uttered during the call, loud shouting by either agent or customer, and more.

Figure 23:
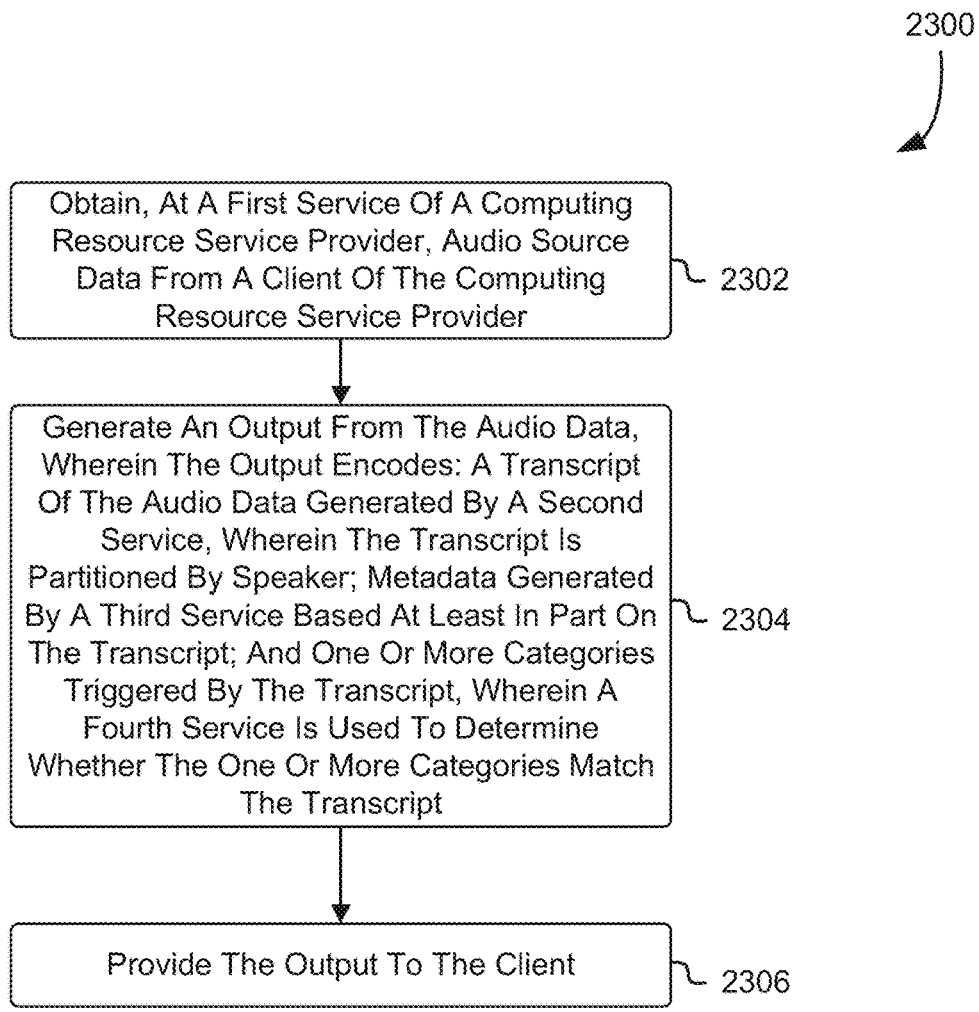
FIG. 23 shows an illustrative example of a process to generate contacts analytics output data, in accordance with at least one embodiment.

FIG. 23 shows an illustrative example of a process 2300 to generate contacts analytics output data, in accordance with at least one embodiment. In at least one embodiment, some or all of the process 2300 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 2300 can be implemented in the context of embodiments described elsewhere in this disclosure, such as those discussed in connection with FIGS. 1-19.

A system that performs process 2300 may obtain 2302, at a first service of a computing resource service provider, audio source data from a client of the computing resource service provider. The audio source data may be audio recordings, audio data, audio contacts data, and other variants described herein. Audio source data may refer to a collection of call recordings of a customer contact center where agents of an organization take calls from customers of the organization who may have questions, technical issues, etc.

The system may generate 2304 an output from the audio data, wherein the output encodes: a transcript of the audio data generated by a second service, wherein the transcript is partitioned by speaker; metadata generated by a third service based at least in part on the transcript; and one or more categories triggered by the transcript, wherein a fourth service is used to determine whether the one or more categories match the transcript. The system may be a contacts analytics service as described, for example, in connection with FIGS. 1-2.

The system may provide 2306 the output to the client. In various embodiments, the output may be provided to the client in various ways. For example, the output may be copied to a customer data bucket. The data may be indexed on entities, keywords, and phrases and other types of metadata such as audio characteristics so that clients can perform a rich set of searching and filtering on the output data.

Figure 24:
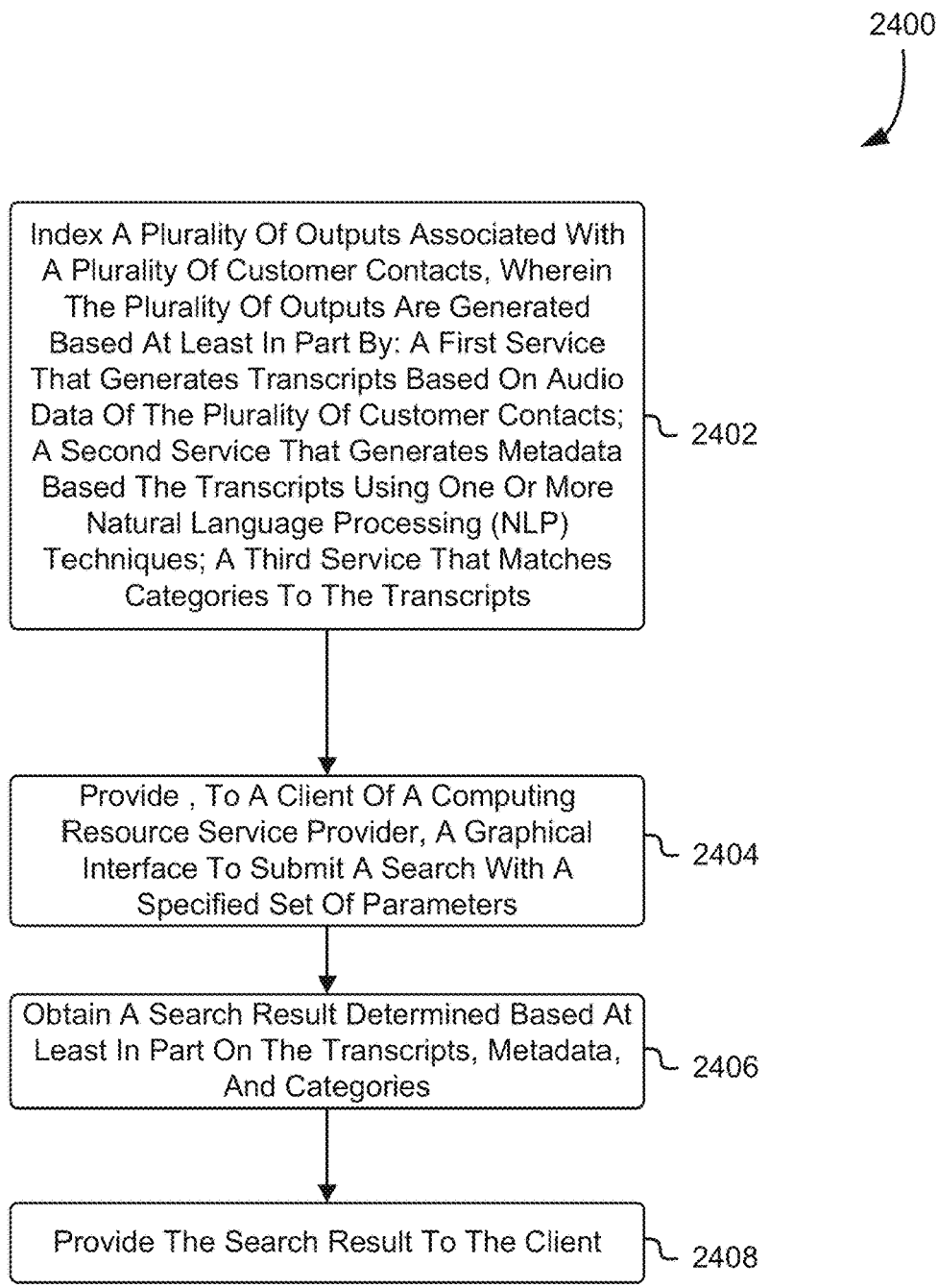
FIG. 24 shows an illustrative example of a process to implement contacts search and diagnostics capabilities, in accordance with at least one embodiment.

FIG. 24 shows an illustrative example of a process 2400 to implement contacts search and diagnostics capabilities, in accordance with at least one embodiment. In at least one embodiment, some or all of the process 2400 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 2400 can be implemented in the context of embodiments described elsewhere in this disclosure, such as those discussed in connection with FIGS. 1-19. In at least one embodiment, a system is to index 2402 a plurality of outputs associated with a plurality of customer contacts, wherein the plurality of outputs are generated based at least in part by: a first service that generates transcripts based on audio data of the plurality of customer contacts; a second service that generates metadata based the transcripts using one or more natural language processing (NLP) techniques; a third service that matches categories to the transcripts. The first service may be a speech-to-text service as described throughout this disclosure. The second service may be a NLP service as described throughout this disclosure. The third service may be a categorization service as described throughout this disclosure. Database indices may be generated on metadata such as entities and keywords that were extracted from the contacts data by a NLP service.

A system performing the process may provide 2404, to a client of a computing resource service provider, a graphical interface to submit a search with a specified set of parameters. The graphical interface may be a contact search page such as those described in connection with FIG. 6 that generates results in accordance with FIGS. 7-11. In at least one embodiment, a system receives 2406 a request to perform the search with the specified set of parameters, which may be in accordance with FIG. 6. In at least one embodiment, the system is to perform the search to obtain 2406 a search result determined based at least in part on the transcripts, metadata, and categories and provide 2408 the search result to the client.

FIG. 25 illustrates system architecture of a scaling service 2502 that may interact with other services in an environment 2500 in which an embodiment may be practiced. Techniques described in connection with FIG. 25 may be utilized with embodiments described in connection with FIGS. 1-24. As illustrated in FIG. 25, the environment 2500 may include a scaling service 2502 comprising a scaling service frontend 2514, a scaling service backend 2528, and a scaling service workflow manager 2524. A customer 2526 may set scaling policies via the scaling service frontend 2514 and may also set alarm actions with a telemetry service 2506 that trigger the scaling policies. Calls made to the scaling service frontend 2514 may be authenticated by an authentication service 2516. Scaling policies may be stored with the database service 2520 by the scaling service backend 2528, and scaling actions may be initiated through a scaling service workflow manager 2524 by the scaling service backend 2528. The customer 2526 may specify, via a policy/role management service (not shown), a role to be assigned to the scaling service 2502, and the scaling service 2502 may obtain a token from a token service 2518 as proof that the scaling service 2502 has been granted that role. Upon triggering a scaling policy, the scaling service 2502 may obtain a resource's current capacity and set the resource's capacity for its respective resource service of the resource services 2504 under the specified role.

The scaling service frontend 2514 may be the frontend for the scaling service 2502. That is, the scaling service frontend 2514 provides the customer 2526 with a single endpoint. The customer 2526 may use an interface console or call an API to instruct the scaling service 2502 to create scaling policies for their resources. That is, the customer 2526 may submit scaling service API requests to the scaling service frontend 2514. The scaling service frontend 2514 may pass the requests through to the scaling service backend 2528. For example, the customer 2526 may use a service interface (i.e., via the scaling service frontend 2514) to register a scalable target. The scalable target may refer to a dimension of the resource that the customer 2526 may scale. In some examples, the scalable target may include a service ID or namespace, a resource ID, and/or a dimension name or identifier such that the scalable target uniquely identifies which dimension of the particular resource of the particular service to scale. Once the scalable target is registered, the customer 2526 may create a scaling policy to be associated with the scalable target.

The scaling service backend 2528 may be the backend data and/or control plane for the scaling service 2502. The scaling service backend 2528 may receive and process scaling requests (e.g., via a control plane) and create, read, update, and delete in response to corresponding API requests (e.g., via a data plane). For scaling requests, the scaling service backend 2528 may calculate a new desired capacity and launch a scaling workflow via the workflow service 2522, which in itself may interact with the target resource and use a control plane service to track and record the interaction. The policies, scaling activities, and identities of scalable targets may be stored with a database service 2520, and then a workflow service 2522 may be used to orchestrate the scaling workflow. The computing resource service provider may provide general APIs for managing the scaling of various resource service types so that the customer 2526 need learn only one API to scale all their resources. In order for the scaling service 2502 to determine which resource to scale, in some examples a resource is individually identifiable and has one or more scalability measures (e.g., scalable dimensions) that may be independently increased or decreased. That is, the customer 2526 identifies the resource they want to auto-scale. For example, in some implementations a resource can be identified by a URI. Additionally or alternatively, in some implementations a resource can be identified by a service name specified by the customer 2526.

A resource may be unambiguously identified based on the partition, service, region, account ID, and/or resource identifier, and the combination of service namespace, resource ID, and scalable dimension may uniquely identify a scalable target. Among these pieces of information, the scaling service may only require the service and resource identifier (ID) from the customer 2526. Using a combination of service namespace and resource ID may have advantages over using URIs. For example, the customer 2526 may describe the customer's resources registered in the scaling service 2502 with reference to service namespace and resource ID or by service namespace only and, in this way, the customer 2526 need not construct or keep track of URIs. Such an implementation would then accommodate resource services that do not use URIs.

In some embodiments, the customer 2526 can specify a URI in the resource ID, and the system will assume that the service namespace is the one in the URI. In some implementations, alternative to or in addition to individual resource scaling, the scaling service 2502 provides application scaling. In some examples, "application scaling" may refer to scaling a group of related resources that form an application stack of the customer 2526. For the purpose of scaling, the group of related resources, itself, would be a resource and would be uniquely identifiable. Therefore, the concepts of service namespace and resource ID also apply to application scaling.

However, if the customer 2526 only intends to scale one resource, the scaling service need not know that it belongs to a group. On the other hand, if the intention is to scale the group as a whole, the customer 2526 should consider scaling the group versus scaling the resources in it. It should be the job of the scaling service 2502 to determine how to scale the resources. Regarding scalable dimensions, identifying the resource alone may not be sufficient to determine what dimension of the resource to scale. For example, as noted above, the customer 2526 may separately scale the read and write provisioned throughputs of a database service table. In general, a resource may have more than one scalable dimension that may be changed independently.

Therefore, in addition to service namespace and resource ID, the scaling service 2502 may require the customer 2526 to specify which "dimension" of a resource the customer 2526 wants to scale. As an example, a database service table, or global secondary index (GSI), has read and write provisioned throughputs that can be changed independently and that can be regarded as scalable dimensions. For database service tables and GSIs, there may be at least two scalable dimensions for read and write provisioned throughputs, respectively. The customer 2526 may define maximum and minimum boundaries and scaling policies per table/GSI and per scalable dimension.

Determination of whether to trigger a scaling policy and the scaling service 2502 may be made by a source external to the scaling service 2502, such as the telemetry service 2506. That is, a scaling policy may be attached to a telemetry service alarm of the telemetry service 2506 by the customer 2526, and the scaling policy may be triggered by the telemetry service alarm. For example, the customer 2526 could create a telemetry service alarm with the telemetry service 2506 on any measurement being aggregated by the telemetry service (e.g., processor utilization). At the telemetry service 2506, one or more thresholds may be specified for the telemetry service alarm; for example, the customer 2526 may specify that the telemetry service alarm should fire when processor utilization reaches 30 percent utilization. Once the telemetry service alarm is set up, the customer 2526 may attach any scaling policy to it, such that when the alarm fires (i.e., the measurement value exceeds the threshold), it may trigger the scaling policy.

The telemetry service 2506 may call the scaling service 2502 to invoke a scaling policy when an associated alarm enters a state that triggers the scaling policy. In some cases, the telemetry service 2506 may periodically (e.g., every minute) invoke the scaling policy for as long as the alarm remains in that state. In some embodiments, the telemetry service 2506 invokes a scaling policy only once per alarm state, and then a workflow may be performed after performing a scaling action to check the alarm state to determine if further scaling is needed.

As a result of the alarm firing, a notification of the alarm is sent to the scaling service frontend 2514. The scaling service frontend 2514 passes this information to the scaling service backend 2528, which then fetches the corresponding scaling policy from the database service 2520. The scaling service backend 2528 examines the parameters in the retrieved scaling policy, obtains the current capacity of the resource to be scaled from the appropriate resource service, and performs the calculations specified by the scaling policy in view of the current capacity to determine that the new desired capacity for the resource needs to be scaled. Note that for some policy types, like a step policy, the scaling service 2502 will get information about the metric in order to determine which steps in the scaling policy to apply to the resource. For example, the customer 2526 may create a scaling policy for scaling up and down a resource based on a metric that is an indication of application load or traffic volume by setting up an alarm to trigger at certain thresholds of application load or traffic volume and attaching a policy to it. In this example, triggering the alarm will invoke the policy so that when traffic volume goes up and down, the resource will be scaled as dictated by the scaling policy.

In some embodiments, the telemetry service 2506 sends alarms in response to the occurrence of certain specified events (i.e., telemetry events). Examples of such events include sending a message via a message queuing service or executing certain functions in a software container. Additionally or alternatively, in some embodiments scaling policies can be triggered according to a predefined schedule. For example, the customer 2526 may set a scaling schedule that triggers a scaling policy at 6:00 PM every day. Interruption of the telemetry service 2506 may result in delayed scaling due to the delay in a telemetry service alarm being sent to the scaling service 2502 to trigger execution of a scaling policy. Although metric-based alarms may be impacted due to unavailability of the telemetry service 2506, on-demand (e.g., the customer 2526 via the scaling service frontend 2514) and scheduled scaling (e.g., command sent to the scaling service frontend 2514 according to a schedule) would not be affected.

Upon receiving a call from the telemetry service 2506 to invoke a scaling policy, the scaling service backend 2528 may synchronously calculate the new desired capacity for the scalable target, and the scaling service workflow manager 2524 may asynchronously set the desired capacity for the scalable target. The scaling service workflow manager 2524 may contain workflow and activity definitions that are used when effecting and monitoring changes to the target service. Workflows may be launched by the scaling service workflow manager 2524, which may utilize a control plane service to record, in the database service 2520, interactions with the target service. Besides setting desired capacity, the scaling service workflow manager 2524 may also record scaling activities. In some embodiments, the scaling service workflow manager 2524 can also send notifications and/or publish events. The scaling service backend 2528 may be responsible for starting workflow executions (e.g., via the workflow service 2522). In some embodiments, a message queuing service is located between the scaling service backend 2528 and the workflow service 2522 for queuing workflow commands.

The database service 2520 may be used to track the state of scaling activities, to store identities of scalable targets registered by the customer 2526, and to store scaling policies defined by the customer 2526. The scaling policies may be stored with the database service 2520 in any applicable format, such as in a JavaScript Object Notation format in a table with the database service 2520. However, the scaling policy may be automatically generated by the scaling service 2502 so that the customer 2526 need not directly provide the scaling policy. If the database service 2520 has an outage, various methods may be performed to minimize adverse impact to the scaling service 2502. For example, scalable targets and scaling policies may be cached; in this manner, new entities may not be created but the scaling service 2502 will continue to automatically scale existing scalable targets. As another example, recording of the scaling history is made as a best effort; in other words, accuracy of the scaling history is traded for availability, and "dangling" scaling activities may be closed. As still another example, the process of writing scaling tasks to the database service 2520 could be bypassed; for example, the scaling service backend 2528 may put, in a queue of a message queuing service, a message for a scaling task that includes all of the data that the workflow service 2522 needs in the message. Note that although FIG. 25 shows the database service 2520 as residing external to the scaling service 2502, it is contemplated that, in some embodiments, the functionality provided by the database service 2520 may be found wholly or partially within the scaling service 2502.

The resource services 2504 may be services provided by a computing resource service provider hosting resources with scalable dimensions. If a resource service has a problem, scaling may be impacted as the scaling service 2502 may be unable to get the current capacity of or update the resources of the resource service. In some embodiments, the resource service is able to continue accepting and queuing scaling requests even if the resource service is offline, although processing such requests may be impacted.

The customer 2526 may execute a scaling policy in a variety of ways. For example, in some embodiments the customer 2526 can execute the policy using a command line interface, a software development kit, or a console interface (e.g., accessible via a browser). As another example, in some embodiments the customer 2526 can have the policy invoked in response to receiving an alarm from the telemetry service 2506. As still another example, the customer 2526 can have the policy invoked by the occurrence of an event detected by the telemetry service 2506. In yet another example, the customer 2526 can have the policy invoked according to a schedule specified to the telemetry service 2506 by the customer 2526.

Each scaling action (i.e., each change made to a resource's scalable dimension) may have associated metadata, such as a unique activity identifier (ID), resource URI, description, cause, start time, end time, and/or status. This associated metadata may be recorded/logged with the database service 2520 in conjunction with each scaling action performed by the scaling service 2502. The customer 2526 may subsequently query the scaling activities of a particular resource service by its URI. Scaling actions may cause a telemetry service event to be published.

After each change to the scalable dimension (e.g., the desired task count of the service construct), the system may check the current alarm state to see if additional scaling is required. The behavior may be as follows:

If scaling policy is an action for OK state (i.e., maintain current state), no action is taken.

If scaling policy is an action for ALARM or INSUFFICIENT DATA state:
  Get the alarm's current state.
  If the alarm's current state matches the configured policy:
    If timeout has expired, reset alarm state to OK (this ensures that if the state goes into ALARM or INSUFFICIENT DATA again, the telemetry service 2506 may call the scaling service 2502 to execute the policy again.
    If timeout has not expired:
      If current time is after cooldown expiration time, call InvokeAlarmAction( ) to execute the policy again.
      Otherwise, wait an amount of time (e.g., one minute) and repeat the process step, starting from getting alarm state (e.g., an alarm is evaluated every minute).

If the scaling policy is triggered manually by the customer 2526, by the occurrence of an event or according to a schedule, rather than by an alarm of the telemetry service 2506, the desired task count of the service construct may be changed based on the current running count and the scaling adjustment specified in the policy, within the minimum and maximum capacity. The scaling service 2502 may apply the scaling adjustment specified in the policy to the current running count of the service construct.

The running count may be the actual processing capacity, as opposed to the desired task count, which is what the processing capacity is supposed to be. Calculating the new desired task count from the running count may prevent excessive scaling. For example, if the scaling service 2502 has increased the desired task count by 1, the alarm that triggered the scaling policy may still be active during the time that the task is being launched. However, once the new task is fully launched, the alarm may be deactivated, ensuring that the scaling service 2502 does not scale-out further.

In some embodiments, scale-out is prioritized over scale-in; i.e., a scale-out will override an in-progress scale-in but not vice versa. In other embodiments, the reverse is true. An in-progress scale-in may be indicated by the running count being greater than the desired task count. In this situation, the scaling service 2502 may allow a scale-out to increase the desired task count in a manner that optimally maintains application availability. Conversely, an in-progress scale-out may be indicated by the running count being less than the desired task count, in which case the scaling service 2502 may not allow a scale-in to decrease the desired task count in order to optimally protect application availability.

The combination of Resource URI and Context may uniquely identify a scalable resource. Supported policy types for scaling may include "SimpleScaling," "StepScaling," and "TargetUtilizationScaling." Each policy type has its own configuration parameters. For "Simple Scaling," the policy configuration may have the following parameters:

AdjustmentType: "PercentChangeInCapacity," "ChangeInCapacity," or "ExactCapacity."

ScalingAdjustment: a number whose meaning depends on adjustment type; e.g., if scaling adjustment is 10 and adjustment type is percentage change in capacity, then the adjustment is plus 10 percent of actual capacity.

MinAdjustmentMagnitude: may only be applicable when AdjustmentType is "PercentChangeInCapacity," to protect against an event where the specified percentage of the current capacity results in a very small number.

Cooldown: allows the customer 2526 to specify an amount of time to pass (e.g., number of seconds) before allowing additional scaling actions; it starts once a scaling action has been completed, and no further scaling actions are allowed until after it has expired.

As noted, in some implementations, a scaling policy may be stored as parameters in persistent storage, such as a data store. In other implementations, a scaling policy may be a document in data format such as eXtensible Markup Language (XML) or JavaScript Object Notation (JSON). An illustrative example of a policy document is shown below:

```
{
    "policyName": "MyServiceScalingPolicy1",
    "serviceNamespace": "MyService",
    "resourceId": "VMResourceGroup1",
    "scalableDimension": "NumVMs",
    "policyType": "StepScaling",
    "stepScalingPolicyConfiguration":
    {
        "adjustmentType": "PercentChangeInCapacity",
        "stepAdjustments": [
        {
            "metricintervalLowerBound": "10",
            "metricintervalUpperBound": "100",
            "scalingAdjustment": "5"
        }
        ],
        "minAdjustmentMagnitude": "1",
        "cooldown": "120",
    },
}
```

The scaling service 2502 may also utilize a timeout. The timeout may serve at least two purposes. First, the scaling service 2502 may utilize a timeout in a check alarm state workflow in an event that a scaling action becomes stuck for an excessive (i.e., greater than a defined threshold) period of time; for example, a service construct cluster that does not have enough capacity for new tasks may not respond to a demand to increase the number of tasks. In such an event, the alarm could remain in breach for a long time, and the timeout prevents the scaling service 2502 from continually checking its state. Second, the scaling service 2502 may prioritize scale-out/scale-up over scale-in/scale-down, but the scaling service 2502 should not let a stuck scale-out/scale-up (e.g., due to an InsufficientCapacityException) prevent a scale-in/scale-down from occurring. Thus, a timeout may allow the scaling service 2502 to unblock the scale-in. Note that in some implementations the timeout is user-configurable; whereas in other implementations the timeout is a user-non-configurable value which the scaling service 2502 uses to determine whether to give up on a stuck scale-out.

The scaling service 2502 may be designed as a layer on top of the resource services 2504 that calls into those services on behalf of the customer 2526. This ensures that the scaling service 2502 provides the customer 2526 with a consistent automatic scaling experience for all resource services. The customer 2526 may first create an alarm, or the customer may choose an existing alarm, in a console of the telemetry service 2506 and then apply a scaling policy to the alarm.

One scaling policy type is a "step" policy, which allows the customer 2526 to define multiple steps of scaling adjustments with respect to the measurement that triggers execution of the scaling policy. For example, the customer 2526 may specify to scale-up a scalable dimension of the resource if processor utilization reaches certain threshold steps. For example, the customer 2526 may specify to scale-up the scalable dimension of the resource by 10 percent if processor utilization is between 30 and 60 percent. The customer may further specify to scale-up the scalable dimension by 30 percent if processor utilization is between 60 and 70 percent, scale-up the scalable dimension by 30 percent if processor utilization is above 70 percent, and so on. In this manner the customer 2526 can define multiple steps and/or multiple responses with different magnitudes with respect to the specified metrics.

The API of the scaling service 2502 may be designed to operate as a separate service from the resource services 2504 such that it is not integrated into any particular service of the resource services 2504. In this manner, the scaling service 2502 is not dependent upon any particular service of the resource services 2504. In order to set up a particular resource service to be scaled by the scaling service 2502, the scaling service 2502 simply needs information about the APIs of the particular resource service to call in order to direct the particular resource service to scale-up or down. The scaling service 2502 is able to maintain this independence by specifying which dimension of which resource of the particular resource service to scale and whether to scale-up or down; the logistics of how the particular resource should be scaled (e.g., which tasks to terminate, which container instances that do tasks should be launched, etc.) in response to direction from the scaling service 2502 is determined by the particular resource service itself.

In some embodiments, additional components not pictured in FIG. 25 are present within the scaling service 2502. For example, in certain embodiments a control plane service is present between the scaling service workflow manager 2524 and external services such as the authentication service 2516 and the database service 2520. For example, the control plane service may provide API operations for updating scaling history. Furthermore, having certain functions performed by the control plane instead of the scaling service backend 2528 may mitigate performance impact if the scaling service backend 2528 receives requests for many data retrieval operations from the customer 2526. With a separate control plane, the effect on the scaling service 2502 of the increased volume of retrieval operations is minimized. The control plane service may exist in addition to the backend service and may track and record all persistent service (e.g., database service 2520, authentication service 2516, etc.) interactions. In other embodiments, however, control plane functionality is integrated into the scaling service backend 2528.

Also in some embodiments, service adapters are present within the scaling service 2502 between the resource services 2504 and certain scaling service components, such as the scaling service backend 2528 and the scaling service workflow manager 2524. The service adapters may be responsible for routing the scaling request through appropriate APIs for the target service. In alternative embodiments, the service adapter functionality is present within the scaling service workflow manager 2524 and/or the scaling service backend 2528. However, because the scaling service 2502 is decoupled from the resource services 2504, the scaling service 2502 relies on a response from the particular resource service in order to determine whether a scaling request has been fulfilled.

The workflow service 2522 may be a collection of computing devices and other resources collectively configured to perform task coordination and management services that enable executing computing tasks across a plurality of computing environments and platforms. The workflow service 2522 may provide a workflow engine used to effect asynchronous changes in the scaling service 2502. The workflow service 2522 may be used to update target resources and may also be used as a lock to control concurrent scaling requests. The workflow service 2522 may track the progress of workflow execution and perform the dispatching and holding of tasks. Further, the workflow service 2522 may control the assignment of hosts or physical or virtual computing machines used for executing the tasks. For example, a user can define a workflow for execution such that the workflow includes one or more tasks using an API function call to the workflow service 2522. Further, the user may specify task order for the workflow, conditional flows, and timeout periods for restarting or terminating the execution of the workflow. In addition, execution loops for the workflow may be defined. Workflow execution may be asynchronous and may be preceded by synchronous execution of database writes. Note that although FIG. 25 shows the workflow service 2522 as residing external to the scaling service 2502, it is contemplated that, in some embodiments, the functionality provided by the workflow service 2522 may be found wholly or partially within the scaling service 2502.

Interruption of the workflow service 2522 may cause delayed scaling because the asynchronous processing of scaling requests may be adversely impacted. One way to mitigate delayed scaling may be to do only what is absolutely required to scale synchronously via the scaling service frontend 2514. At a minimum, the scaling service may attempt to set desired capacity and record scaling history. From a performance standpoint, this may be acceptable because it just requires an API call to the resource service owning the resource to be scaled and a minimum of extra writes to the database service 2520. Although this may result in losing features of workflow service 2522 (e.g., retry mechanism, history tracking, etc.), at least the system will perform the operations that are required to scale.

The scalable targets (i.e., scalable resources) may reside with the resource services 2504. A scalable target may be uniquely identified from the triple combination of service (e.g., service namespace), resource (e.g., resource ID), and scalable dimension. The resource services 2504 represent the services that actually manage the resources that the customer 2526 wants to be automatically scaled. In this manner, the scaling service 2502 exists as a separate service from the resource services 2504 whose resources are caused to be scaled by the scaling service 2502. The resource services 2504, as noted, may include services such as a software container service, a database service, a streaming service, and so on. The scaling service 2502 may take the scaling policies created by the customer 2526 and, when the scaling policies are invoked (e.g., by an alarm from the telemetry service 2506), the scaling service 2502 may perform the calculations to determine, given the particular policy and the current capacity of the resource, whether to increase or decrease the capacity to a new value. In order to get the current capacity of the resource, the scaling service backend 2528 may make a service call to the resource service 2504 of the resource to be scaled. In response, the resource service 2504 may provide the scaling service 2502 with the current capacity (e.g., "five tasks").

The scaling service workflow manager 2524 may then make a service call to the resource service 2504 that actually owns the resource to be scaled to cause the scaling action to be performed. In other words, because the scaling service 2502 is a separate service from the resource service 2504 that hosts the resources, the scaling service 2502 will make service calls to the resource service that owns the resource in order to get the state of the resource and also to change the state of the resource.

The authentication service 2516 may be a service used for authenticating users and other entities (e.g., other services). For example, when a customer of a computing resource service provider interacts with an API of the computing resource service provider, the computing resource service provider queries the authentication service 2516 to determine whether the customer is authorized to have the API request fulfilled. In the process of creating a scaling policy, the customer 2526 may assign the scaling service 2502 to a role that authorizes fulfillment of certain requests, and the scaling service 2502 may then assume that role in order to make appropriate requests to cause a resource service associated with the policy to scale resources. In this manner, the role (supported by a role management service) gives the scaling service 2502 the necessary permission to access the resource that lives in the resource services 2504.

The customer 2526 may create a role supported by a role management service through an interface console. The interface console may allow the customer 2526 to click an appropriate button or consent checkbox in the interface console, and the underlying system may create the role with the necessary permissions. The token service 2518 may provide the scaling service 2502 with session credentials based on a role or roles specified by the customer 2526. These session credentials may be used by the scaling service 2502 to interact with the resource services 2504 on behalf of the customer 2526. The token service 2518 may provide a token to the scaling service 2502 that the scaling service may include with requests that provide evidence that the scaling service 2502 has been granted the appropriate role to cause scalable dimensions of a resource in the resource services 2504 to be manipulated. The role may be utilized by the automatic scaling service to call a resource service's APIs on behalf of the customer 2526.

Interruption of the token service 2518 may result in the scaling service 2502 being unable to assume a role supported by a role management service, with the scaling service 2502 thereby being unable to scale a resource of the customer 2526. In some embodiments, the scaling service 2502 caches temporary credentials (e.g., they may be valid for 15 minutes, etc.) that the scaling service 2502 can use when assuming a role.

As described in the present disclosure, the scaling service 2502, itself, does not determine whether conditions that trigger a scaling policy are met. Rather, an external entity, such as the telemetry service 2506, determines whether conditions have been met (e.g., by an alarm specified by the customer 2526) and, if met, sends a notification to the scaling service 2502 that triggers execution of the appropriate scaling policy. Thus, a scaling policy may be triggered by an alarm sent by this telemetry service 2506, by the occurrence of an event that triggers notification from an external entity, on demand by the customer 2526, according to a notification that is sent to the scaling service 2502 according to a schedule, or by some other external notification.

As noted, in some embodiments the scaling service supports application scaling. In some examples, the term "application stack" may refer to a grouped set of resources, for example, for executing an application (e.g., comprising an application of the customer, such as a virtual machine from a virtual computer system service and a database from a database service). Through the scaling service interface, the customer 2526 may group different resources together under a common name for scaling. For example, if the customer 2526 has resources that use a database service, virtual computing system service, load balancing service, and a streaming service, the customer 2526 may use a group scaling policy to scale-up or scale-down scalable dimensions of the resource of the group based on a particular trigger (e.g., alarm of the telemetry service 2506). Based at least in part on the policy, the scaling service 2502 knows which scaling commands to send to which service. In this manner, the customer can group together some or all of the customer's services/resources and perform scaling for that group of services as opposed to scaling resources individually. For example, a scaling policy triggered by a telemetry service alarm may specify to increase the group by three more database service instances, 10 more virtual machines, and four load balancers.

Additionally or alternatively, in some embodiments the scaling service 2502 supports "target tracking metrics." In some examples, "target tracking metrics" may refer to measurements that the customer 2526 wants to keep within a specific range. This simplifies the user experience because the customer 2526 simply specifies the metric of a resource and the particular range, and the scaling service 2502 determines how to scale the resource to keep the measurements within the particular range. For example, if the scalable dimension is processor utilization and the customer specifies to keep the scalable dimension between 40 and 60 percent, the scaling service 2502 determines how to keep the measurements within this range. Consequently, the customer is spared having to define, for example, within a first range to scale-up by a first amount, within a second range to scale-up by a second amount, and so on.

Figure 26:
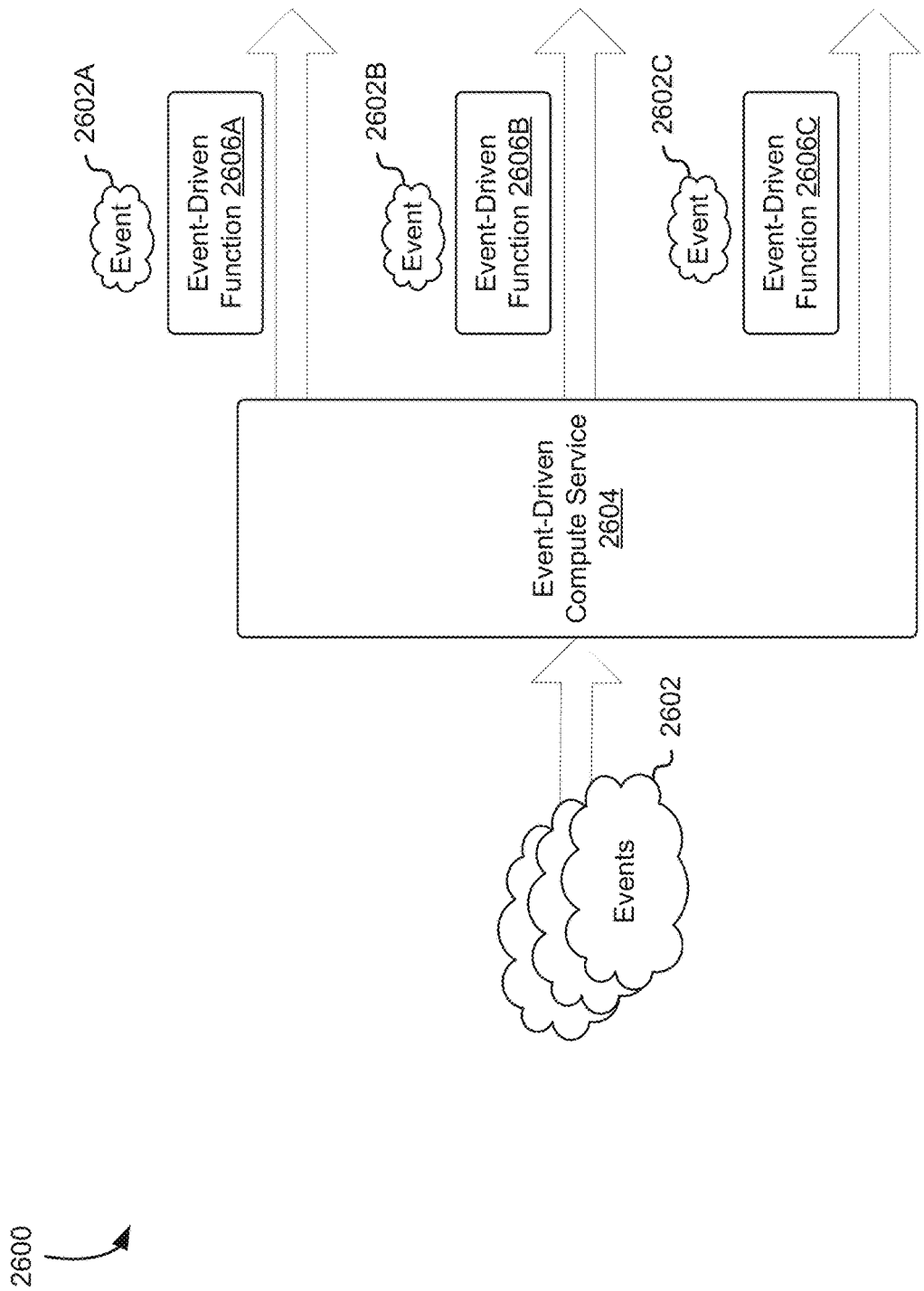
FIG. 26 illustrates an event-driven compute service that detects events and, as a result of detecting the events, executes event-driven functions, in accordance with at least one embodiment.

FIG. 26 illustrates an environment in which various embodiments can be implemented. The computing environment 2600 illustrates an example where an event-driven compute service 2604 may be utilized to invoke various event-driven functions. An event-driven compute service 2604 may receive and/or monitor events 2602 in the manner described above. In some embodiments, the events that the event-driven compute service 2604 monitors include the multimedia manipulation service receiving an insertion segment. An event-driven compute service 2604 may receive a notification that indicates the multimedia manipulation service received an insertion segment and/or the multimedia selection service provided an insertion segment to the multimedia manipulation service and inspected the notification to determine whether to invoke various types of business logic.

The event-driven compute service 2604, which may be implemented in accordance with those described above in connection with FIGS. 1-24, may be further configured to receive events from multiple requests for multimedia streams (e.g., different requests for different broadcasts or different requests for the same broadcast by different users or devices). The event-driven compute service 2604 may receive the events 2602 and determine, either internally (e.g., using a component of the event-driven compute service) or externally (e.g., by delegating to another service) how to splice the events which may operate on different logics and/or different tables. As an example, the event-driven compute service 2604 may include a mapping of event-driven functions to content providers or multimedia input streams.

Event-driven functions 2606A, 2606B, and 2606C may include executable code, source code, applications, scripts, routines, function pointers, input parameters to a routine, callback functions, API requests, or any combination thereof. As an example, the event-driven compute service 2604 may include a mapping of compliance routines to events that indicate which routines should be invoked. Invoking a routine may include executing code or providing executable code as part of a request. FIG. 26 shows multiple events 2602 that are received by the event-driven compute service 2604 and spliced such that a particular event-driven function is run based on the type of error that caused the segment to have degraded quality. The event-driven function 2606A that is run in response to a first event 2602A may be different from the event-driven function 2606B that is run in response to a second event 2602B but need not be the case—the event-driven function may, in some cases, be the same either literally (e.g., both events utilize a function pointer that runs the same executable code from memory) or logically (e.g., the same functional outcome). In some cases, the event-driven function may use information included in the events 2602A, 2602B, and 2602C to perform a workflow.

An event may be generated in response to the application of a security policy or one or more downstream actions resulting from applying a security policy. For example, the event may be triggered by a web API call to apply a security policy, storing the policy in the policy repository, logging the application of the security policy and/or the storing of the policy to a policy repository, or some combination thereof.

An event-driven compute service 2604 may determine when an event occurs and perform custom logic in response to the event being triggered. An event trigger may, for example, be detected when a request to receive a job is added to a metadata service or may be determined at a later point in time, such as in cases where an asynchronous process (e.g., run daily) processes logging events and detects that jobs to run. The event-driven compute service 2604 may be implemented using software, hardware, or some combination thereof. In some embodiments, distributed computing resources may provision and load custom logic/code in response to the event, run the code, and then unload the code and de-provision the computing resource. In some embodiments, a virtual machine is instantiated, custom logic/code is loaded to the virtual machine, the custom logic/code is executed, and then the virtual machine is terminated upon successful execution of the custom logic/code. The event-driven compute service 2604 may be a component of a computing resource service provider or may be a separate component.

An event-driven compute service 2604 may be implemented using an event-driven architecture. When a specific event such as a web API request to start a job, the event-driven compute service 2604 may be notified (e.g., by the authentication service) of that event and the event-driven compute service 2604 may further receive additional information regarding the request, which may be obtained separately (e.g. from the policy management service that the request is directed towards). The event-driven compute service 2604 may determine how to handle the event, which may be handled in part by custom code or logic that is selected based on information obtained about the request—for example, the custom logic may differ for different jobs based on metadata included in the job (e.g., specifying a specific workflow). In some cases, different workflows are run for different customers. In some embodiments, the event-driven compute service 2604 may subscribe to notification messages from the authentication service for events and the authentication service may invoke callback function (such as a lambda expression) in response to an event that the event-drive platform subscribes to receive notifications for.

The event-driven compute service 2604 may receive the events 2602 and determine, either internally (e.g., using a component of the event-driven compute service 2604) or externally (e.g., by delegating to another service) how to handle the events. As an example, the event-driven compute service 2604 may include rules regarding which, among a list of custom logics, should be invoked based on the specific type of job that is being started or other metadata associated with the job. A mapping of job types or workflows to custom logics may exist. For example, a first custom logic may be invoked based on a first job applying to a first customer and a second custom logic may be invoked based on a second job applying to a second customer.

Figure 27:
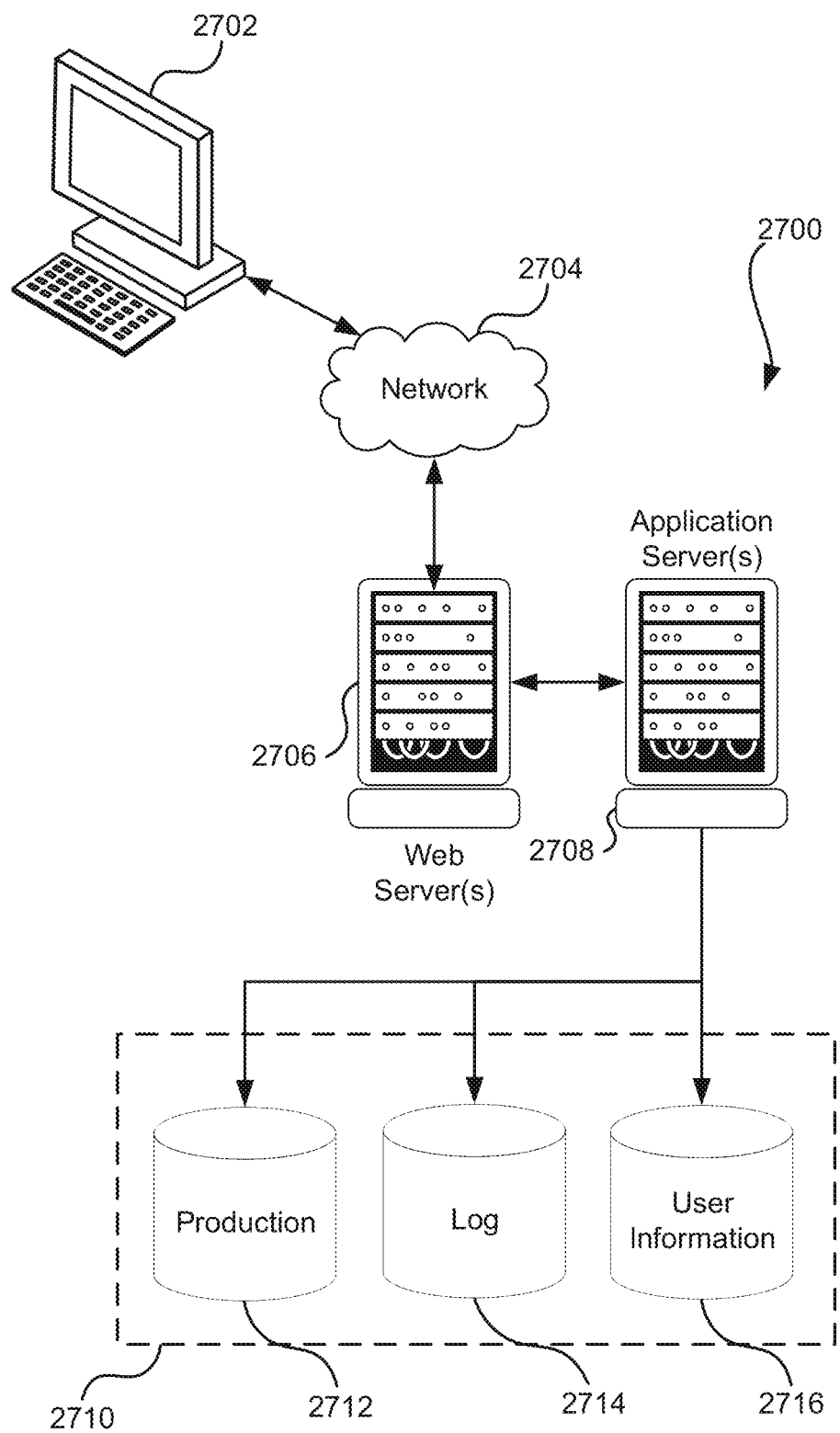
FIG. 27 illustrates a system in which various embodiments can be implemented.

FIG. 27 illustrates aspects of an example system 2700 for implementing aspects in accordance with an embodiment. As will be appreciated, although a web-based system is used for purposes of explanation, different systems may be used, as appropriate, to implement various embodiments. In an embodiment, the system includes an electronic client device 2702, which includes any appropriate device operable to send and/or receive requests, messages, or information over an appropriate network 2704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 2706 for receiving requests and serving content in response thereto, although for other networks an alternative device serving a similar purpose could be used as would be apparent to one of ordinary skill in the art.

In an embodiment, the illustrative system includes at least one application server 2708 and a data store 2710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 2702 and the application server 2708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 2710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 2712 and user information 2716, which are used to serve content for the production side. The data store also is shown to include a mechanism for storing log data 2714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 2710.

The data store 2710, in an embodiment, is operable, through logic associated therewith, to receive instructions from the application server 2708 and obtain, update or otherwise process data in response thereto, and the application server 2708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 2702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 2700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 2700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 27. Thus, the depiction of the system 2700 in FIG. 27 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
receiving, at a frontend service, a request to process a set of data for a client;
creating a job based at least in part on the request; and
as a result of the job being created, executing a step functions workflow comprising a plurality of steps to collectively:
obtain a copy of the set of data, the copy including a subset of audio data;
utilize an artificial intelligence speech-to-text service to generate transcripts for the subset of audio data, wherein a portion of the transcript is reconstructed based at least in part on fragments of the transcript that correspond to separate portions of the audio data obtained at different times;
as a result of reconstructing the portion of the transcript, use a natural language processing (NLP) service to perform a set of NLP techniques on the transcripts to generate metadata encoding one or more characteristics of the transcripts;
use a categorization service to identify one or more categories that match the subset of audio data, wherein the one or more categories are defined based at least in part on rules that evaluate content and audio characteristics of audio data;
generate an output that encodes at least the transcripts, the metadata, and the one or more categories; and
provide the output to the client.

2. The computer-implemented method of claim 1, wherein creating the job comprises creating an entry in a database indicating the job is not yet started and the method further comprises:
detecting, from the database, that the job is not yet started;
determining a manner in which to execute the step functions workflow based at least in part on the job; and
updating status information of the job as part of executing the step functions workflow.

3. The computer-implemented method of claim 1, wherein the set of NLP techniques includes sentiment analysis, entity detection, or key phrase detection.

4. The computer-implemented method of claim 1, wherein at least a portion of the plurality of steps is executed asynchronously as event-driven functions.

5. A system, comprising:
one or more processors; and
memory that stores computer-executable instructions that, if executed, cause the system to:
receive, from a client of a computing resource service provider, a request to process a set of data, the set of data comprising audio data; and
as a result of receiving the request, execute a workflow to:
obtain the audio data;
use a first service to transcribe the audio data by utilizing artificial intelligence techniques, thereby generating a text-based transcript, wherein one or more turns of the text-based transcript are reconstructed based at least in part on portions of the text-based transcript that correspond to separate portions of the audio data obtained at different times;
as a result of determining that the one or more turns of the text-based transcript are reconstructed, use a second service to execute one or more natural language processing techniques, thereby generating metadata output associated with the text-based transcript;
process at least the metadata output to generate a human-readable output;
use a third service to determine whether the human-readable output matches one or more categories, wherein the one or more categories are defined based at least in part on rules that evaluate content and audio characteristics; and
make the human-readable output available to the client.

6. The system of claim 5, wherein the instructions to obtain the audio data include instructions that, if executed, cause the system to:
assume the role associated with a client, wherein the audio data is accessible by the client via a data storage service; and
submit a second request to the data storage service for the audio data.

7. The system of claim 5, wherein the transcript is partitioned into a plurality of turns based on who is speaking.

8. The system of claim 7, wherein the one or more natural language processing techniques include sentiment analysis that assigns sentiments to the plurality of turns.

9. The system of claim 5, wherein the output is encoded in a human-readable format.

10. The system of claim 5, wherein the audio data is recorded by a customer contact service.

11. The system of claim 5, wherein the instructions include further instruction that, if executed, cause the system to determine a sentiment score for the transcript.

12. The system of claim 5, wherein the instructions include further instruction that, if executed, cause the system to redact, from the transcript, sensitive data.

13. A non-transitory computer-readable storage medium storing thereon executable instructions that, as a result of being executed by one or more processors of a computer system, cause the computer system to:
copy source data from a customer data store;
obtain a text-based transcript from the source data, wherein a portion of the text-based transcript is reconstructed based at least in part on at least two subportions of the text-based transcripts that correspond to separate portions of the source data obtained at different times;
as a result of reconstructing the portion of the text-based transcript, execute one or more natural language processing techniques, to determine
metadata encoding conversation characteristics associated with the transcript;
determine that one or more categories apply to the source data, wherein the one or more categories are defined based at least in part on rules that evaluate based on at least content and conversation characteristics;
generate an output based at least in part on the transcript, the metadata encoding conversation characteristics associated with the transcript, and the one or more categories; and
make the output available to the customer data store.

14. The non-transitory computer-readable storage medium of claim 13, wherein the source data comprises chat logs and audio recordings, further wherein the text-based transcript is either a chat log or a transcript of an audio recording.

15. The non-transitory computer-readable storage medium of claim 13, wherein the metadata encodes one or more detected entities, keywords, or phrases.

16. The non-transitory computer-readable storage medium of claim 13, wherein the metadata encodes sentiments of speakers for one or more portions of the source data.

17. The non-transitory computer-readable storage medium of claim 16, wherein sentiments are one of: positive, negative, neutral, or mixed.

18. The non-transitory computer-readable storage medium of claim 13, wherein the output is a JavaScript Object Notation (JSON) file.

19. The non-transitory computer-readable storage medium of claim 13, wherein the output includes timestamps of where the one or more categories were applicable to the source data.

20. The non-transitory computer-readable storage medium of claim 13, wherein the instructions include further instructions that, as a result of being executed by one or more processors of a computer system, cause the computer system to emit event and metering information.

21. The system of claim 5, wherein:
the computer-executable instructions further cause the system to parse the audio data by speaker into audio waveforms; and
the artificial intelligence techniques are utilized to map the audio waveforms to text.

* * * * *